US010674664B2

(12) United States Patent
Hultgren et al.

(10) Patent No.: US 10,674,664 B2
(45) Date of Patent: Jun. 9, 2020

(54) LAWN CARE VEHICLE HAVING A CONVEYOR SEAL

(71) Applicant: HUSQVARNA AB, Huskvarna (SE)

(72) Inventors: Andreas Hultgren, Nässjö (SE); Arpad Loci, Huskvarna (SE); Andreas Hedqvist, Jönköping (SE); Magnus Claesson, Jönköping (SE); Dennis Nordquist, Jönköping (SE); Martin Robertsson, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 42 days.

(21) Appl. No.: 16/300,190

(22) PCT Filed: May 28, 2016

(86) PCT No.: PCT/IB2016/053160
§ 371 (c)(1),
(2) Date: Nov. 9, 2018

(87) PCT Pub. No.: WO2017/208048
PCT Pub. Date: Dec. 7, 2017

(65) Prior Publication Data
US 2020/0029502 A1 Jan. 30, 2020

(51) Int. Cl.
*A01D 43/06* (2006.01)
*A01D 34/64* (2006.01)
(Continued)

(52) U.S. Cl.
CPC .......... *A01D 43/063* (2013.01); *A01D 34/64* (2013.01); *A01D 43/077* (2013.01); *B65G 33/14* (2013.01); *A01D 2101/00* (2013.01)

(58) Field of Classification Search
CPC .. B65G 33/14; A01D 2101/00; A01D 43/063; A01D 43/06; A01D 43/07;
(Continued)

(56) References Cited

U.S. PATENT DOCUMENTS 3,409,119 A * 11/1968 Mayrath ................ B65G 33/14
198/671
3,736,736 A * 6/1973 Myers ................ A01D 43/0633
56/14.5
(Continued)

FOREIGN PATENT DOCUMENTS

EP 2 281 431 A2 2/2011
GB 2 196 826 A 5/1988

OTHER PUBLICATIONS

International Search Report and Written Opinion for International Application No. PCT/IB2016/053160 dated Mar. 3, 2017.
(Continued)

*Primary Examiner* — Abigail A Risic
(74) *Attorney, Agent, or Firm* — Burr & Forman, LLP

(57) ABSTRACT

A yard waste collection assembly comprising a yard waste collector (200) comprising a yard waste inlet, a conveyor (100) configured to receive yard waste at a receiving end of the conveyor (100) and discharge the yard waste at a discharge end of the conveyor (100), wherein the conveyor comprises a telescopic seal (102) configured to cover an outlet (103), at the discharge end, in a shut position when the conveyor (100) is not engaged with the yard waste collector (200), and wherein the telescopic seal (102) is further configured to slide along a longitudinal axis (L) of the conveyor (100) to an open position when the conveyor engages the yard waste collector (200) causing the outlet (103) to be uncovered.

20 Claims, 45 Drawing Sheets

(51) Int. Cl.
*A01D 43/07* (2006.01)
*B65G 33/14* (2006.01)
*A01D 43/063* (2006.01)
*A01D 43/077* (2006.01)
*A01D 101/00* (2006.01)

(58) Field of Classification Search
CPC .. A01D 43/073; A01D 43/086; A01D 43/087; A01D 34/64
See application file for complete search history.

(56) References Cited

U.S. PATENT DOCUMENTS

| | | |
|---|---|---|
| 3,874,152 A | 4/1975 | Dahl |
| 3,974,631 A | 8/1976 | Rhodes |
| 3,995,414 A | 12/1976 | Kerr et al. |
| 4,443,149 A * | 4/1984 | Isaacson ................ B65G 33/14 198/507 |
| 4,476,668 A | 10/1984 | Reilly |
| 4,589,379 A | 5/1986 | Fujikawa et al. |
| 4,709,541 A | 12/1987 | Broman et al. |
| 4,782,650 A | 11/1988 | Walker |
| 4,922,696 A * | 5/1990 | Burns .................... A01D 43/07 298/10 |
| 4,986,062 A | 1/1991 | Hill |
| 5,243,809 A | 9/1993 | Redding |
| 5,678,648 A | 10/1997 | Imanishi et al. |
| 6,105,349 A | 8/2000 | Busboom et al. |
| 6,261,050 B1 | 7/2001 | Kuhns |
| 6,691,861 B2 | 2/2004 | Reimer et al. |
| 2004/0221563 A1 | 11/2004 | Funk et al. |
| 2007/0022720 A1 | 2/2007 | Guertin |

OTHER PUBLICATIONS

International Preliminary Report on Patentability for International Application No. PCT/IB2016/053160 dated Dec. 4, 2018.

* cited by examiner

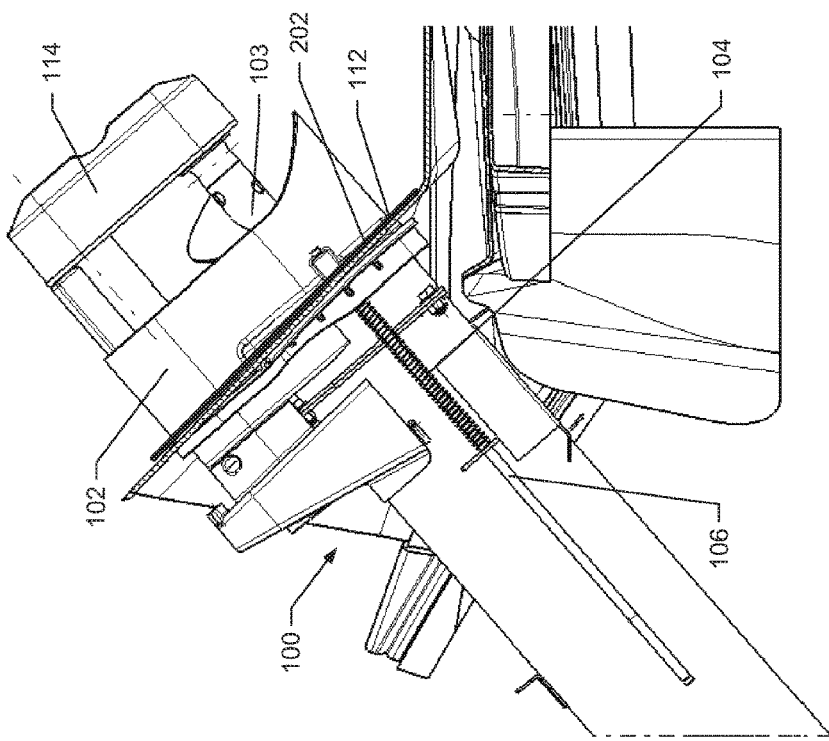
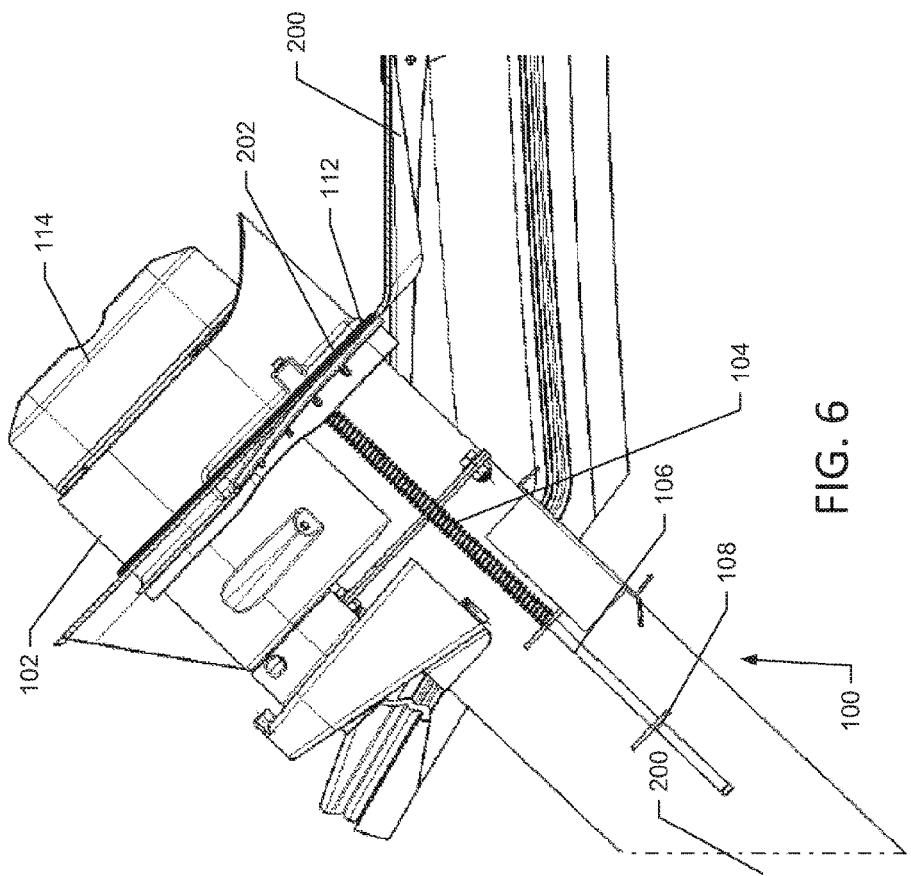

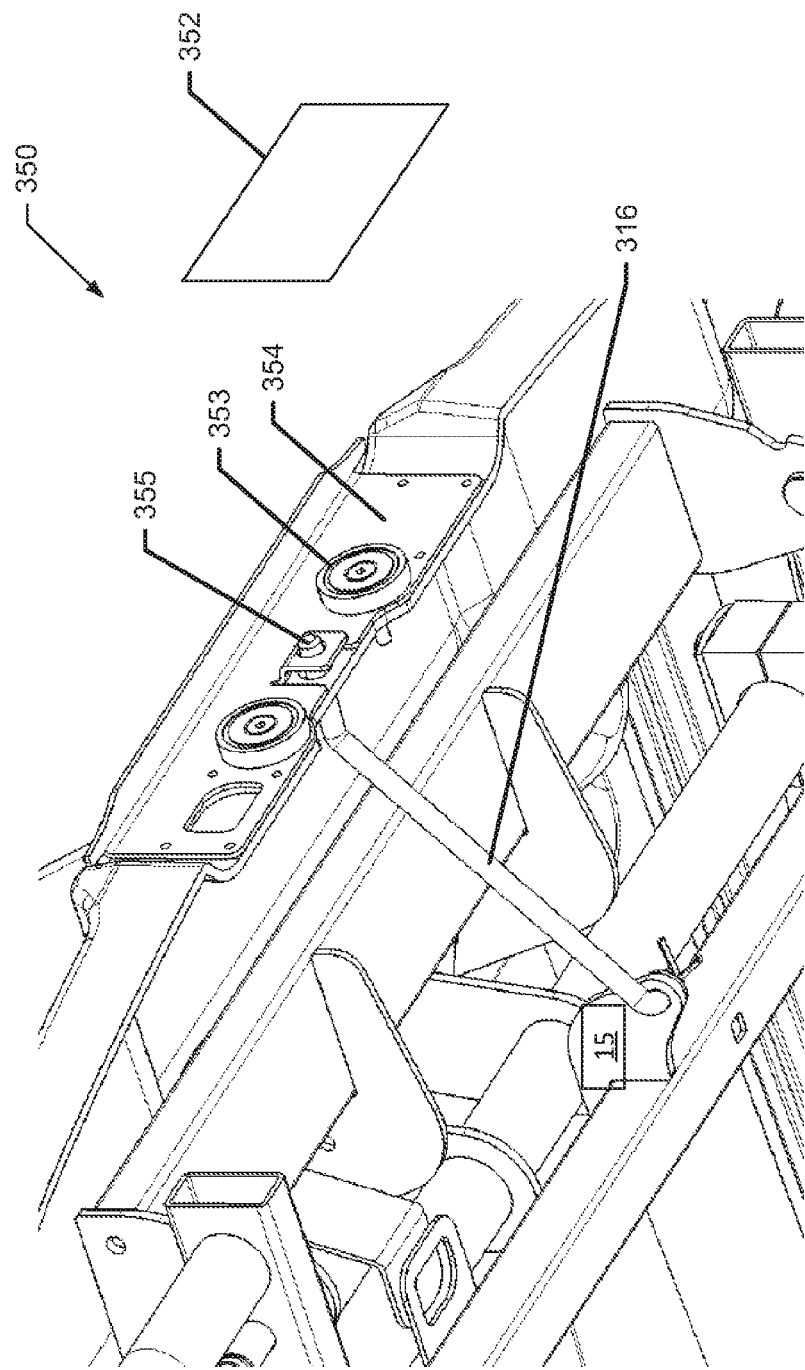

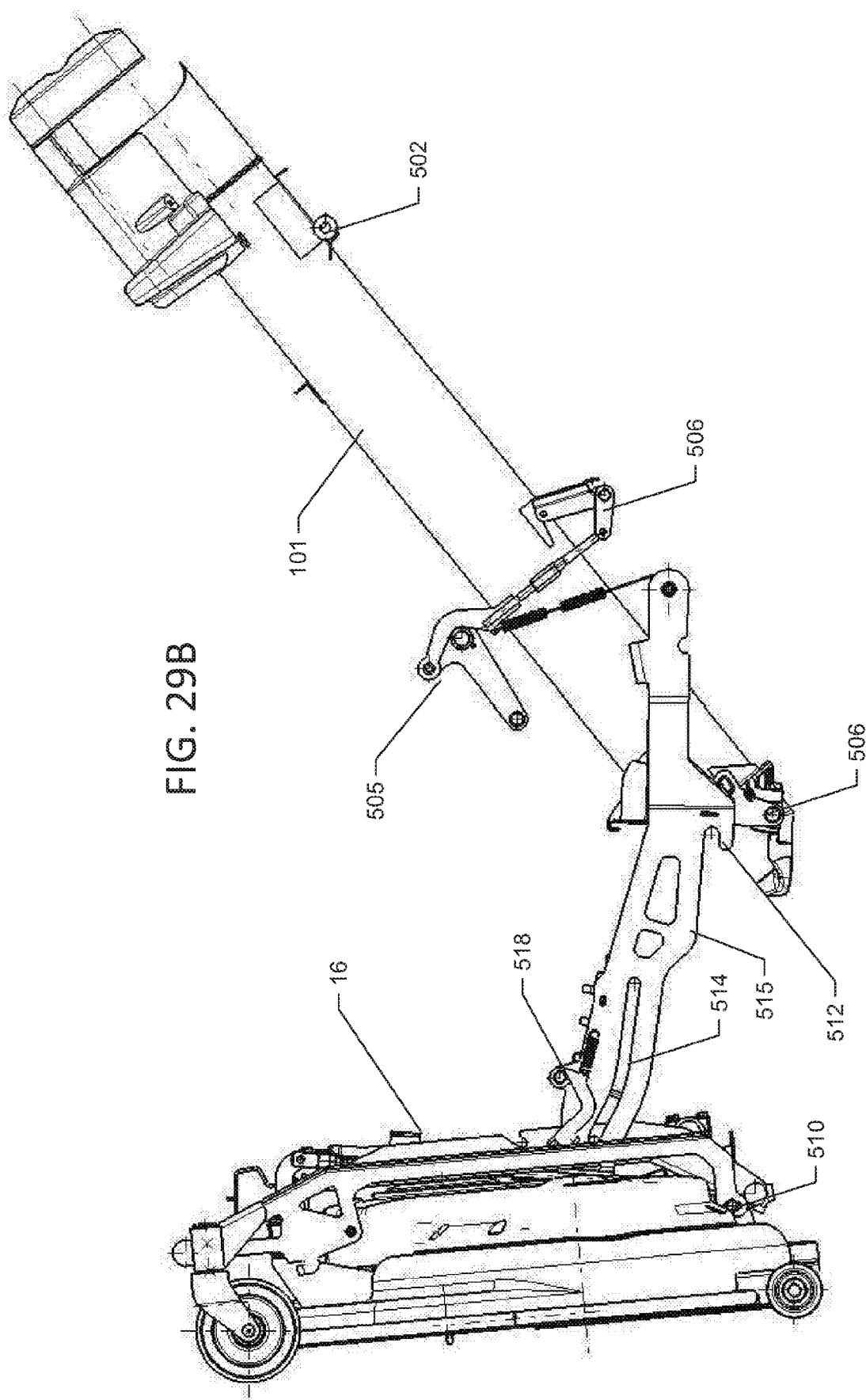

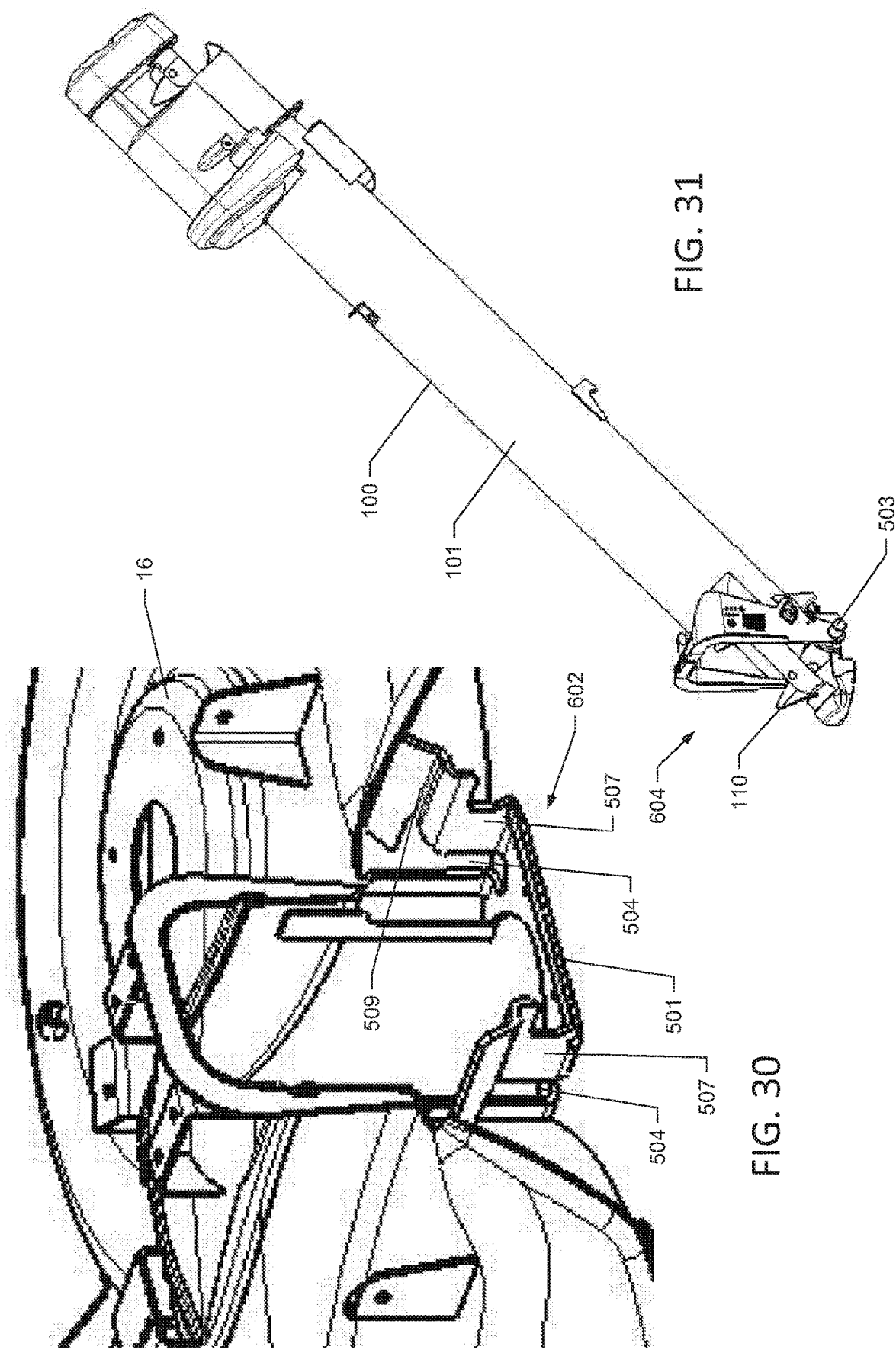

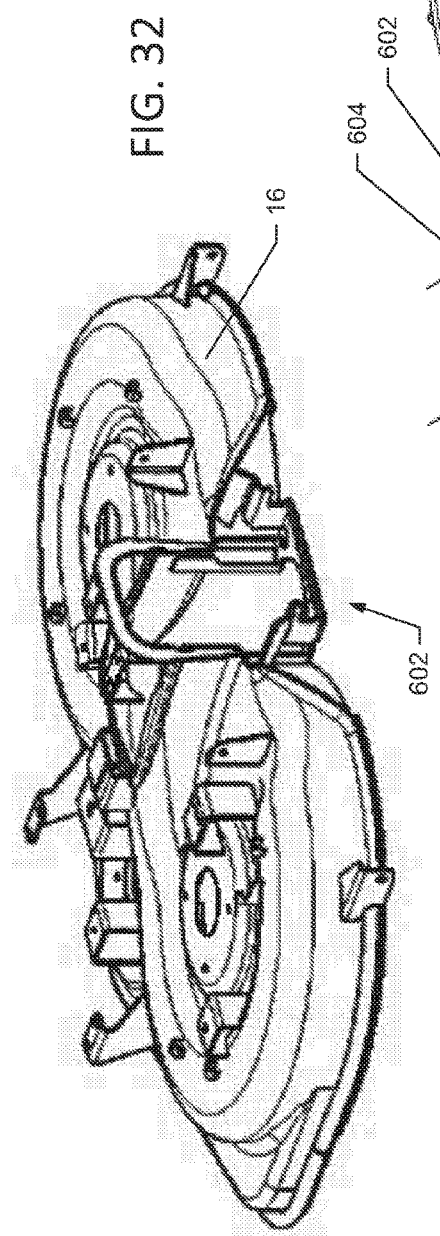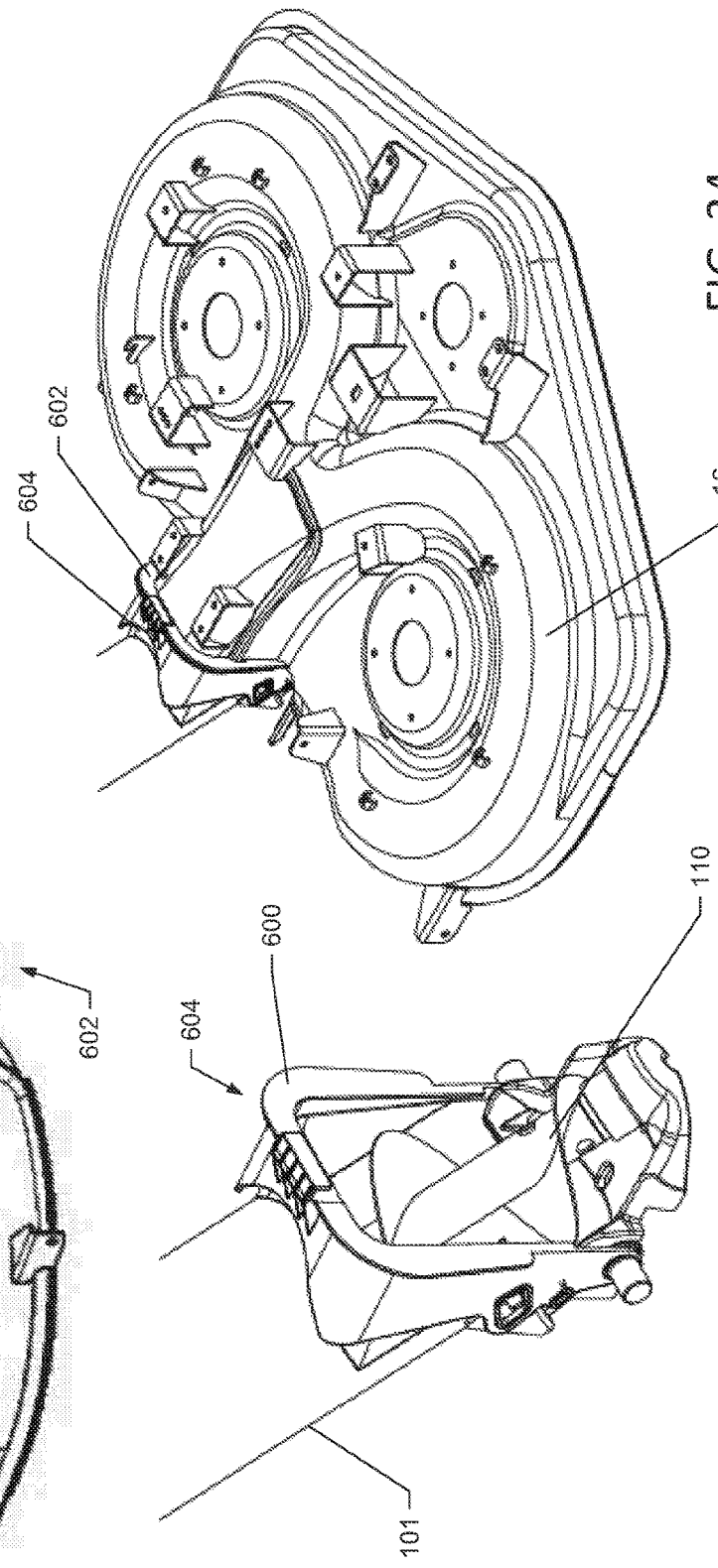

(Pivot up)

Pivot up (Pivot down)

Pivot down

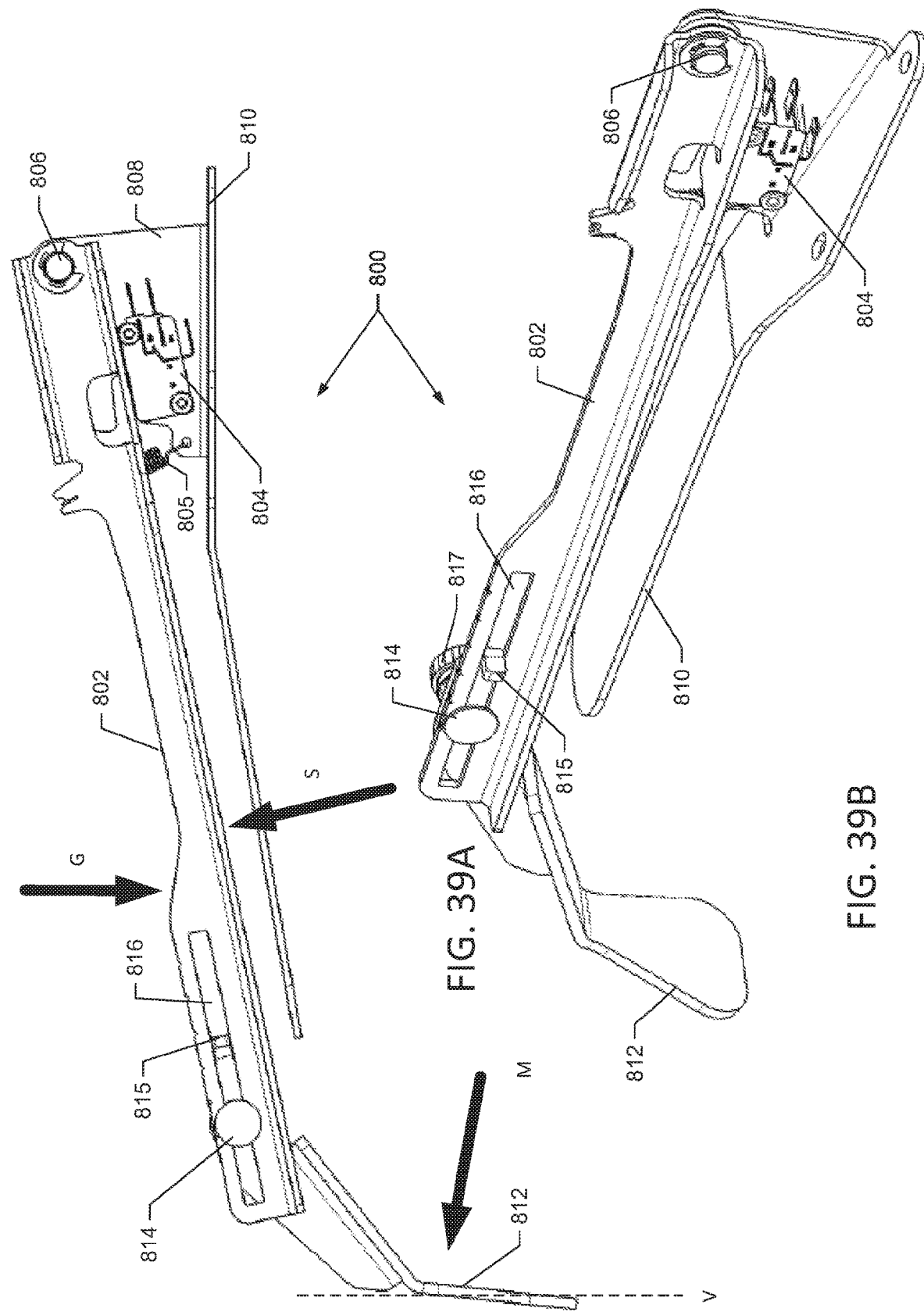

LAWN CARE VEHICLE HAVING A CONVEYOR SEAL

TECHNICAL FIELD

Example embodiments generally relate to outdoor power equipment and, more particularly, some embodiments relate to a lawn care vehicle having a conveyor seal.

BACKGROUND

Lawn care tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small motors and are relatively inexpensive. Meanwhile, at the other end of the spectrum, riding lawn mowers, such as lawn tractors, can be quite large. Riding lawn mowers can sometimes also be configured with various functional accessories (e.g. trailers, tillers and/or the like) in addition to grass cutting components. Riding lawn mowers provide the convenience of a riding vehicle as well as a typically larger cutting deck as compared to a walk-behind model.

BRIEF SUMMARY OF SOME EXAMPLES

Some example embodiments may provide an auger control system including an auger configured to convey material from a receiving end of the auger to a discharge end of the auger, a motor configured to produce a rotational force, and an electronic clutch disposed between the auger and the motor. The electronic clutch is configured to be selectively engaged to provide the rotational force from the motor to the auger. The auger control system may also include a clutch control circuit including processing circuitry configured to engage and disengage the electronic clutch.

In an example embodiment, a yard waste collection system is provided including a yard waste collector configured to receive yard waste, a sensor operably coupled to a top internal surface of the yard waste collector and configured to provide an indication of fill level of the yard waste collector, and processing circuitry configured to cause a collector fill indication to be displayed on a user interface based on the indication of the fill level.

In another example embodiment, a yard waste collector assembly is provided including a yard waste collector comprising a yard waste inlet and a yard waste dump opening, a hatch door pivotally connected to the yard waste collector and configured to cover the yard waste dump opening when the hatch door is in a closed position, a frame configured to support the yard waste collector, and a pushrod operably coupled to the frame and configured to move relative to the hatch door in response to the yard waste collector pivoting from a collection position to a dump position, such that the pushrod causes the hatch door to open.

In a further example embodiment, a yard waste collection assembly is provided including a yard waste collector comprising a yard waste inlet, a conveyor configured to receive yard waste at a receiving end of the conveyor and discharge the yard waste at a discharge end of the conveyor. The conveyor includes a telescopic seal configured to cover an outlet, at the discharge end, in a shut position when the conveyor is not engaged with the yard waste collector. The telescopic seal is further configured to slide along a longitudinal axis of the conveyor to an open position when the conveyor engages the yard waste collector causing the outlet to be uncovered.

In yet a further example embodiment, a conveyor joint assembly is provided including a support ledge operably coupled to and extending from a first sealing surface, a first side wall and second side wall operably coupled to opposite ends of the support ledge, a receiver operably coupled to the first sealing surface, and at least one protrusion operably coupled to a second sealing surface. The second sealing surface is configured to engage the support ledge and the receiver is configured to retain the at least one protrusion causing the first sealing surface to engage the second sealing surface.

BRIEF DESCRIPTION OF THE SEVERAL VIEWS OF THE DRAWING(S)

Having thus described the lawn care vehicle in general terms, reference will now be made to the accompanying drawings, which are not necessarily drawn to scale, and wherein:

FIGS. 5-7 illustrate a conveyor including a telescopic seal penetrating a yard waste collector according to an example embodiment;

Figure 8:
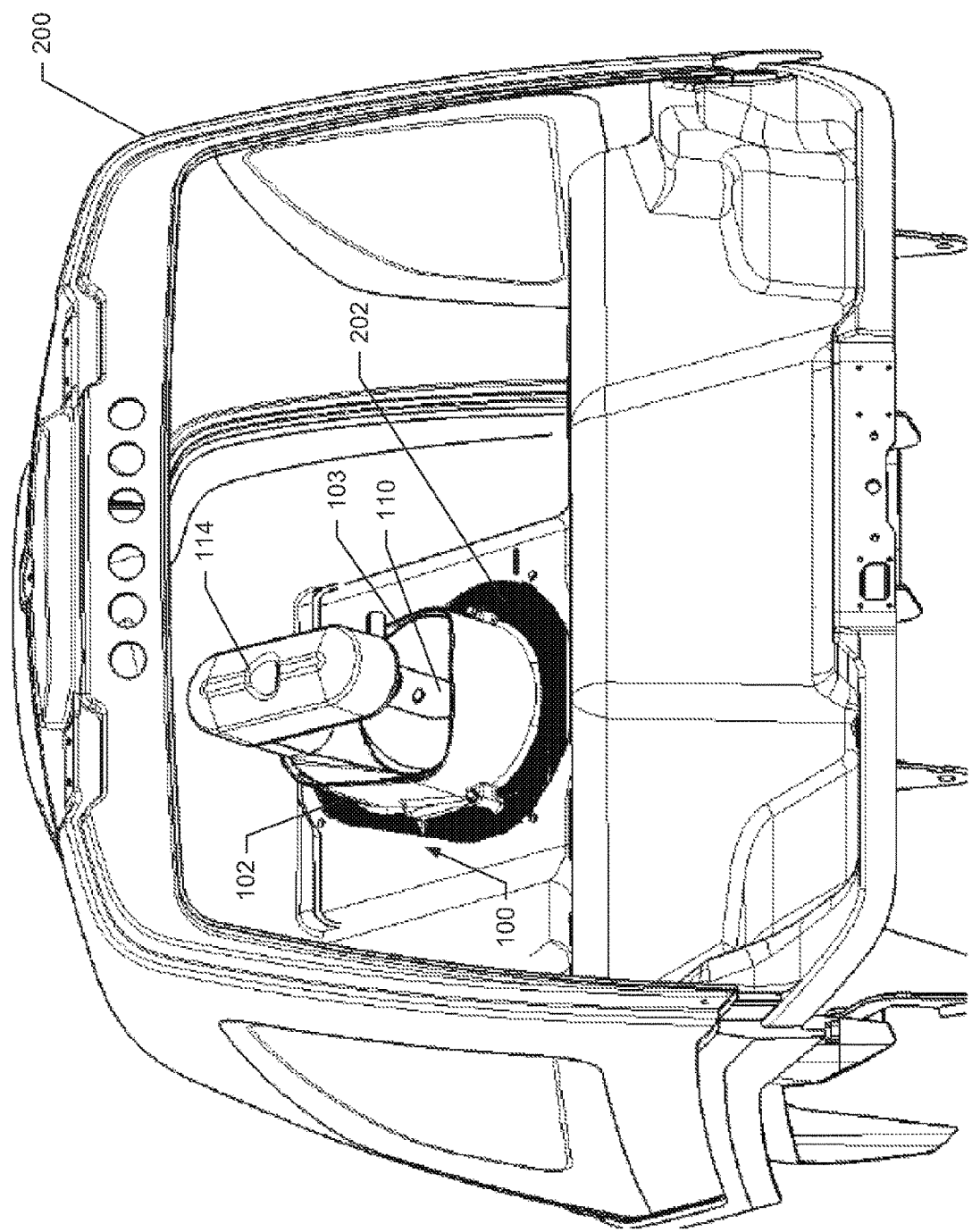
Figure 9:
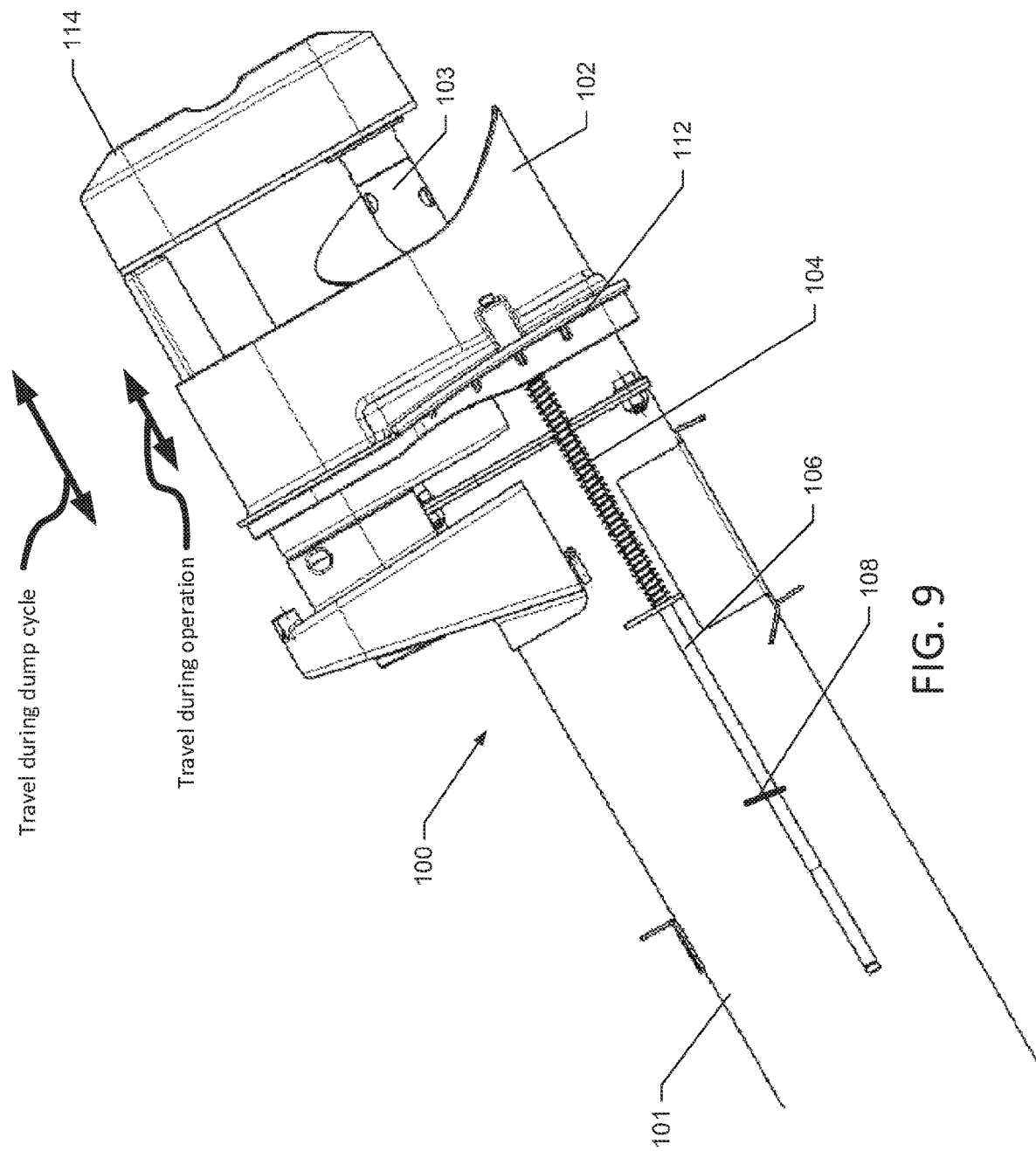
Figure 10:
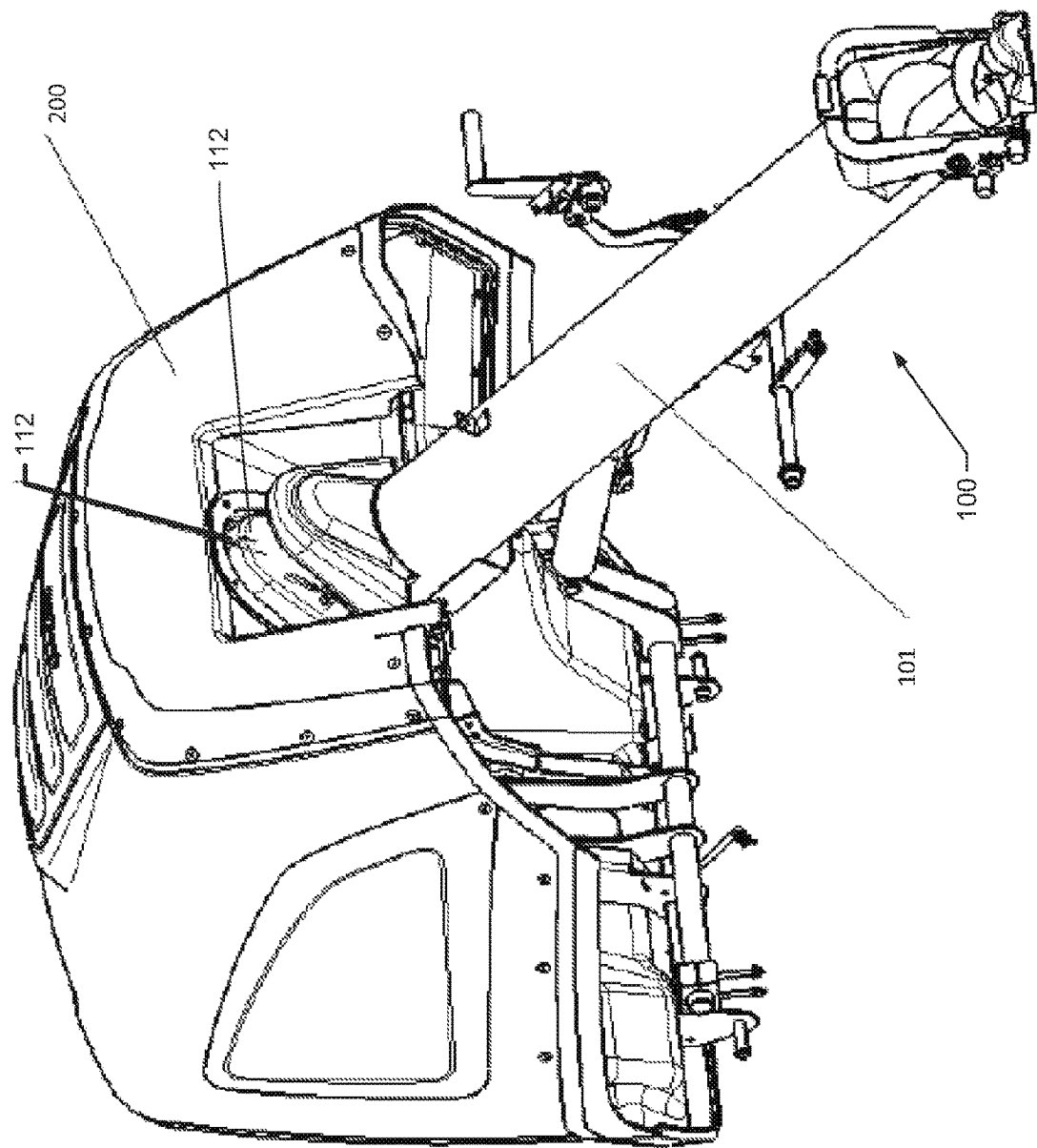
Figure 11:
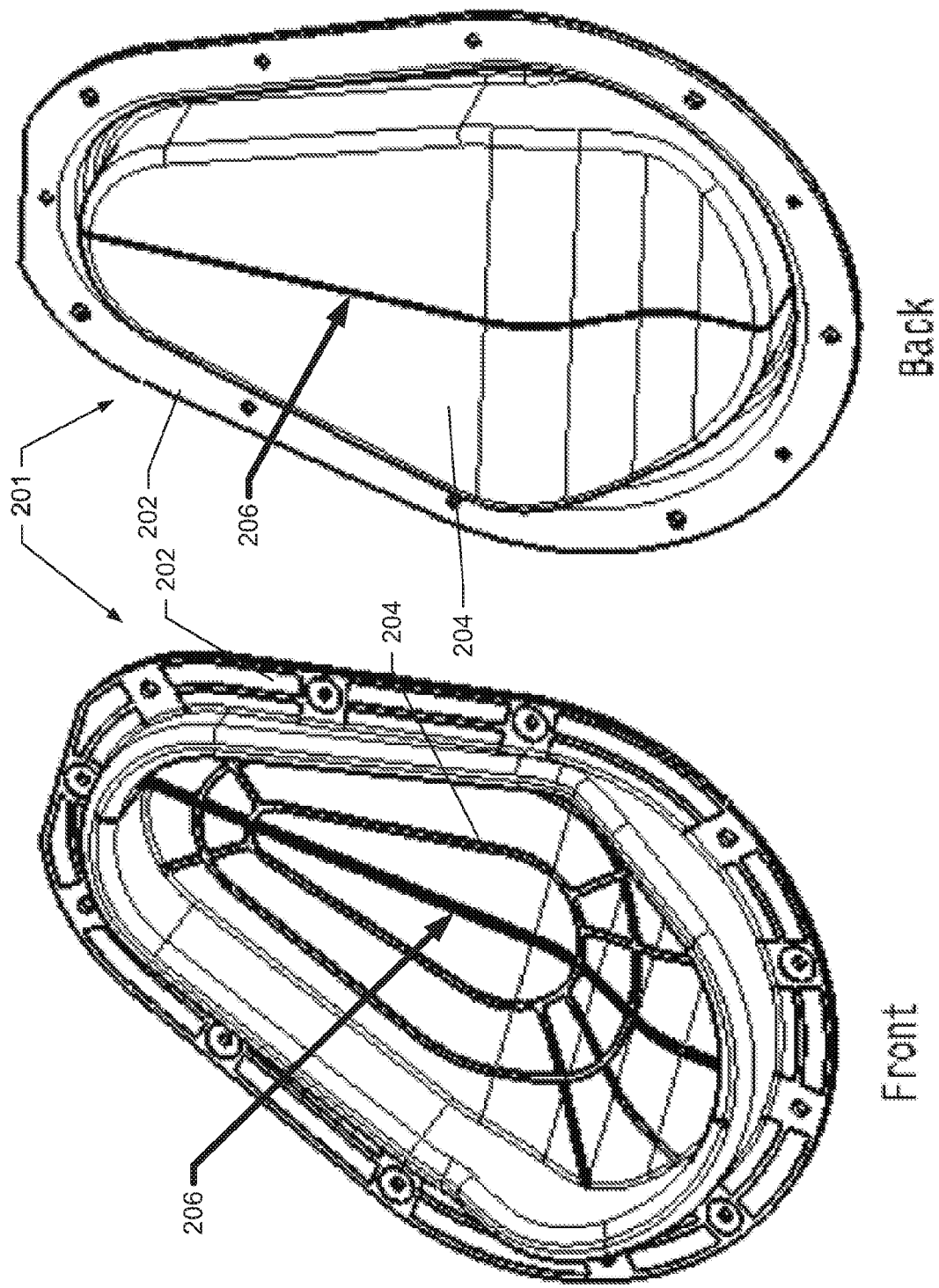
Figure 12:
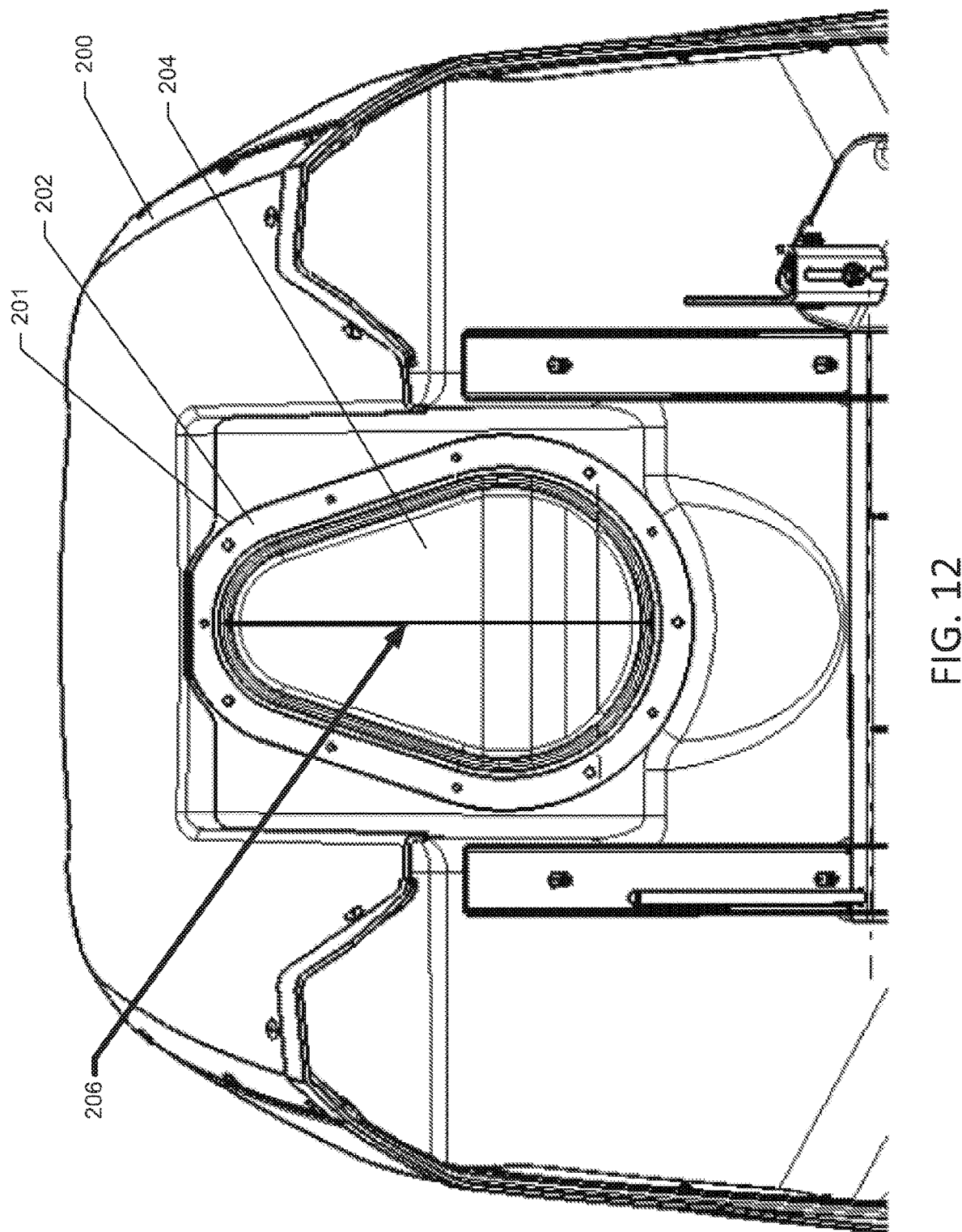
Figure 13:
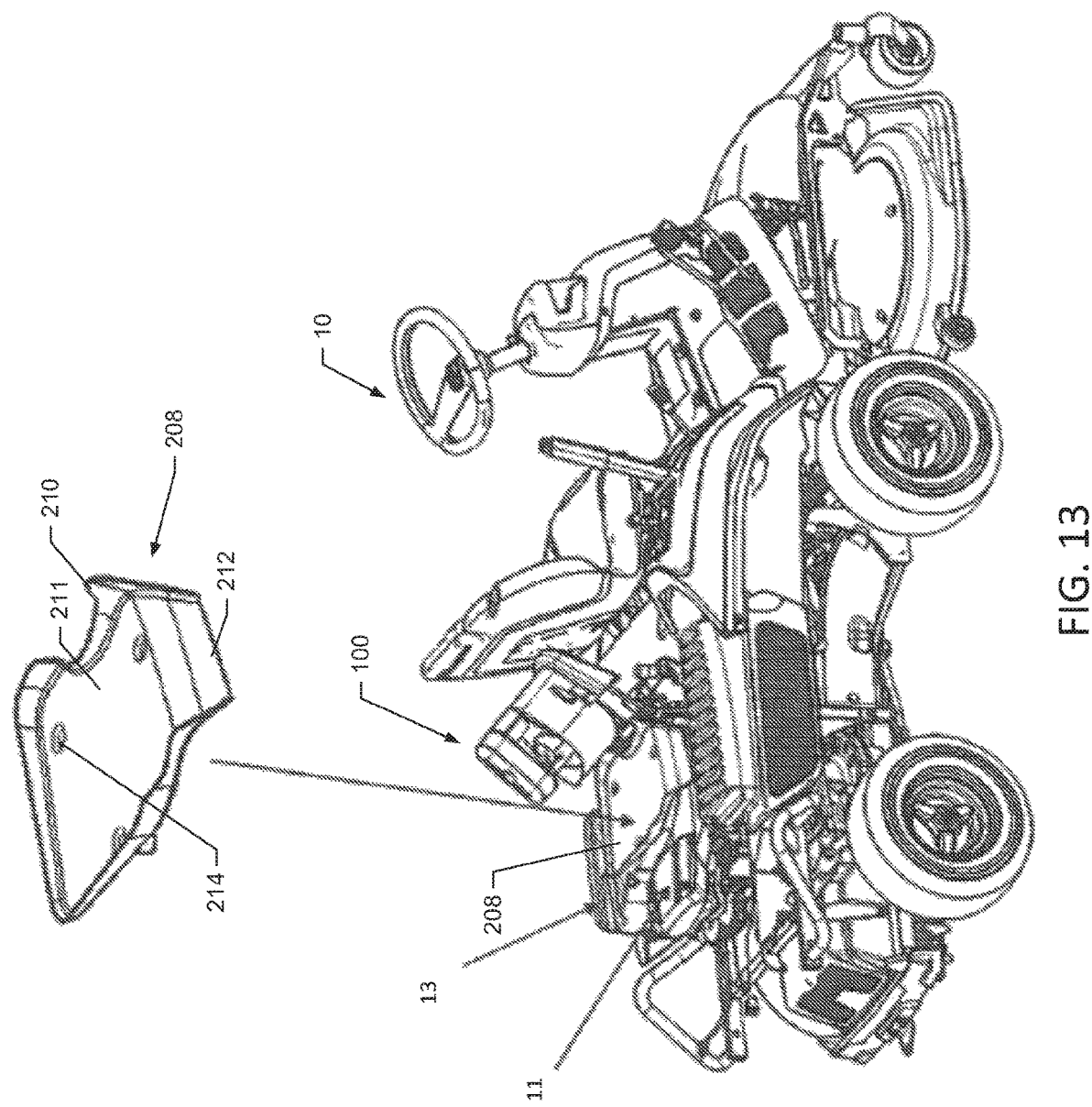
Figure 14:
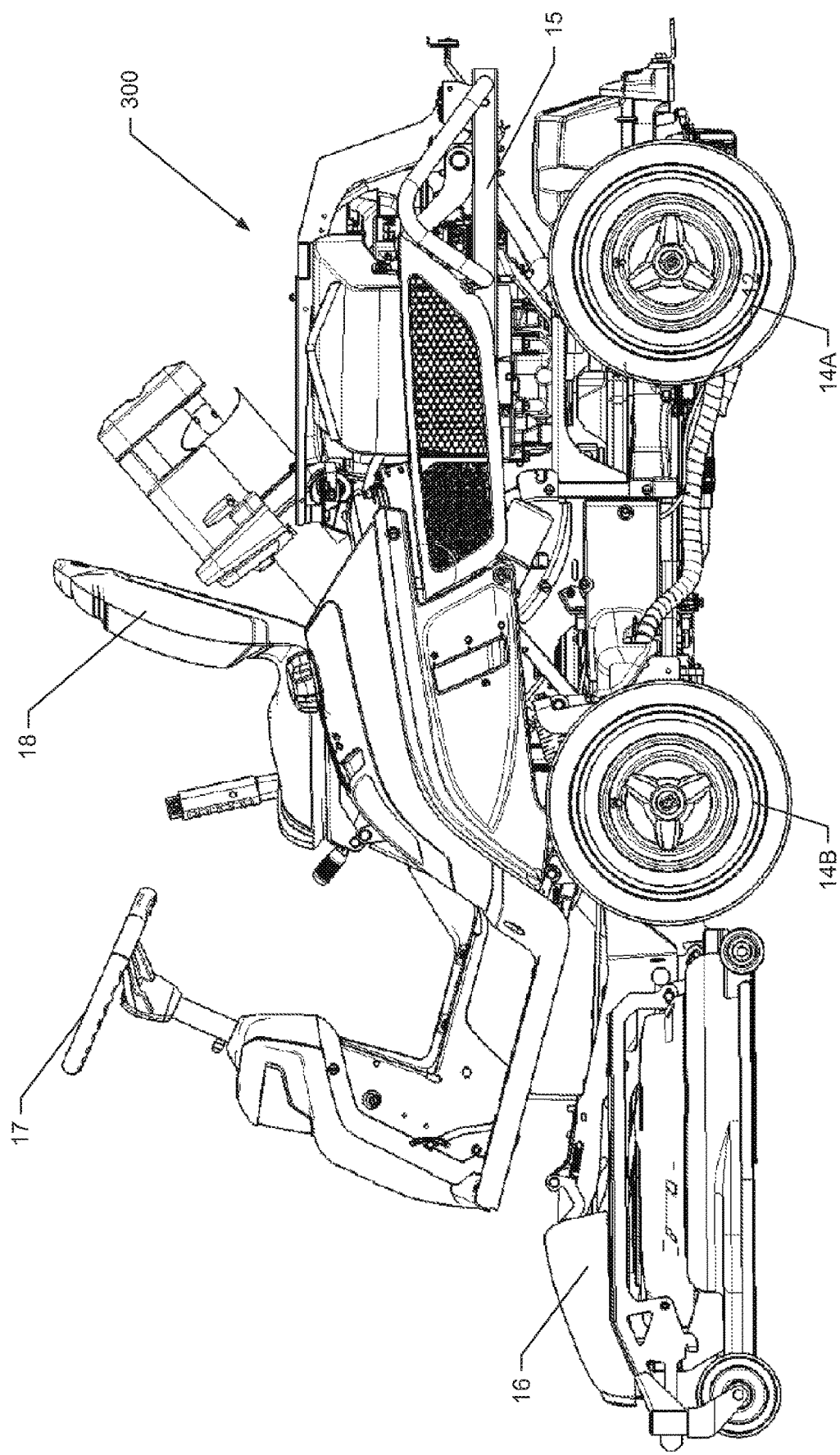
Figure 15:
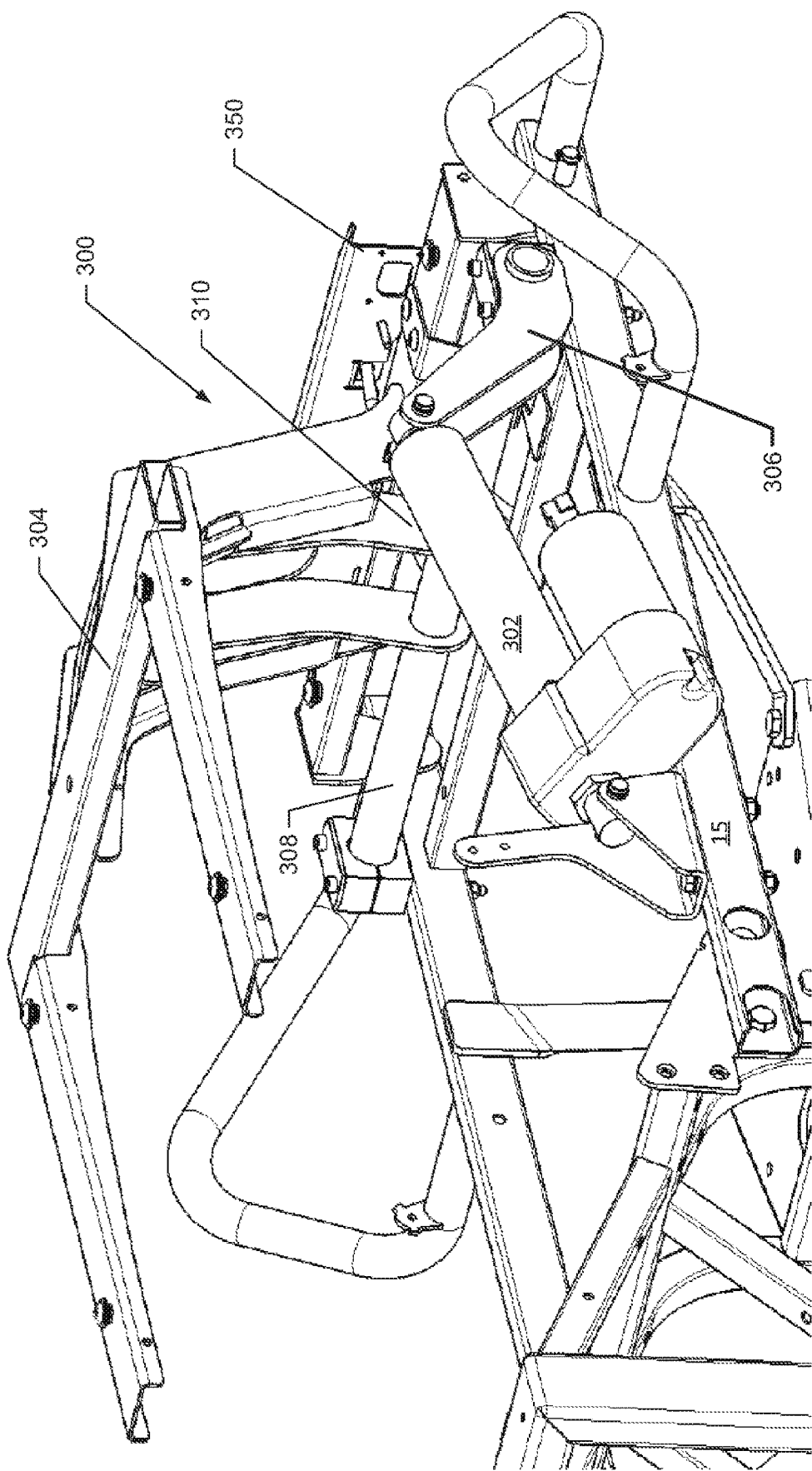
Figure 16:
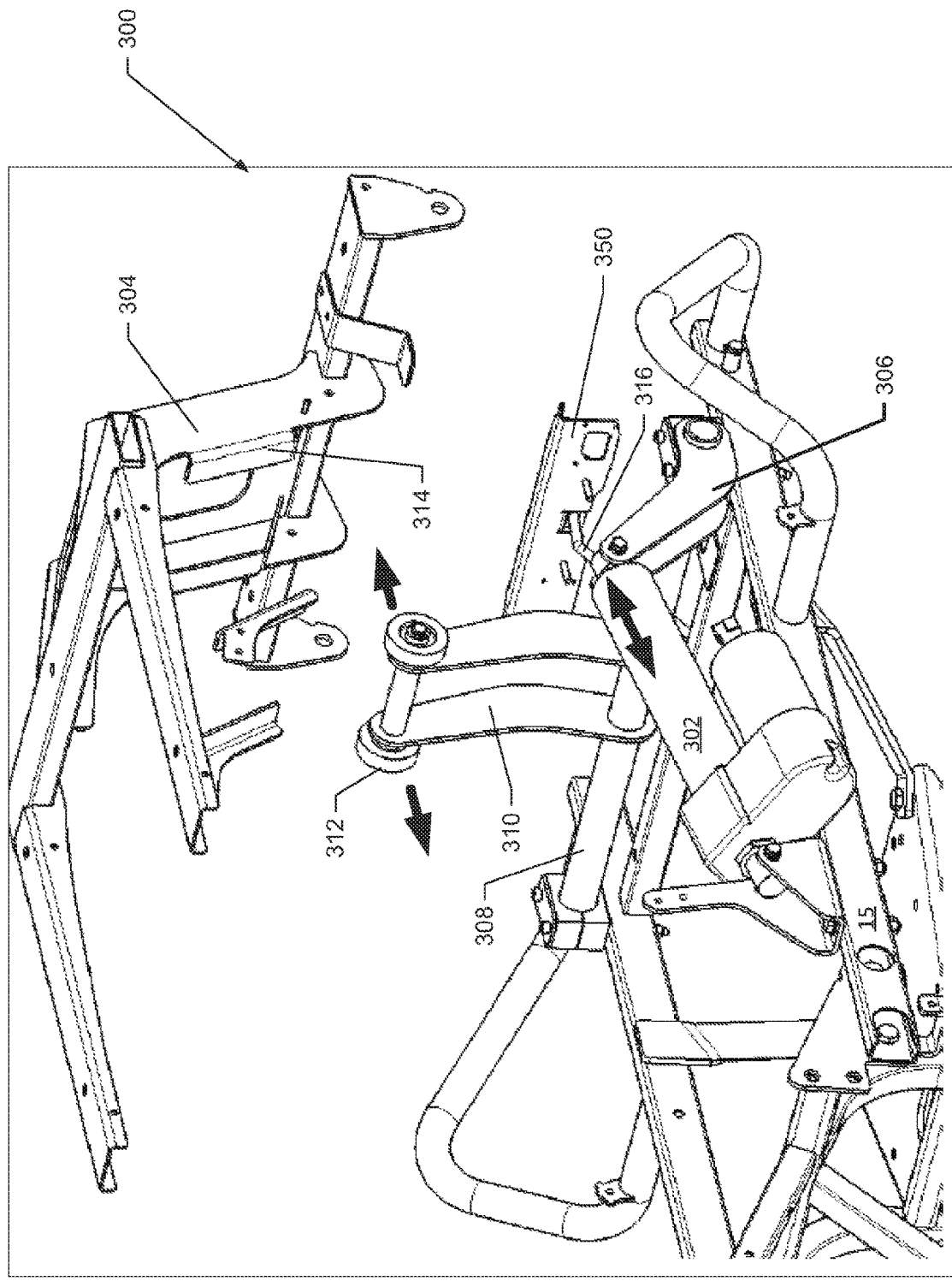
Figure 17B:
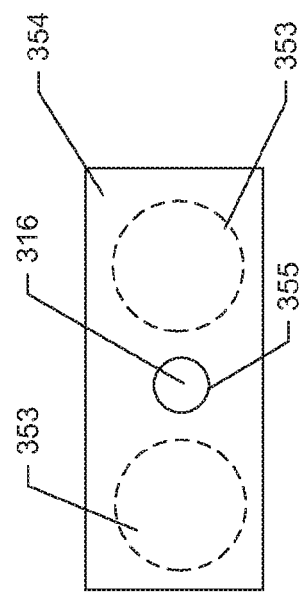
Figure 18:
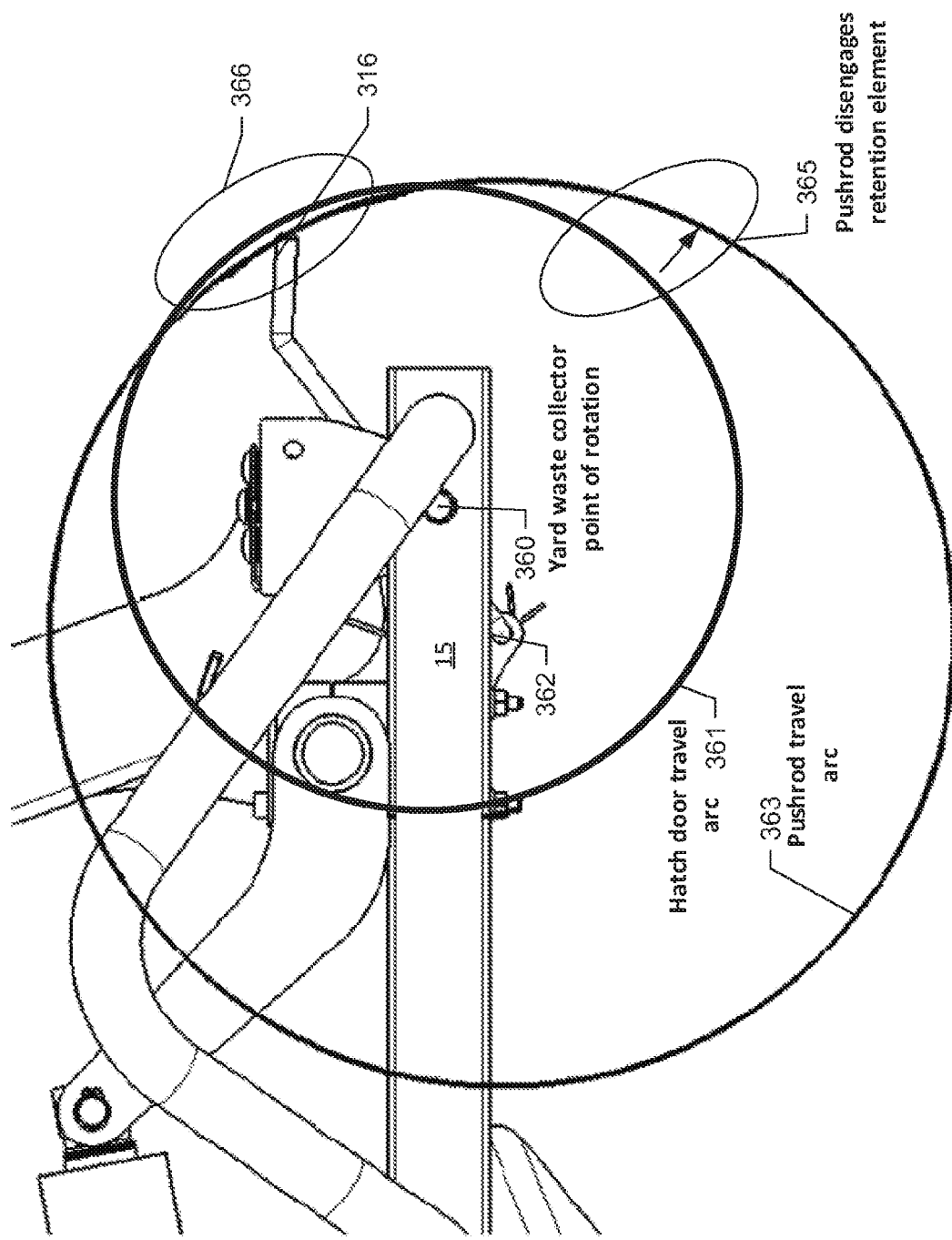
Figure 19:
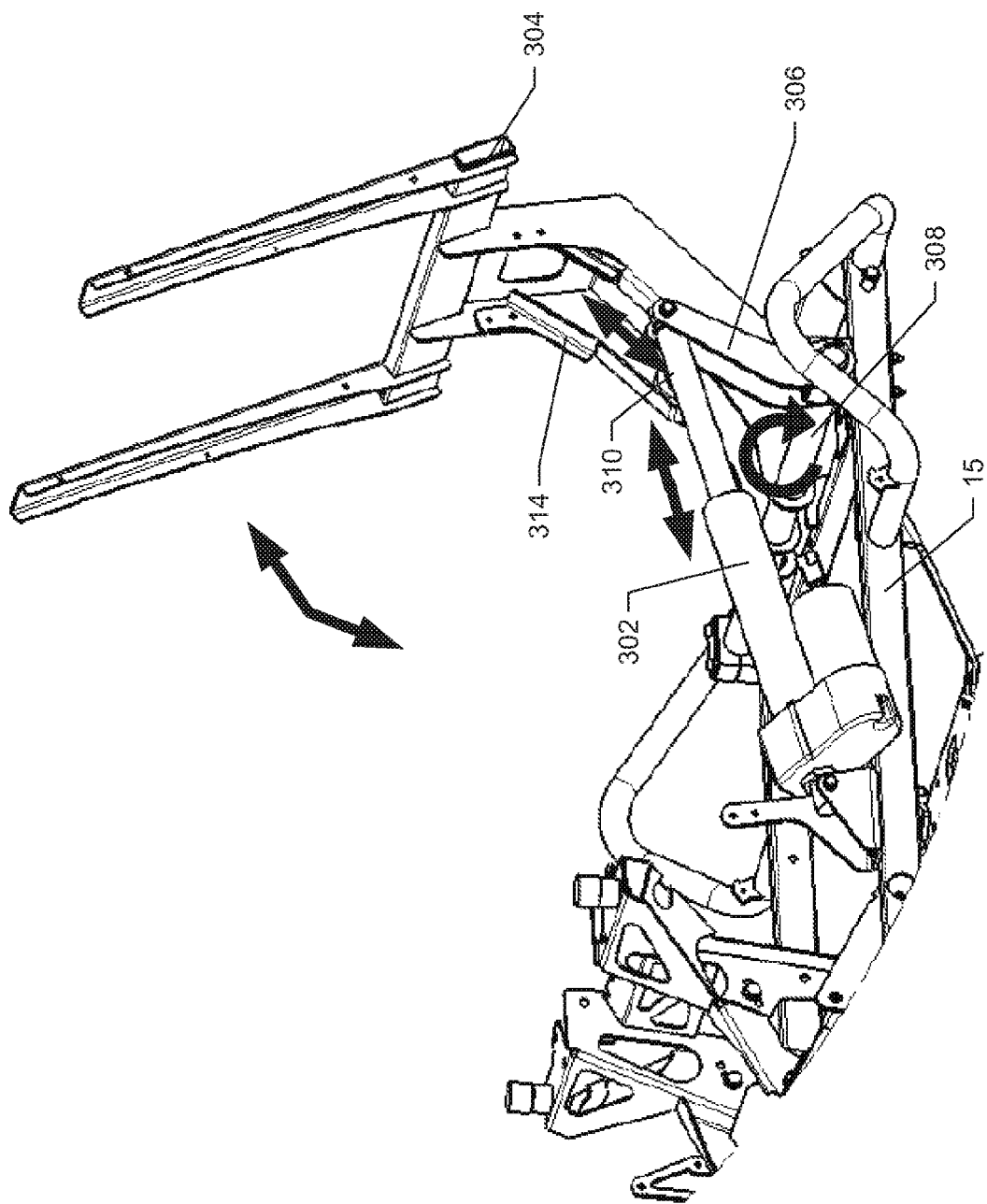
Figure 20:
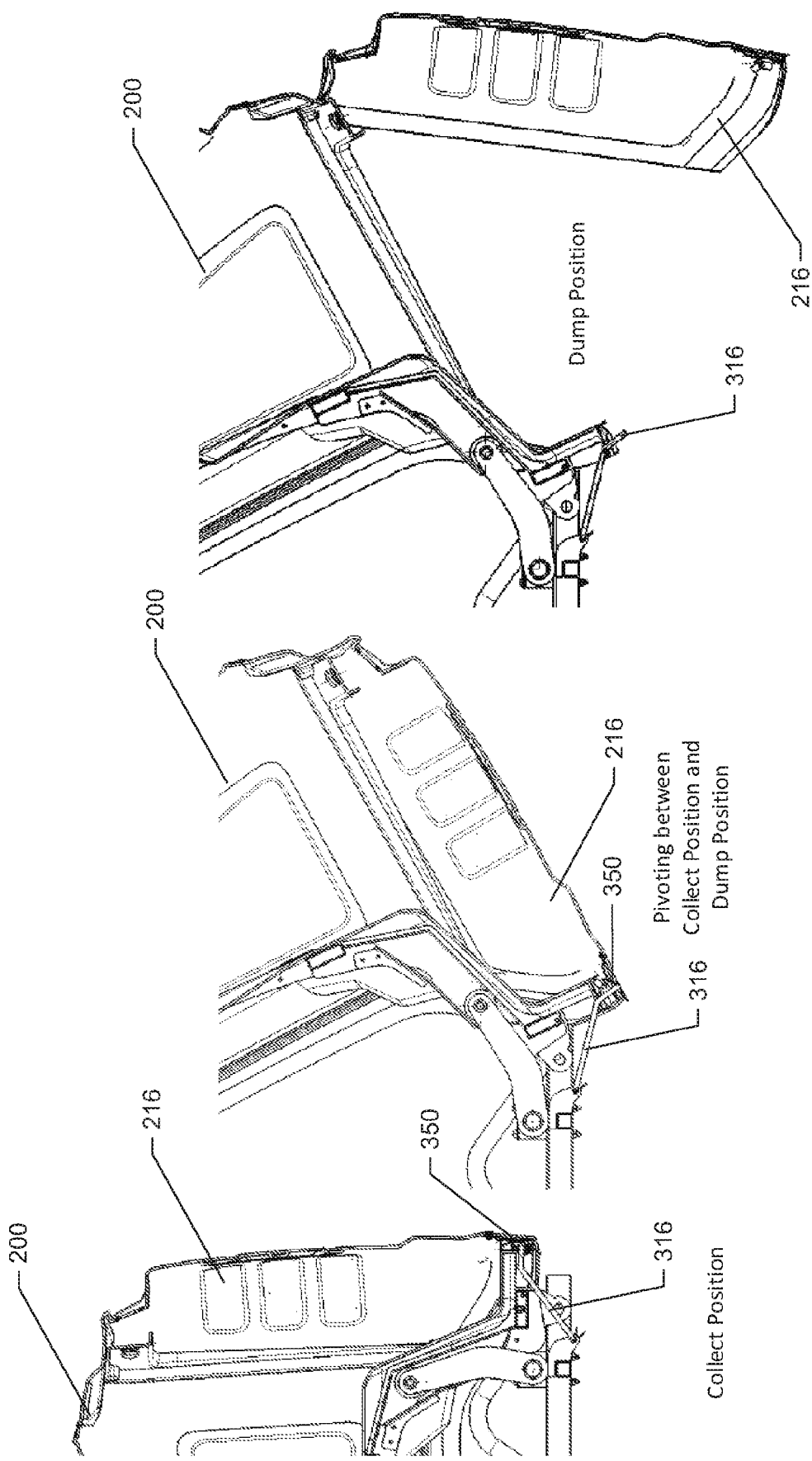
Figure 21:
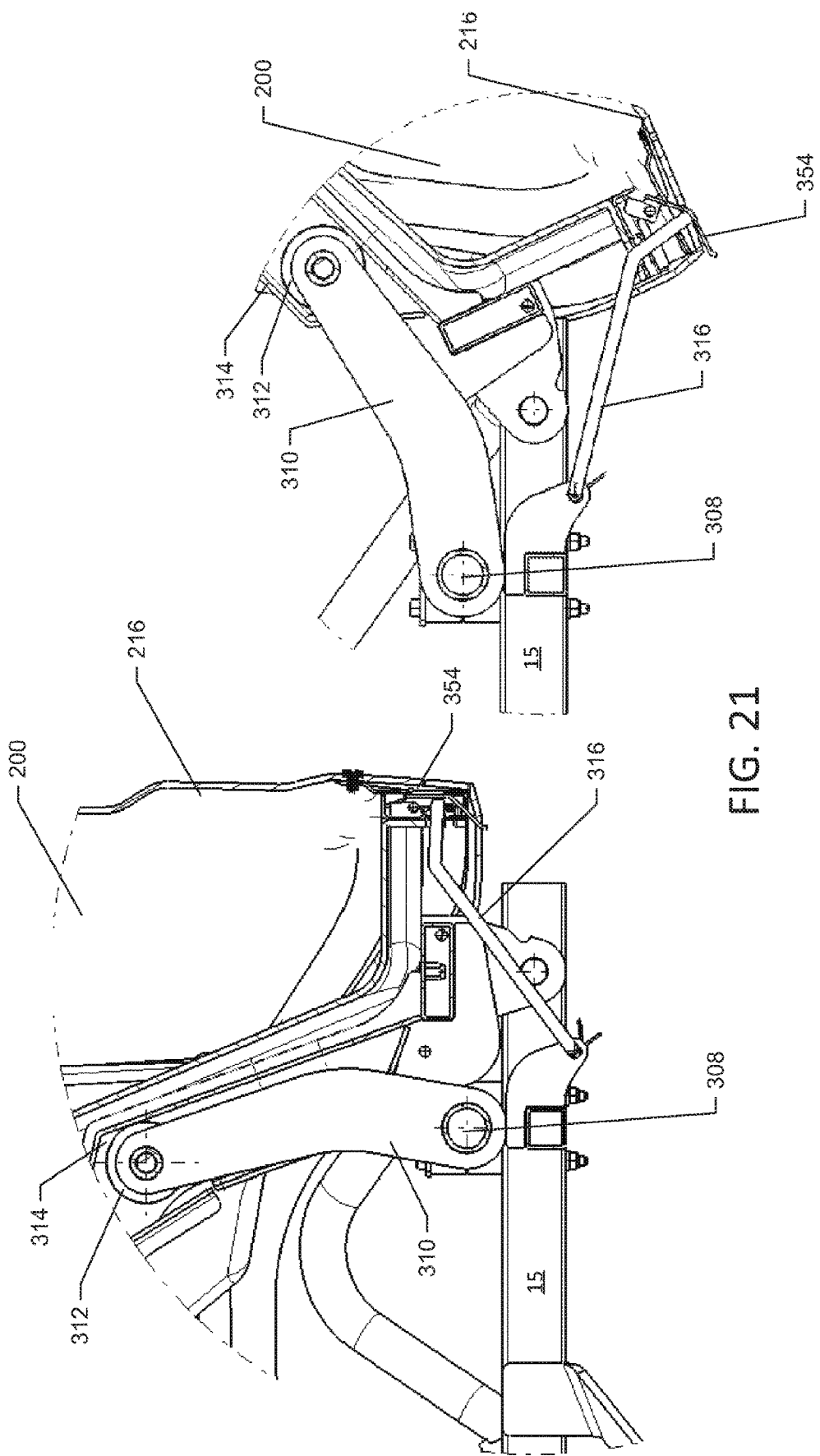
Figure 22:
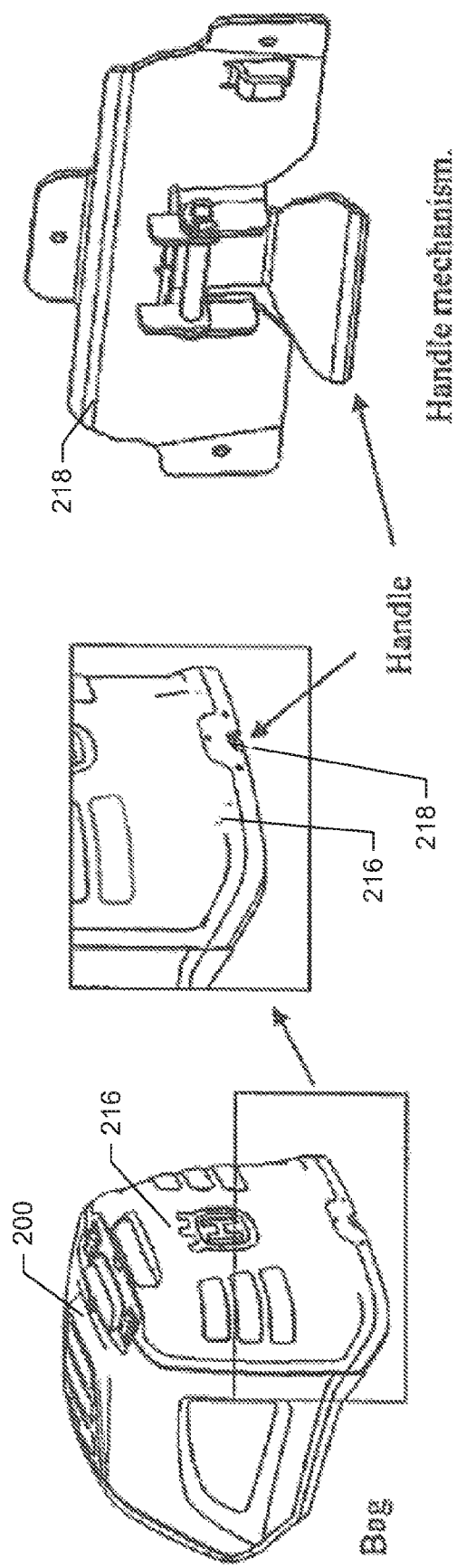
Figure 23A:
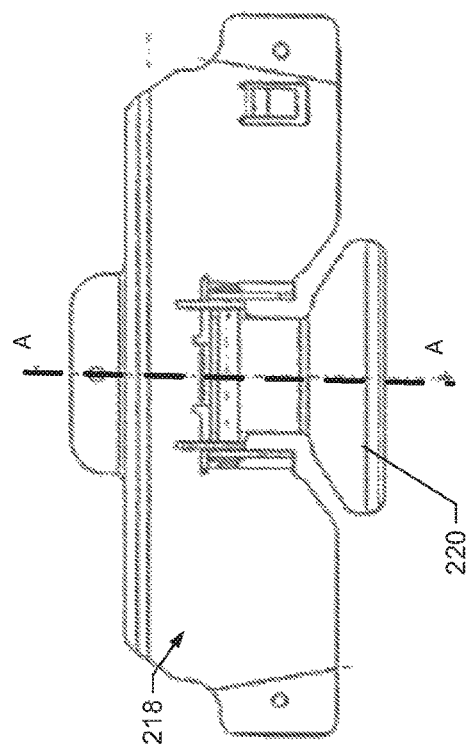
Figure 23B:
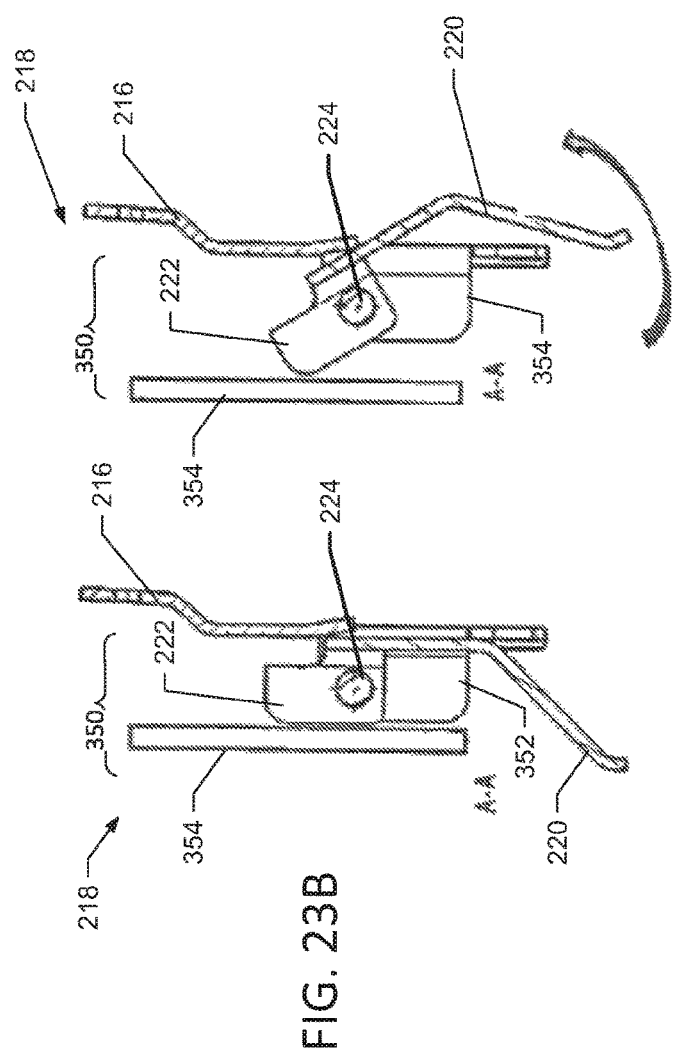
Figure 24:
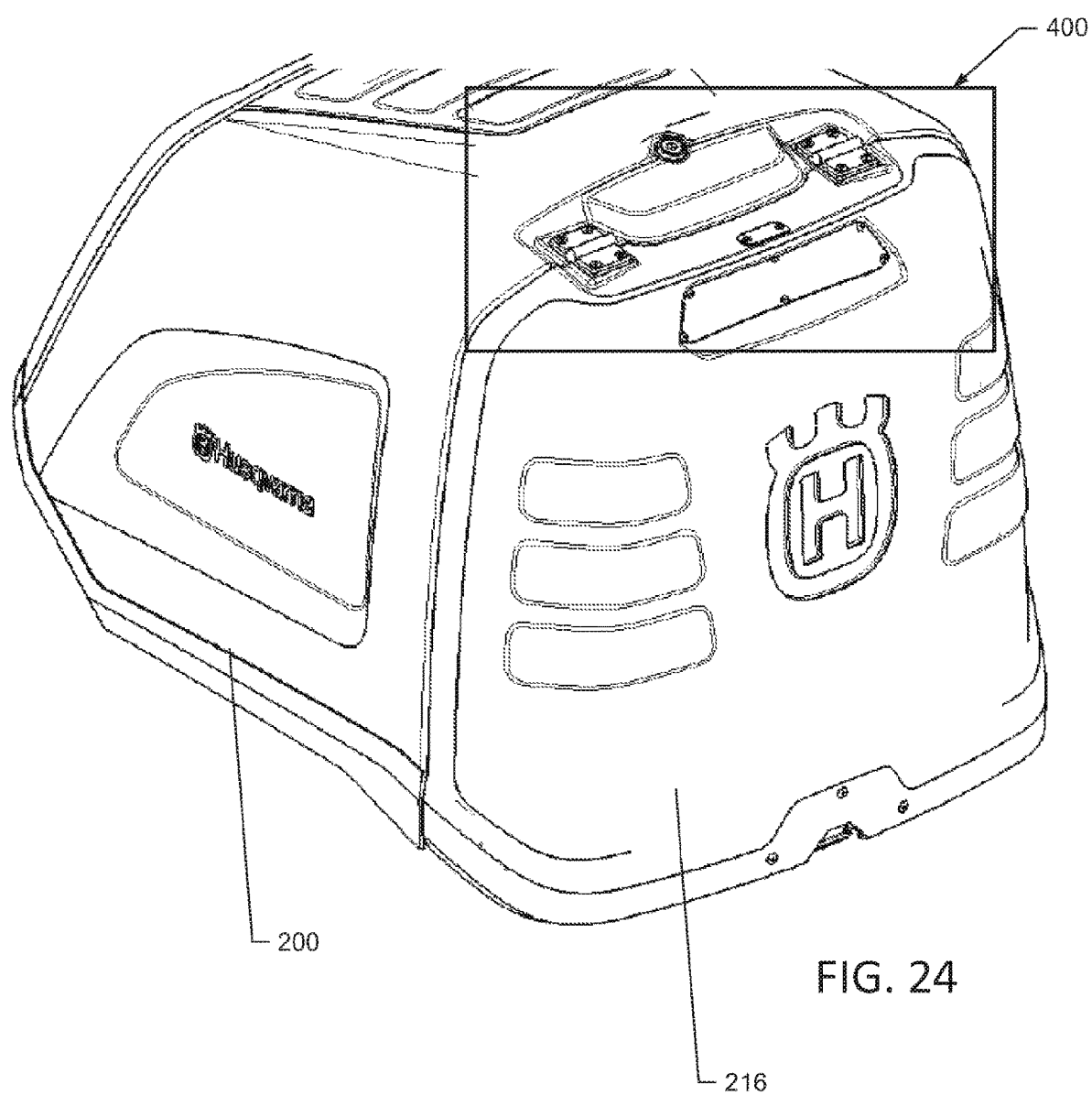
Figure 25:
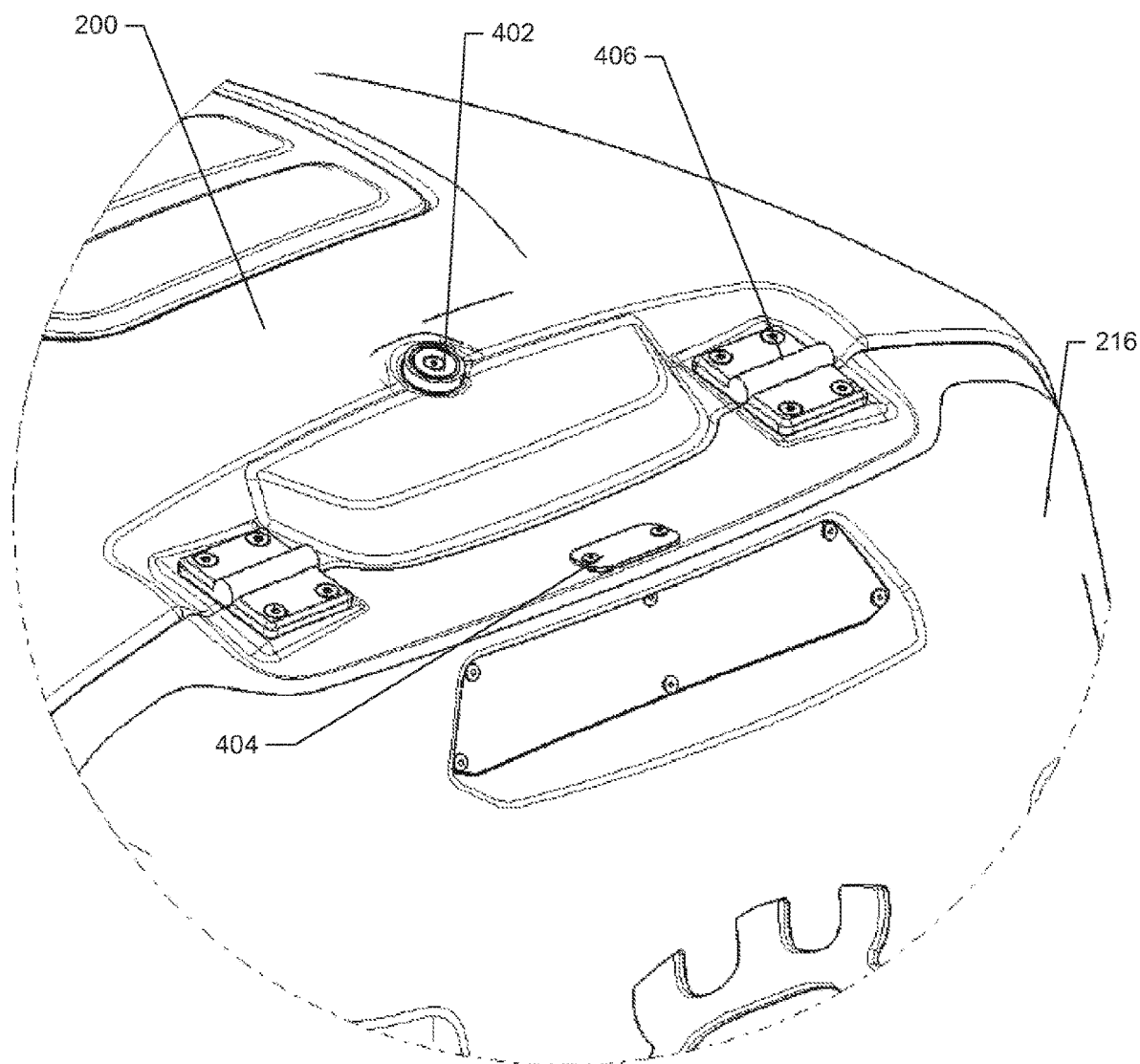
Figure 26:
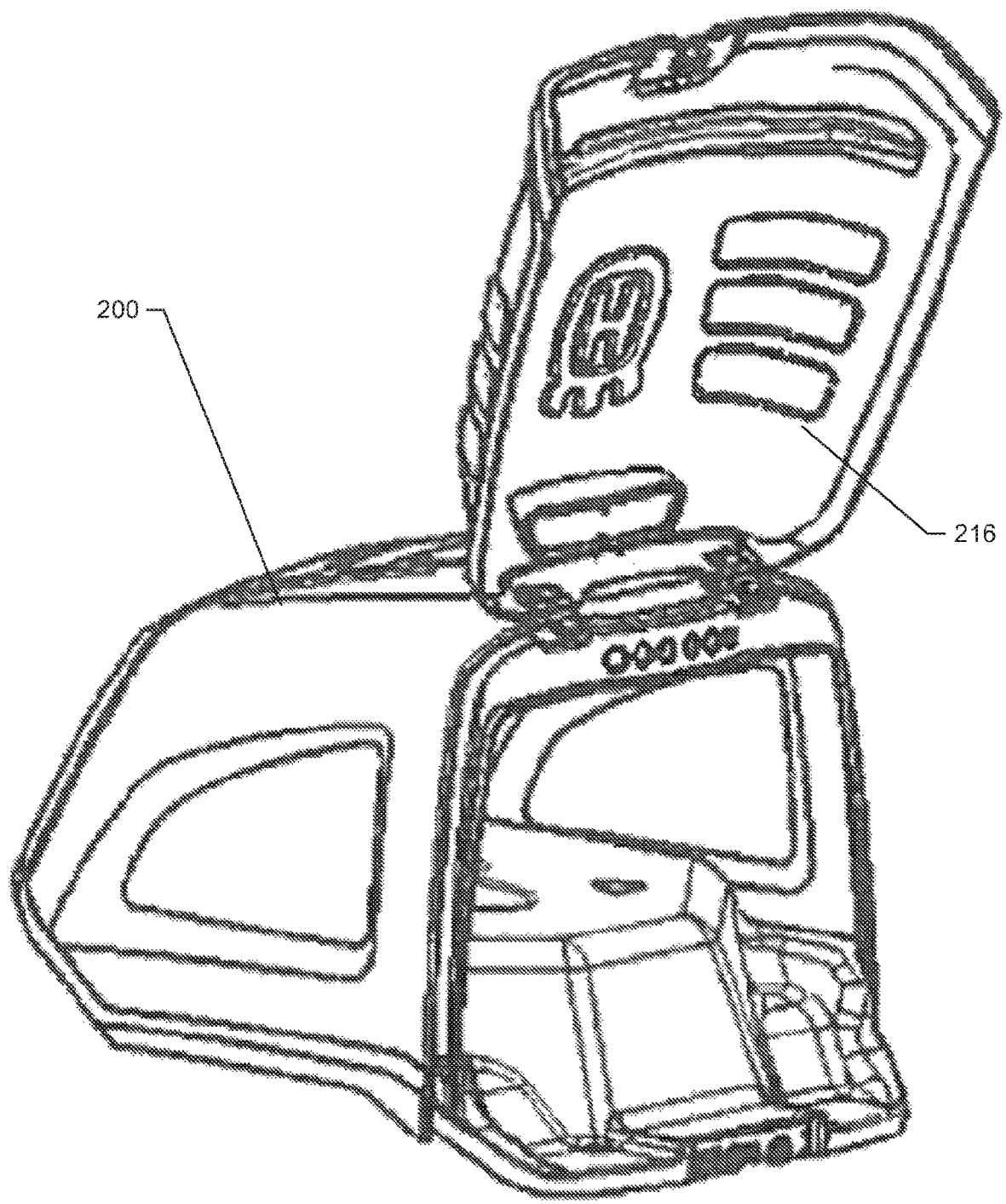
Figure 27:
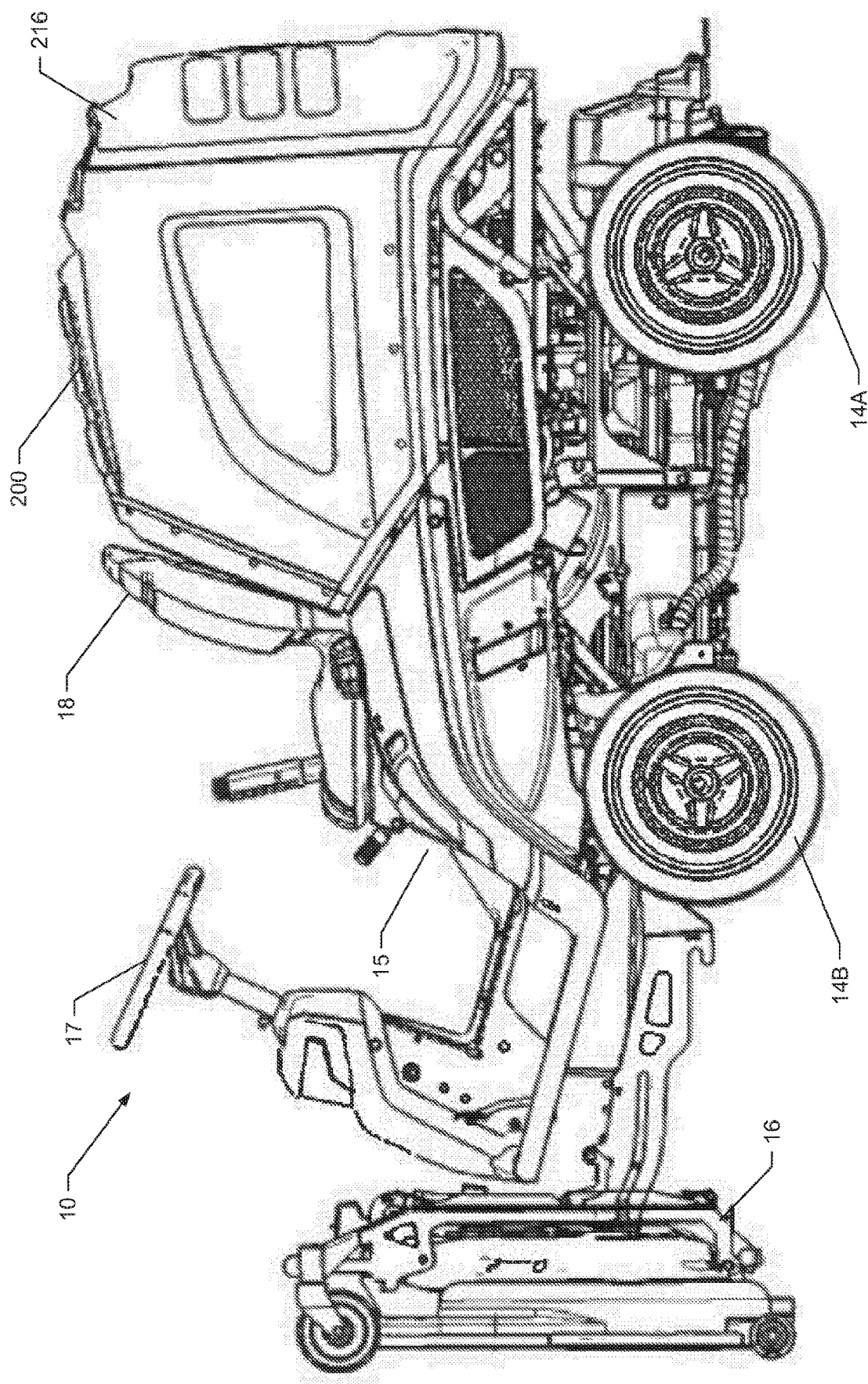
Figure 28:
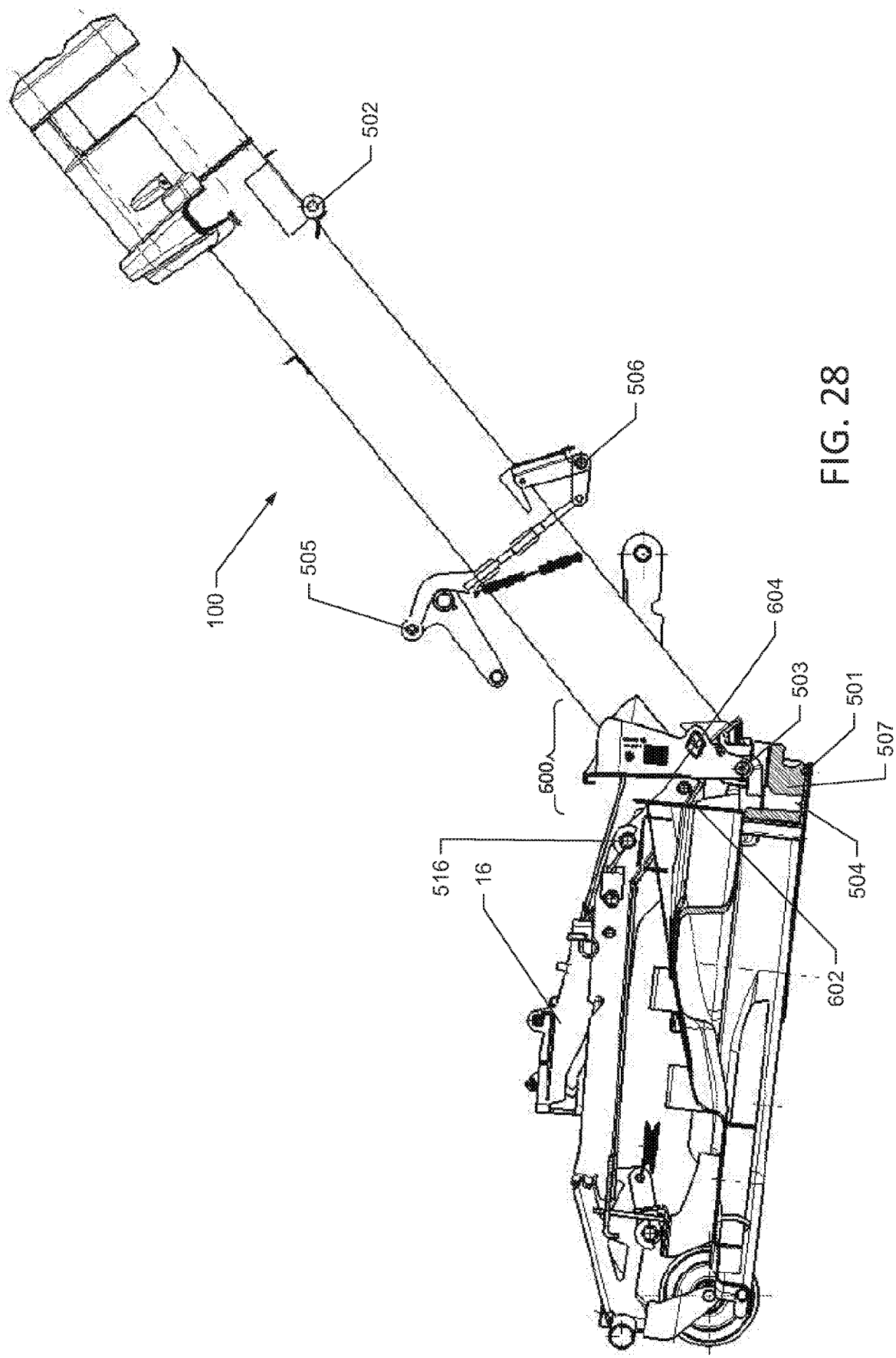
Figure 29A:
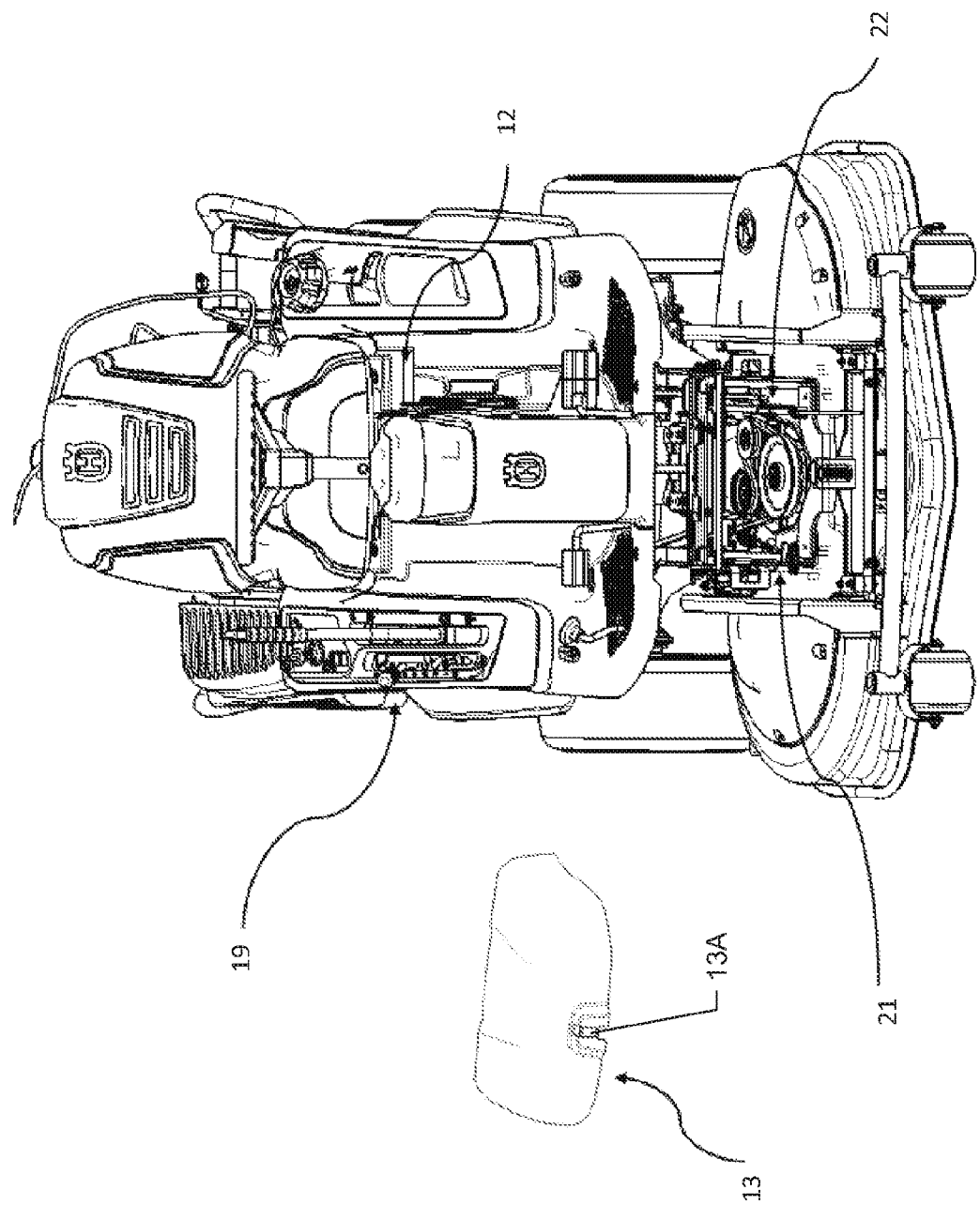

FIG. 8. illustrates a rear view of the conveyor inserted into the yard waste collector according to another example embodiment;

FIG. 9 illustrates ranges of travel of the telescopic seal according to an example embodiment;

FIG. 10 illustrates a front perspective view of the conveyor inserted into the yard waste collector according to another example embodiment;

FIG. 11 illustrates a flexible seal according to an example embodiment;

FIG. 12 illustrates a front view of the flexible seal installed in the yard waste collector according to an example embodiment;

FIG. 13 illustrates a side view of the lawn care vehicle with the yard waste collector removed and an air inlet plate enlarged according to an example embodiment;

FIG. 14 illustrates a side view of the lawn care vehicle with side panels and the yard waste collector removed according to an example embodiment;

FIG. 15 illustrates a perspective view of a yard waste dump assembly according to an example embodiment;

FIG. 16 illustrates an exploded view of the yard waste dump assembly according to an example embodiment;

FIG. 17A illustrates a pushrod and retention element of the yard waste dump assembly according to an example embodiment;

FIG. 17B illustrates a portion of a retention element including a guide hole for a pushrod according to an example embodiment;

FIG. 18 illustrates travel arcs of the push rod and a yard waste collector hatch door according to an example embodiment;

FIG. 19 illustrates operation of the yard waste dump assembly according to an example embodiment;

FIGS. 20A-21 illustrate operations of the pushrod and yard waste collector hatch door according to an example embodiment;

FIGS. 22, 23A, and 23B illustrate a handle mechanism for the hatch door of the yard waste collector hatch door according to an example embodiment;

FIGS. 24-26 illustrate a retention element for the hatch door of the yard waste collector hatch door according to an example embodiment;

FIG. 27 illustrates a side view of the lawn care vehicle with the cutting deck in a service position according to an example embodiment;

FIG. 28 illustrates a side view of the conveyor and cutting deck with the conveyor in a service position according to an example embodiment;

FIG. 29A illustrates a front view of the lawn care vehicle with the front cover removed according to an example embodiment.

Figure 29C:
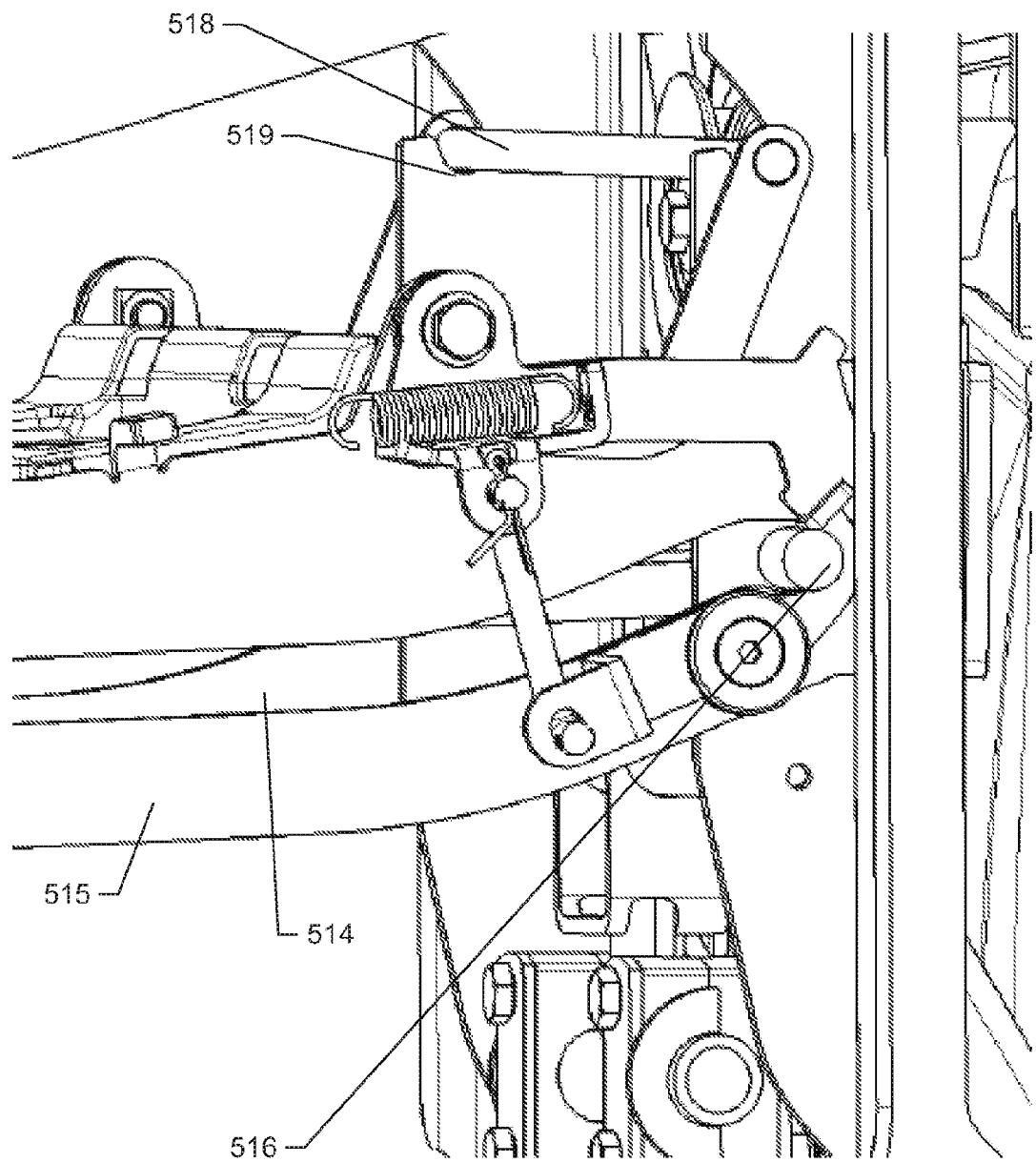
Figure 35:
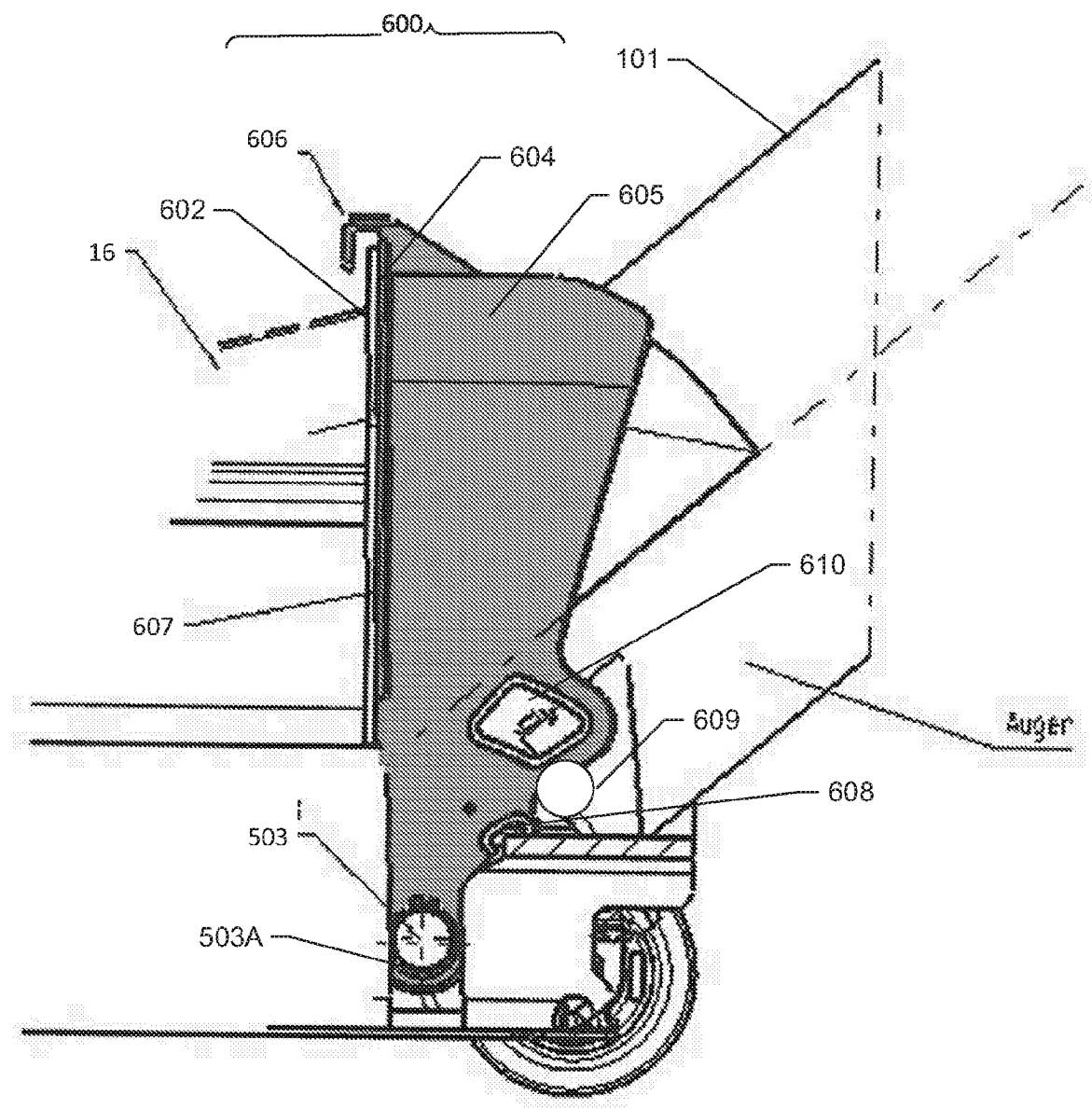
Figure 37:
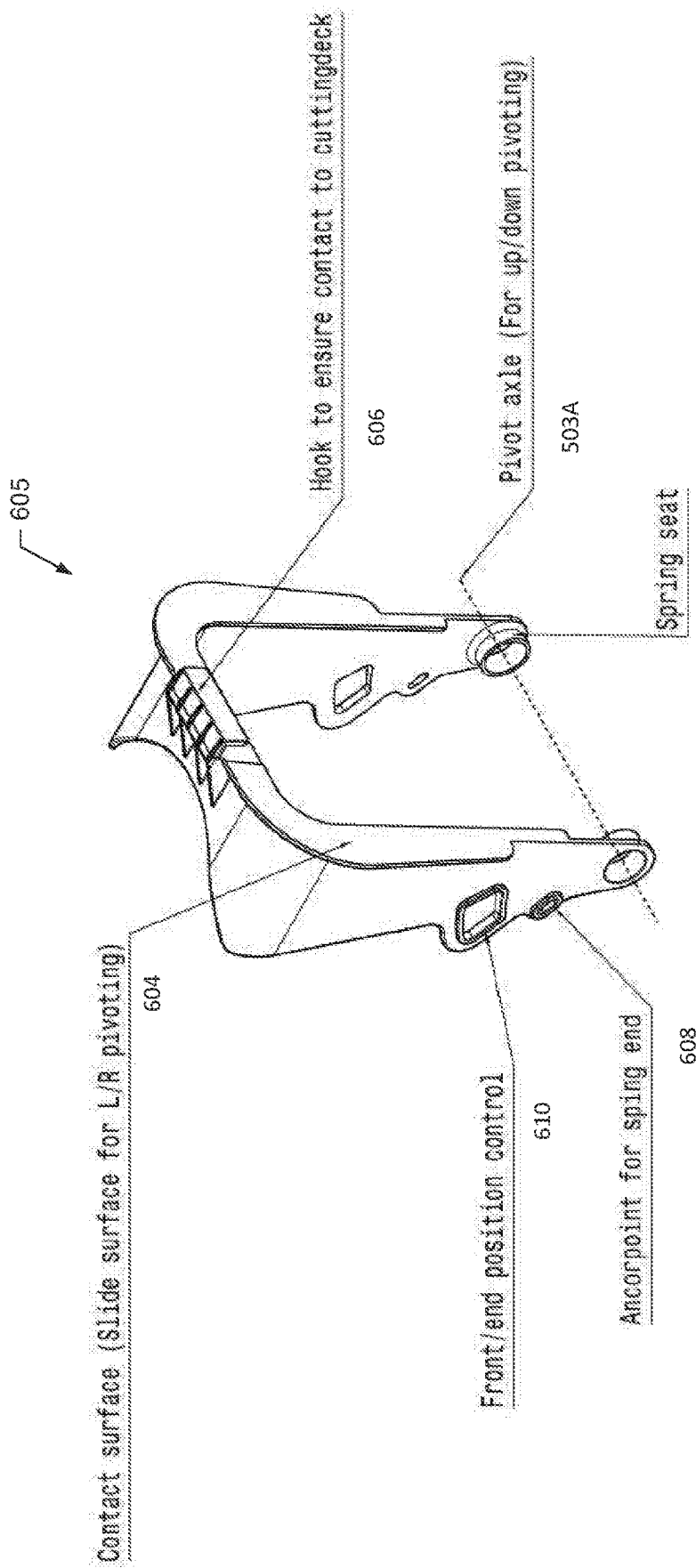
Figure 38A:
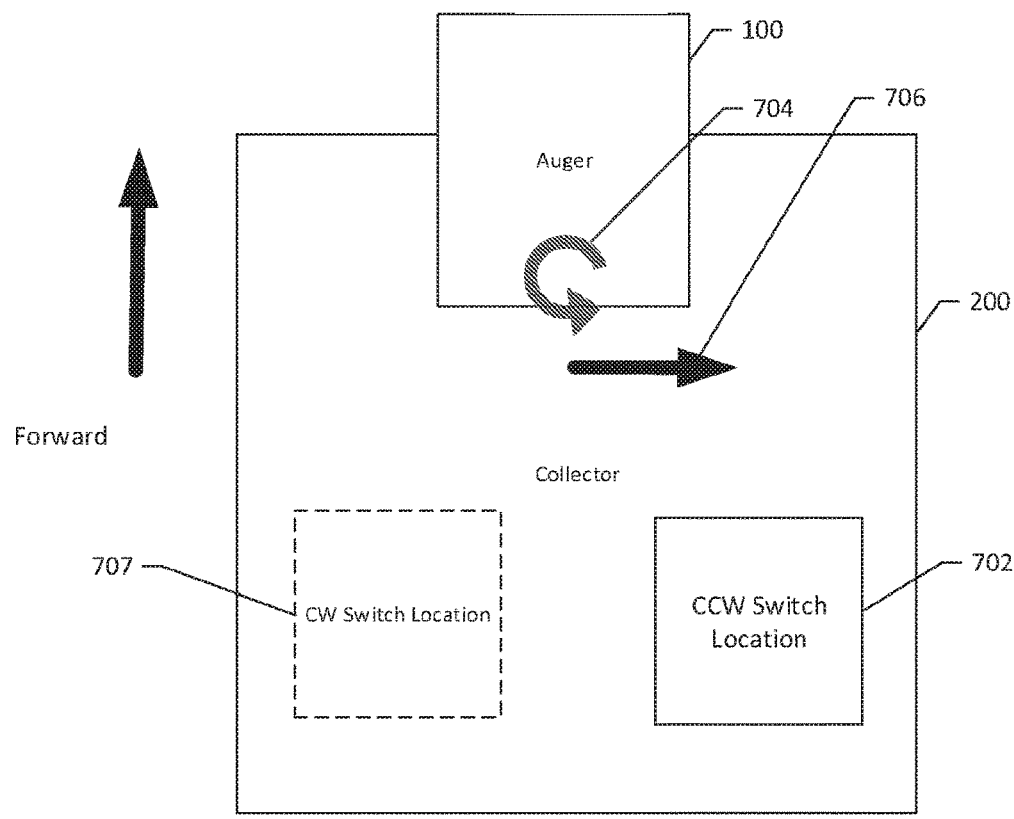
Figure 38B:
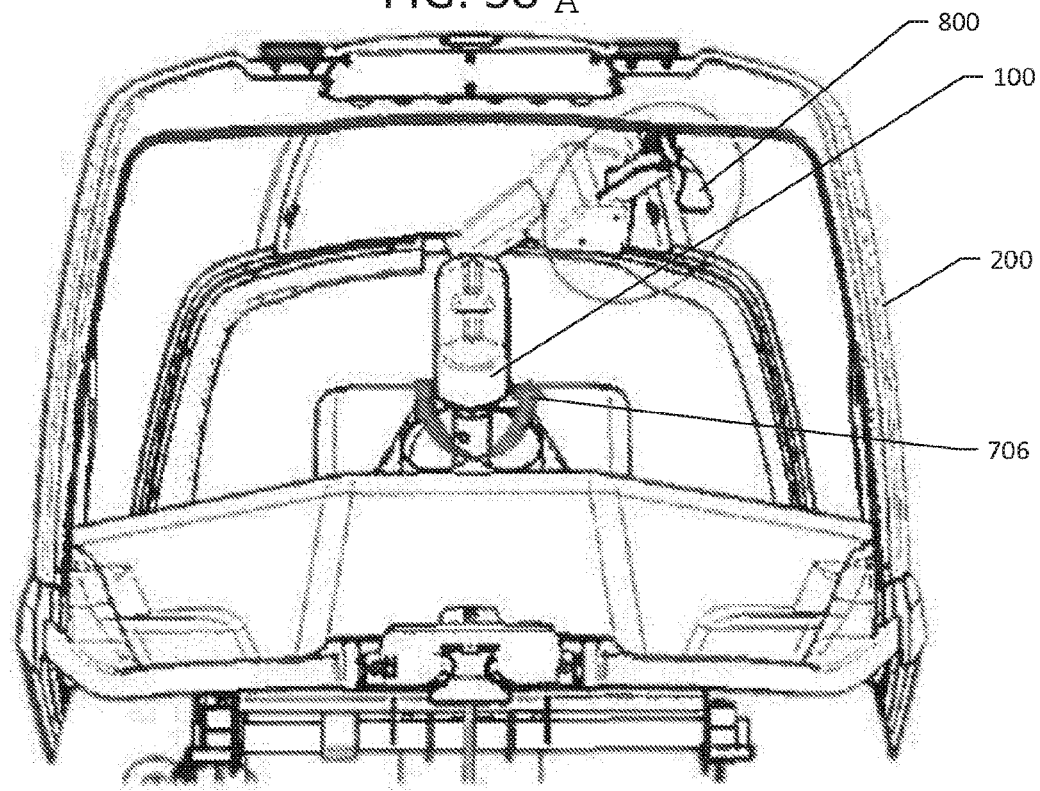
Figure 40:
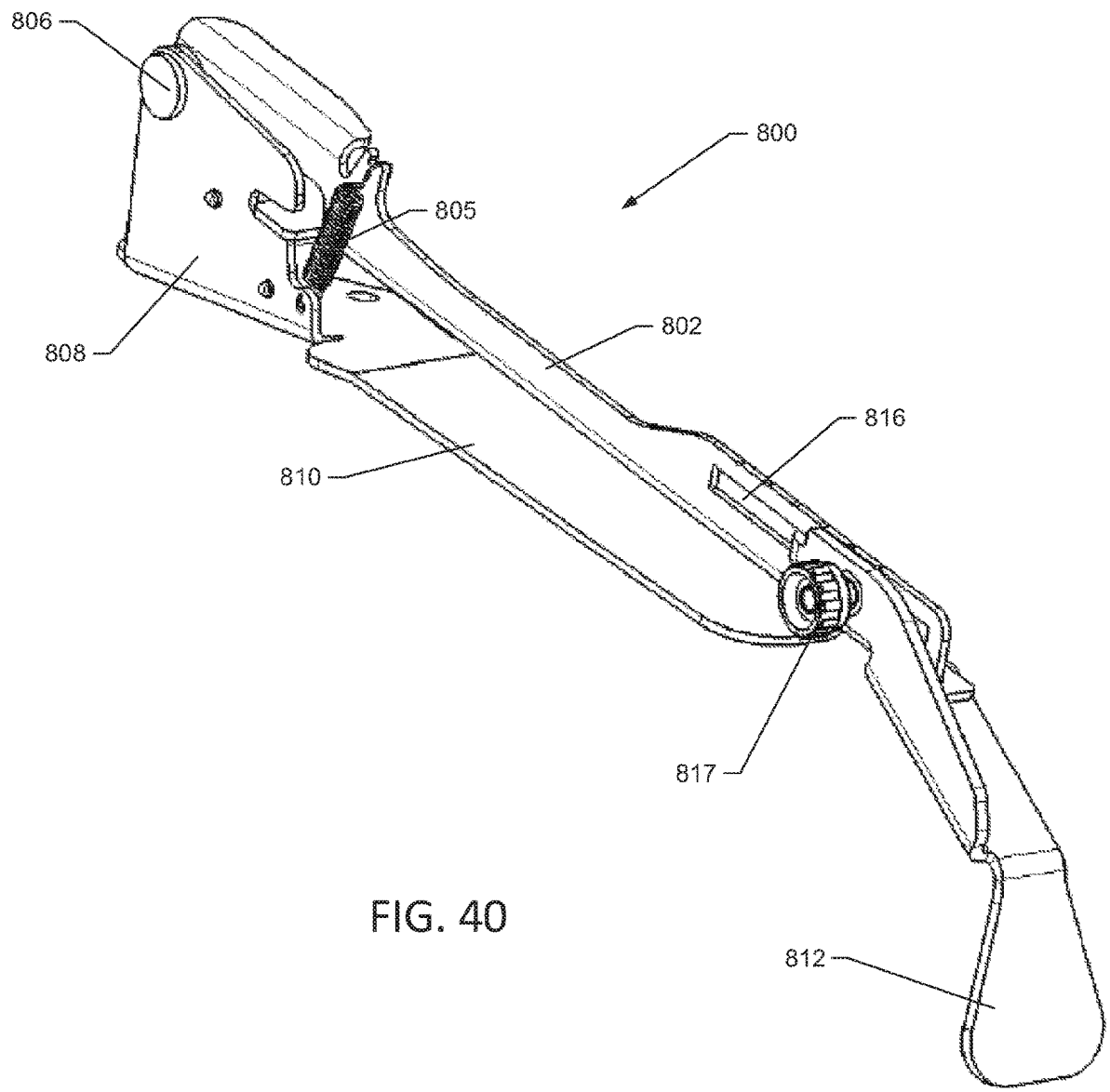
Figure 41:
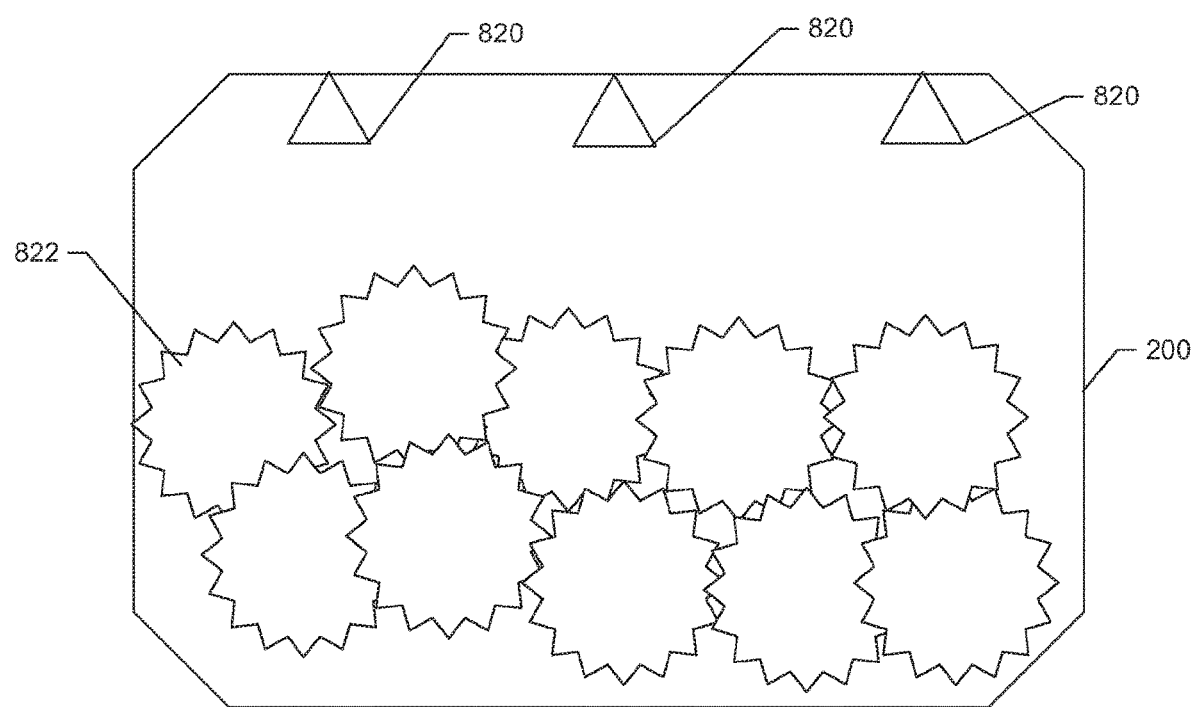
Figure 42:
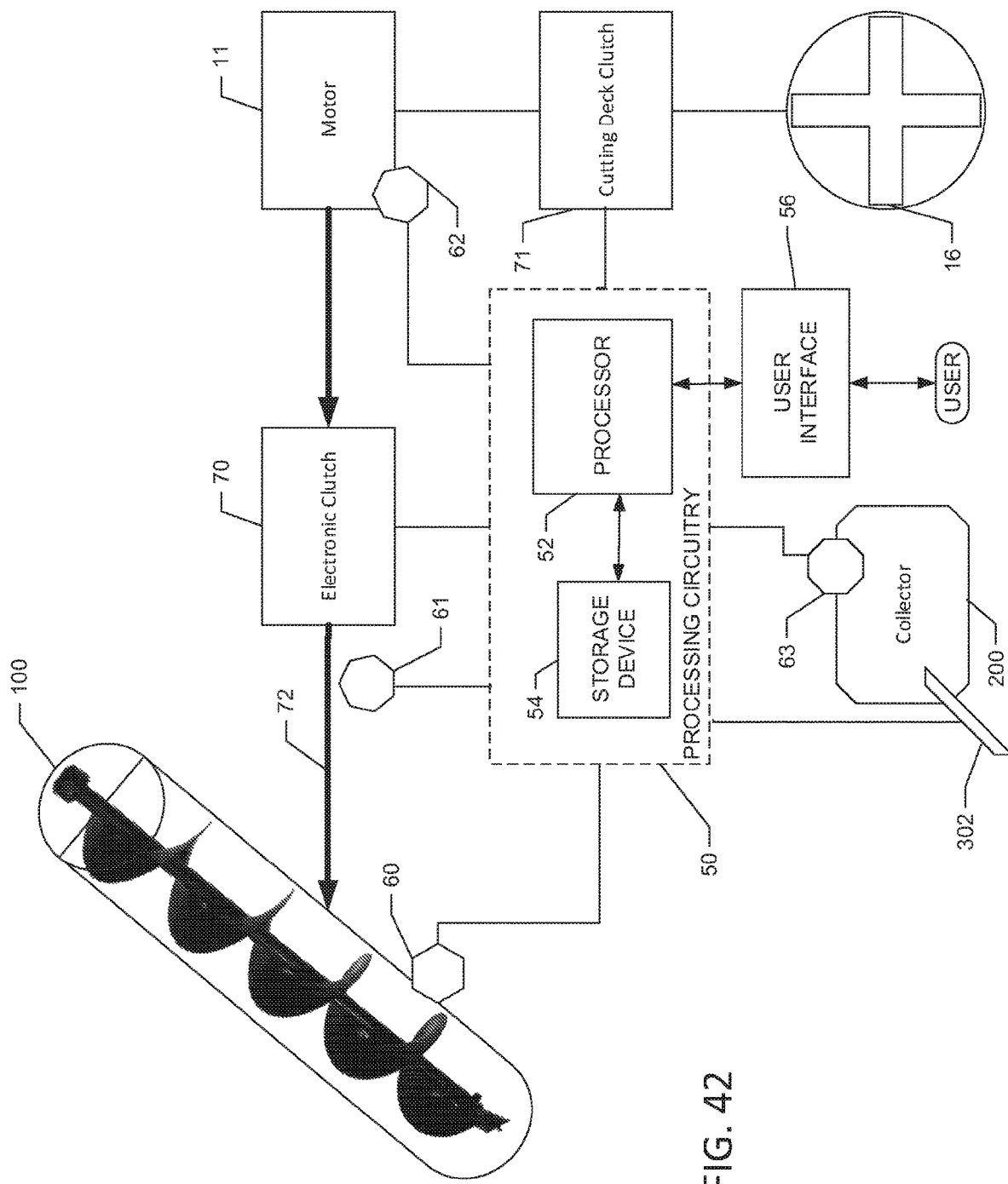
Figure 43:
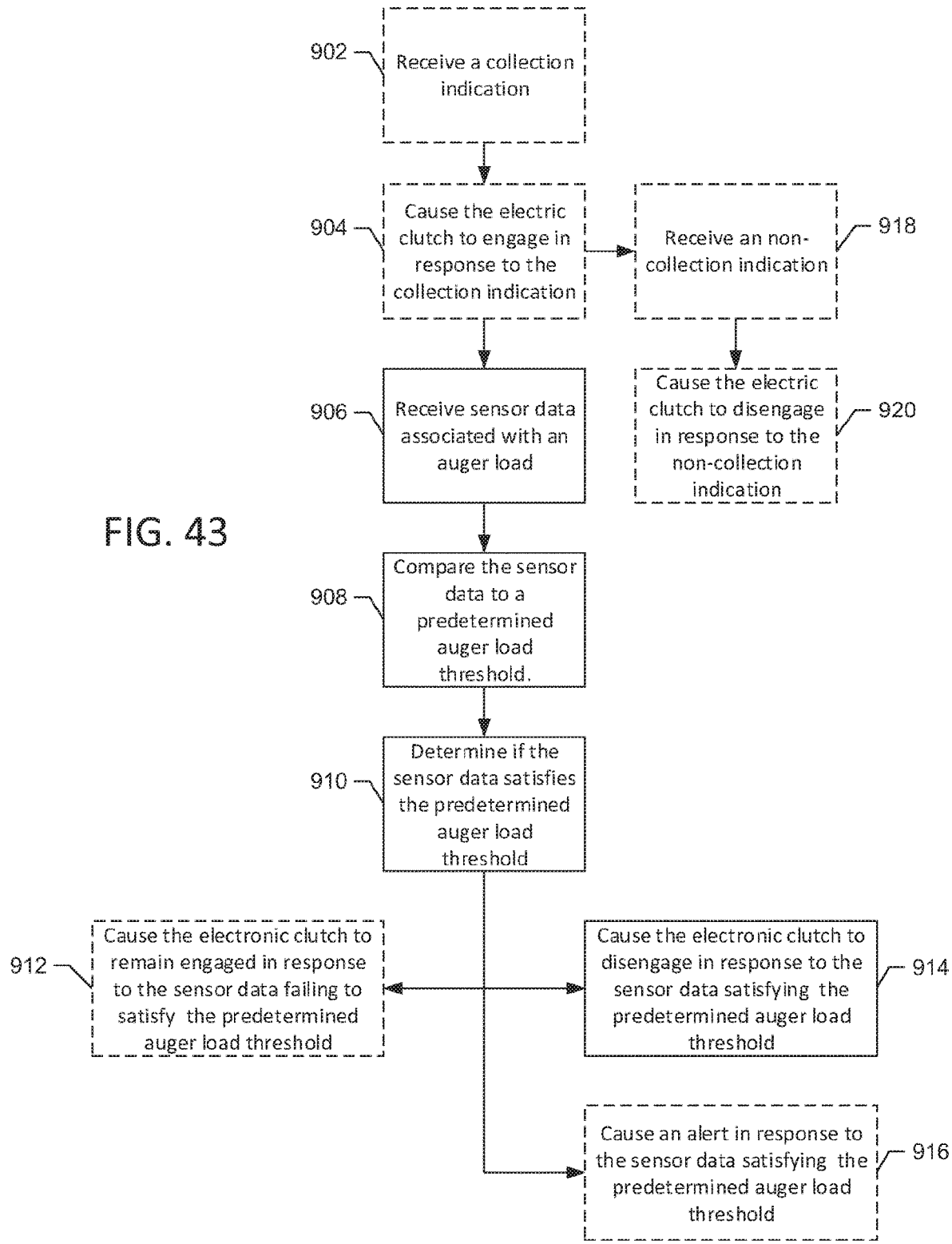
Figure 44:
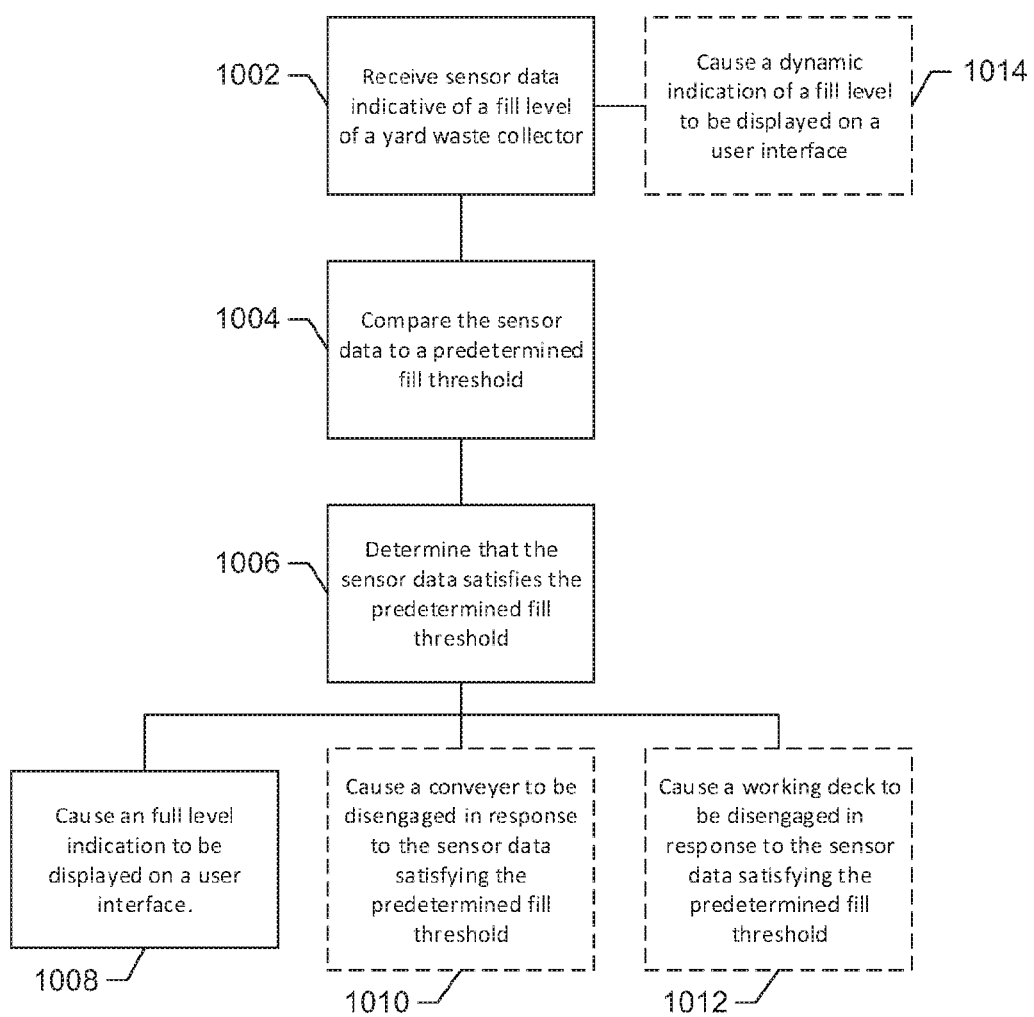

FIG. 29B illustrates a side view of the conveyor and cutting deck with the conveyor and cutting deck in a service position according to an example embodiment;

FIG. 29C illustrates perspective view of the cutting deck service lock according to an example embodiment;

FIG. 30 illustrates a perspective view of a cutting deck including a detachable conveyor joint assembly according to an example embodiment;

FIG. 31 illustrates a perspective view of a conveyor including a detachable conveyor joint assembly according to an example embodiment;

FIG. 32 illustrates a perspective view of a cutting deck including a detachable conveyor joint assembly according to an example embodiment;

FIG. 33 illustrates a perspective view of a conveyor including a detachable conveyor joint assembly according to an example embodiment;

FIG. 34 illustrates a perspective view of a cutting deck and conveyor with a connected detachable conveyor joint assembly according to an example embodiment;

FIG. 35 illustrates a side view of the detachable conveyor joint assembly according to an example embodiment;

FIGS. 36A-36F illustrate articulation of the detachable conveyor joint according to an example embodiment;

FIG. 37 illustrates a hood for a detachable conveyor joint according to an example embodiment;

FIG. 38A illustrates an overhead block diagram view of the yard waste collector including a fill sensor according to an example embodiment;

FIG. 38B illustrates a rear view of the yard waste collector with a hatch door removed including a mechanical fill sensor according to an example embodiment;

FIGS. 39A and 39B illustrate a side and perspective view of a mechanical fill sensor according to an example embodiment;

FIG. 40 illustrates a perspective view of the mechanical fill sensor according to an example embodiment;

FIG. 41 illustrates a cross sectional block diagram of the yard waste collector including an ultrasonic fill sensor according to an example embodiment;

FIG. 42 illustrates a block diagram of one example of onboard electronics or control circuitry that may be used in connection with employment of an example embodiment; and FIGS. 43 and 44 illustrate methods of utilizing the processing circuitry in relation to operation of a lawn care vehicle according to an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. Additionally, the term "lawn care" is meant to relate to any yard maintenance activity and need not specifically apply to activities directly tied to grass, turf or sod care. As used herein, operable coupling should be understood to relate to direct or indirect connection that, in either case, enables functional interconnection of components that are operably coupled to each other.

In an example embodiment, a lawn care vehicle includes a telescopic seal for a conveyor. The telescopic seal may allow for a discharge of the conveyor to be open when engaged with a yard waste collector and automatically shut when the conveyor is removed from the yard waste collector. The telescopic seal may prevent yard waste, such as grass clippings, from falling on a user, the lawn care vehicle, a motor, or the like. In some embodiments, the yard waste collector may include a flexible seal, such as a slit seal. The slit seal may open by deforming around the conveyor when the conveyor penetrates the slit seal and close when the conveyor is removed. The slit seal may further prevent yard waste from escaping the yard waste collector.

In an example embodiment, the lawn care vehicle may include a yard waste collector having a dump assembly, where the dump assembly is configured to pivot the yard waste collector from a collection position to a dump position (e.g., with minimal force). Additionally, the dump assembly may be configured to cause a hatch door of the yard waste collector to automatically open by projecting a pushrod associated with the pivoting of the yard waste collector. The pushrod opening the hatch door may dump the yard waste collector without the additional step of manually opening the hatch door. In some example embodiments, the yard waste collector may include a magnet proximate to a hinge configured to passively hold the hatch door in the open position. In an instance in which sufficient pressure is exerted against the hatch door in the closing direction the magnet may release the hatch door. The release of the door under pressure allows for the hatch door to be maintained open during cleaning and service without additional steps of engaging a lock or prop. Further, a lock or prop does not need to be removed to close the hatch door, thereby preventing damage from failure to remove the lock or prop.

In some example embodiments, the lawn care vehicle may include a detachable joint between the working deck, e.g. cutting deck, and the conveyor. The conveyor may be disconnected from the cutting deck with use of few tools or only a single tool and without significant effort. For example, the conveyor may be shifted to a service position, disengaging the detachable joint by operation of a lever. In an example embodiment, the cutting deck may be shifted to a service position once the detachable joint is disengaged by pivoting the cutting deck vertically. In some example embodiments, the detachable joint may include a seal or hood that is configured to articulate with the conveyor to maintain a seal between the cutting deck portion and conveyor portion of the detachable joint. The seal may prevent escape of yard waste from the detachable joint during operation.

In an example embodiment, the lawn care vehicle may include a sensor operably coupled to the top internal surface of the yard waste collector and configured to sense a fill level of the yard waste collector. In some example embodiments, the sensor may be a mechanical sensor configured to be lifted by the pressure of the yard waste entering the yard waste collector to actuate a switch. The mechanical sensor may be placed such that the maximum yard waste height will occur under the switch. For example, if the lawn care vehicle includes an auger, the mechanical sensor may be positioned behind the auger discharge and offset in the direction of rotation of the auger. The position and configuration of the mechanical switch may allow greater filling of the yard waste collector prior to a full indication. In other embodiments, the sensor may include an ultrasonic sensor. The ultrasonic sensor may enable dynamic indication of the level of the yard waste in the yard waste collector.

In an example embodiment, the lawn care vehicle may include an auger and an electronic clutch. The electronic clutch may be engaged and disengaged by a user utilizing a user interface allowing for easy transition between a collection mode and a non-collection, e.g. mulching, mode. Additionally or alternatively, the rotational speed of the auger may be determined, such as by sensing, motor rotational speed, auger rotational speed, transmission belt speed, or the like, indicative of the load on the auger. The rotational speed may be compared to a nominal speed, and in an instance in which the rotational speed is indicative of excess load, the electronic clutch may disengage the auger. Disengaging the auger based on rotational speed may provide an accurate load indication for disengagement of the clutch, thereby preventing damage to the auger, transmission belts, or other components of the lawn care vehicle.

Figure 1:
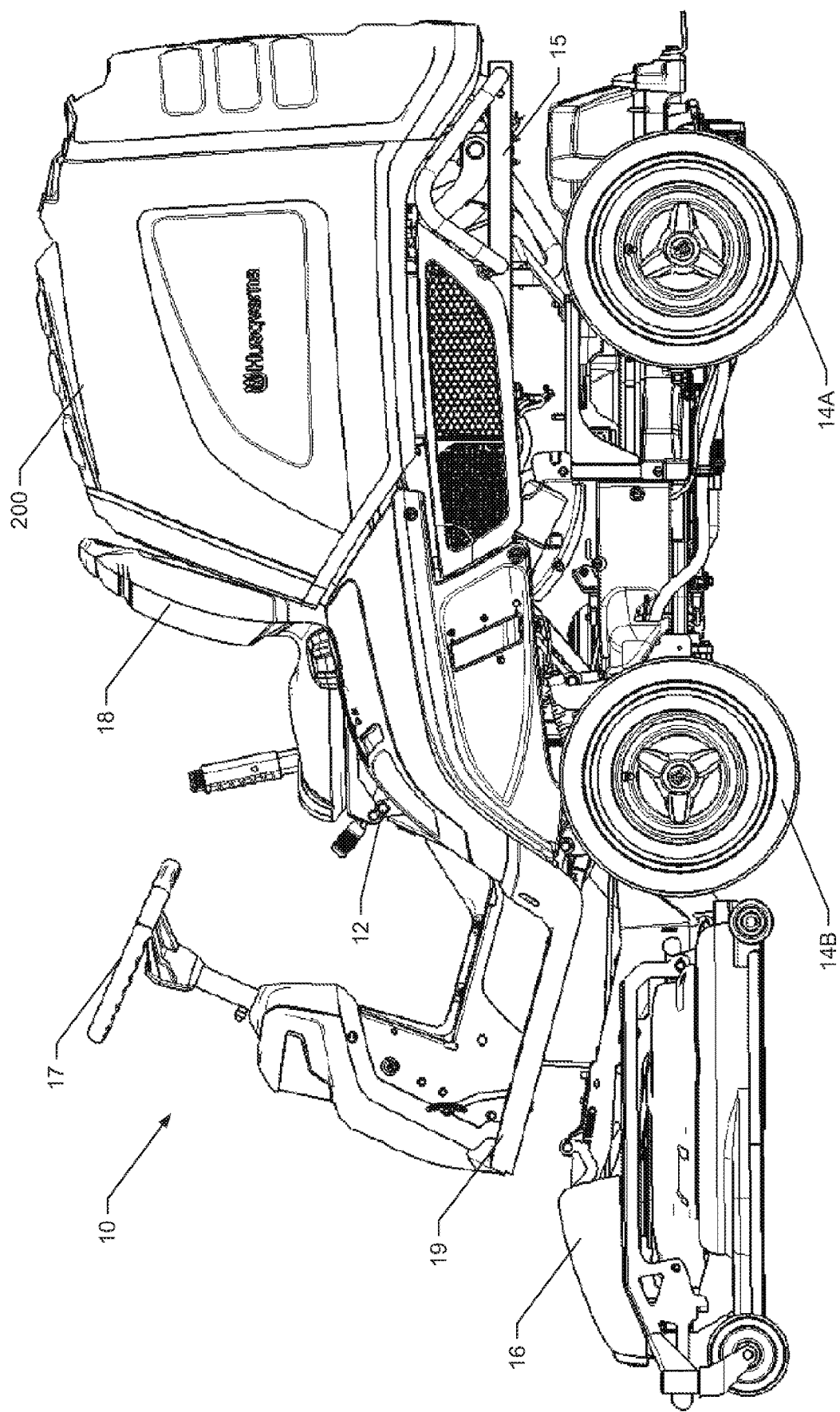
FIG. 1 illustrates a side view of a lawn care vehicle according to an example embodiment.
Figure 2:
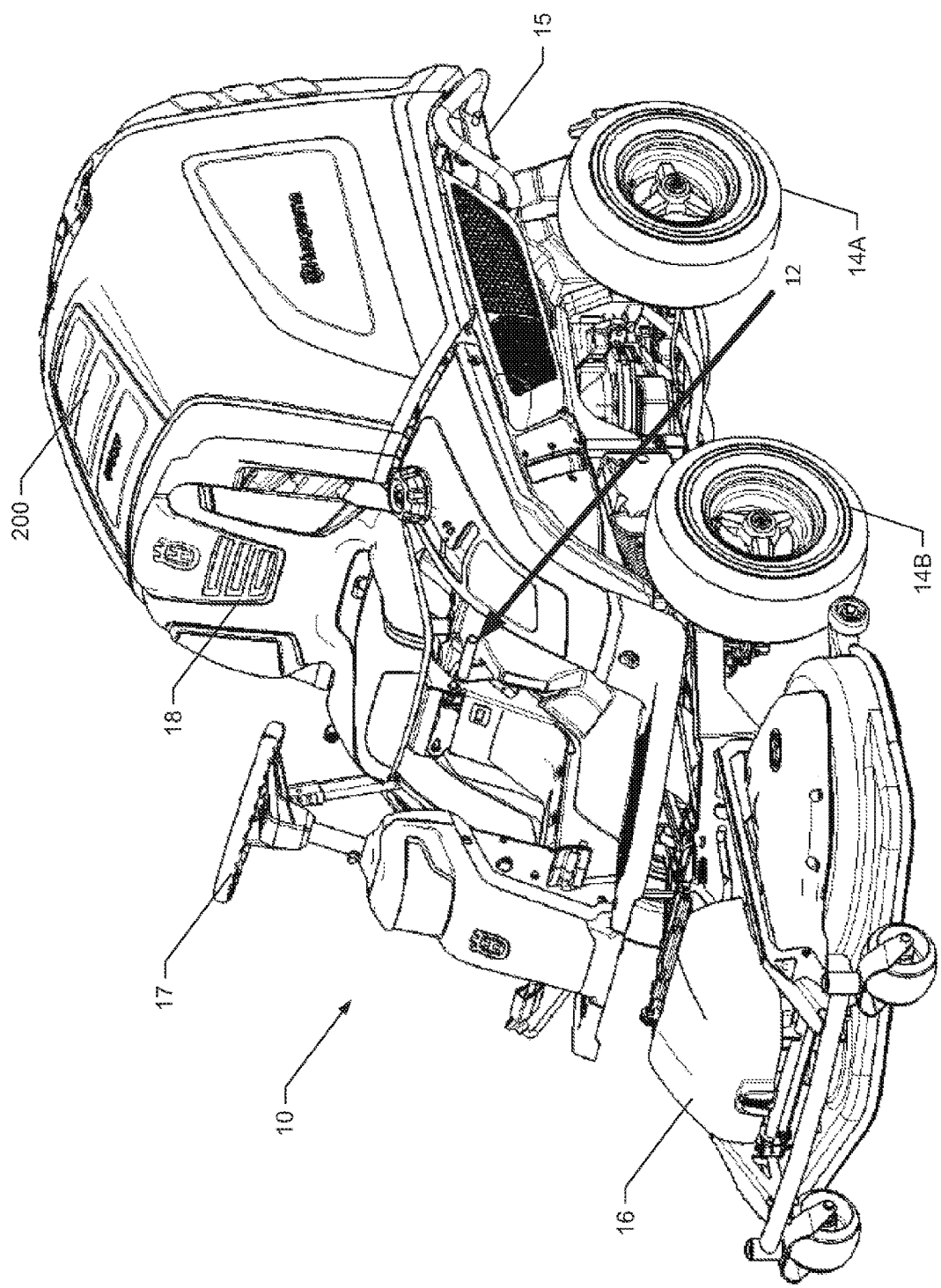
FIG. 2 illustrates a perspective view of the lawn care vehicle of FIG. 1 according to an example embodiment.

FIGS. 1 and 2 illustrate an example of a riding lawn care vehicle 10 having a yard waste collector 200. The yard waste collector 200 may be rigid or soft sided. As such, the yard waste collector 200 may be configured to collect lawn clippings or other discharge or debris that are ejected as a result of the operation of the lawn care vehicle 10. In some embodiments, the yard waste collector 200 may be removed or pivoted manually by the operator to dump the contents from the yard waste collector 200 when desired. However, in other embodiments, an automated dump assembly may be employed so that the yard waste collector 200 may be emptied without the operator needing to lift or otherwise physically contact the yard waste collector 200.

In some embodiments, the lawn care vehicle 10 may include a seat 18 that may be disposed generally at a center portion of the lawn care vehicle 10. The lawn care vehicle 10 may also include a steering assembly 17 (e.g. a steering wheel, handle bars, steering levers, or the like) operably coupled to the wheels 14 (e.g., 14A, 14B) of the lawn care vehicle 10 to which steering inputs are provided. In some cases, the steering inputs may be provided to rear wheels 14A of the lawn care vehicle 10 to allow the operator to steer the lawn care vehicle 10. In embodiments in which steering control is provided to the rear wheels 14A, the front wheels 14B may not receive steering inputs. However, in alternative embodiments, steering controls could be initiated by providing steering inputs to the front wheels 14B or to both the front wheels 14B and the rear wheels 14A.

In an example embodiment, the steering assembly 17 may include a steering wheel and a steering column. The steering column may operably couple to additional steering assembly components that are used to facilitate steering of the lawn care vehicle 10. The lawn care vehicle 10 may also include additional control related components such as one or more speed controllers, cutting height adjusters and/or cutting unit lifting controllers. Some of these controllers may be provided in the form of foot pedals that may sit proximate to a footrest 19 (which may include a portion on both sides of the lawn care vehicle 10 (e.g. on opposite sides of the steering column)) to enable the operator to rest his or her feet thereon while seated in the seat 18.

In some example embodiments, the steering assembly 17 may be embodied as an assembly of metallic or other rigid components that may be welded, fitted, bolted or otherwise operably coupled to each other and operably coupled to the wheels (rear wheels 14A in this example) of the lawn care vehicle 10 to which steering inputs are provided. For example, the steering assembly 17 may include or otherwise be operably coupled to a steering cable assembly or a system of mechanical linkages to translate rotational motion applied to the steering assembly 17 (and more particularly to the steering wheel) into directional inputs to orient the wheels (e.g. rear wheels 14A) accordingly.

The lawn care vehicle 10 may also include, or be configured to support attachment of a working deck, such as cutting deck 16, having at least one cutting blade mounted therein. The cutting deck 16 may be a removable attachment that may be positioned in front of the front wheels 14B in a position to enable the operator to cut grass using the cutting blade when the cutting blade is rotated below the cutting deck 16 and the cutting deck 16 is in a cutting position. When operating to cut grass, the grass clippings may be collected by a collection system, mulched, or discharged from the cutting deck 16 via a side discharge, center discharge, or a rear discharge to a collection container such as the yard waste collector 200.

In some embodiments, the cutting deck 16 may be elevated or lifted out of direct contact with the ground via a cutting unit lifting controller. In this regard, the cutting unit lifting controller may be a foot pedal or hand operated lever that operates linkages to lift or tilt the cutting deck 16 upward. Lifting the cutting deck 16 may enable the lawn care vehicle 10 to traverse certain rough terrain or obstacles (e.g. small rocks, curbs, or other features) or may otherwise be preferable for some operators when in a transit mode, or when the lawn care vehicle 10 is not actively being used in a cutting operation. However, other embodiments may not include any such cutting deck 16 lifting option, but may simply allow the height of blades within the cutting deck 16 to be adjusted using a cutting height adjuster. In this regard, the cutting height adjuster may be a lever that is operably connected to the blades via linkages to adjust the height of the blades relative to the ground when the cutting deck 16 is lowered into a cutting position. In some embodiments, the cutting deck 16 itself may include wheels to help ensure that the cutting deck 16 stays relatively level during operation to provide an even cut.

The cutting deck 16 may include blade drive components (e.g. belts, pulleys, a blade motor or other components) that may be used to functionally operate the cutting deck 16 during a cutting operation. The blade drive components may be powered by a motor 11 of the lawn care vehicle 10, as depicted in FIG. 13. The motor 11 may be an electric motor (e.g. battery powered) or may be a gasoline engine in some embodiments. In other embodiments, the motor 11 may be a hybrid system involving one or more gasoline engines, electric motors, and batteries. The motor 11 may connect to the blade(s) of the cutting deck via the belt drive components responsive to selective engagement of a clutch assembly in some cases.

Figure 4:
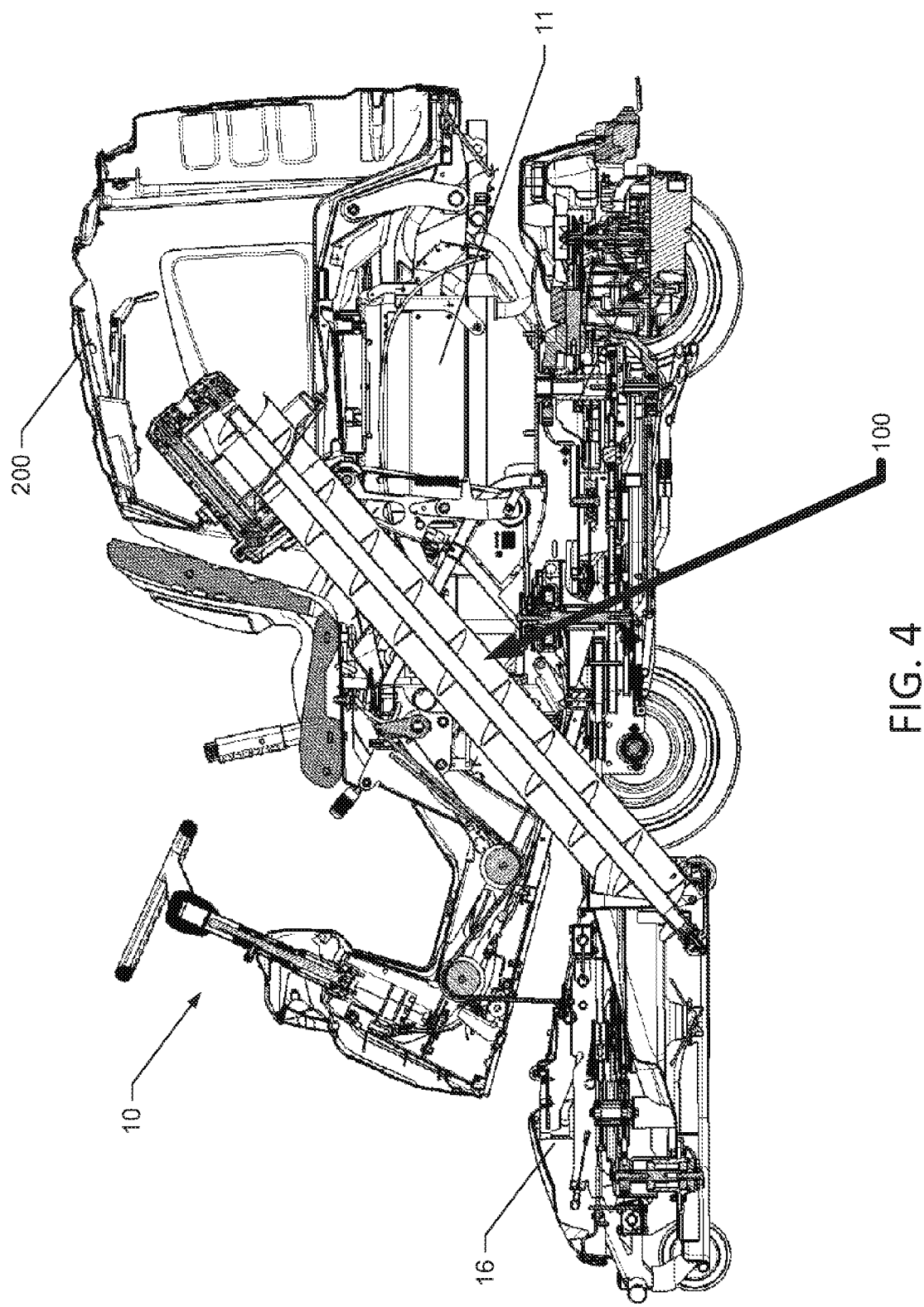
FIG. 4 illustrates a cross sectional view of the lawn care vehicle of FIG. 1 according to an example embodiment.

In some embodiments, the motor 11 may be operably coupled to (e.g., attached to) a frame 15 of the lawn care vehicle 10 and operably coupled to the rear wheels 14A (if applicable), e.g., through linkages, belts, pulleys, cables, etc., to power the rear wheels 14A. In some embodiments, the motor 11 may be disposed underneath the yard waste collector 200, as depicted in FIG. 4. As such, the yard waste collector 200 may obscure the view of the motor 11 from above and/or the sides of the lawn care vehicle 10.

In an example embodiment, the motor 11, the steering assembly 17, the cutting deck 16, the seat 18, and other components of the lawn care vehicle 10 may be operably coupled to (e.g., directly connected to, indirectly connected to, mounted on, attached to, fastened on, supported by, etc.) the frame 15 of the lawn care vehicle 10. The frame 15 may be a rigid structure configured to provide support, connectivity, and interoperability functions for various ones of the components of the lawn care vehicle 10. In example embodiments, the frame 15 may be split or articulated such that, for example, the front wheels 14B are disposed on an opposite portion of the frame 15 (e.g., front frame portion) than the portion of the frame 15 on which the back wheels 14A (e.g., rear frame portion) are disposed with respect to an articulated joint in the frame 15. The articulated joint may enable the lawn care vehicle 10 to exhibit a high degree of maneuverability. In some embodiments, the front frame portion of the lawn care vehicle 10 is operably coupled to the rear frame portion of the lawn care vehicle via the articulated joint.

In some example embodiments, cutting deck 16 of the lawn care vehicle 10 may be pivoted from an operating position, e.g. cutting blades facing toward the ground, to a service position, e.g. cutting blades facing at least partially outward from the front of the lawn care vehicle 200, as shown, e.g., in FIG. 27. A release lever 12 may release (or unlock) the cutting deck 16, allowing an operator to move the cutting deck from the operating position to the service position, as described below in reference to FIGS. 27-29.

Example Conveyor with Telescopic Seal

Figure 3:
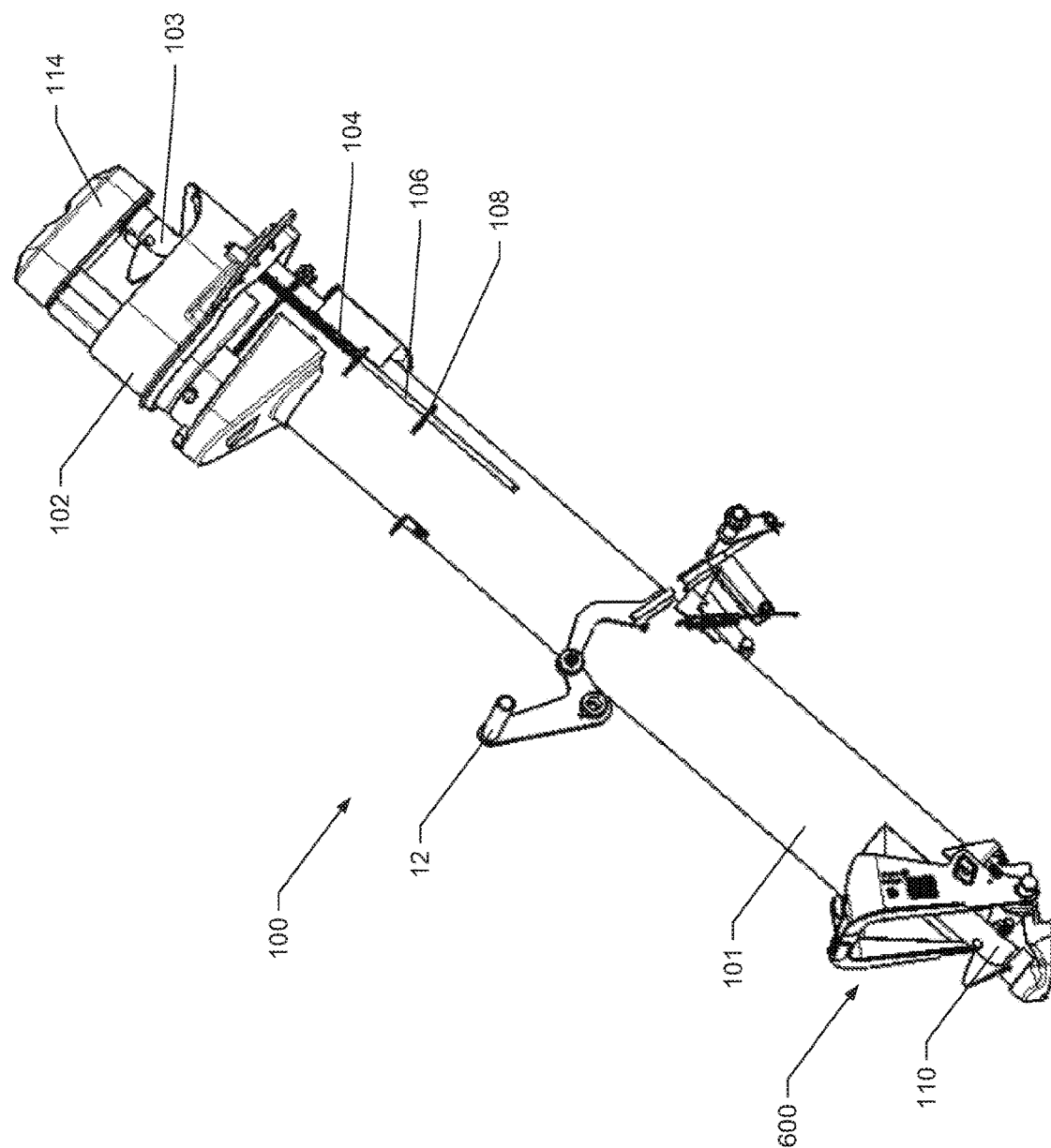
FIG. 3 illustrates a side view of a conveyor according to an example embodiment.

FIG. 3 illustrates an example conveyor 100 configured to convey yard waste, such as grass clippings, from a discharge of the cutting deck 16 to the yard waste collector 200.

The conveyor 100 may include an auger 110 or a belt conveyor assembly to transport yard waste from the cutting deck 16 to the yard waste collector 200. The auger 110 may provide a robust transport mechanism that can efficiently compact and/or move yard waste while avoiding clogs.

The conveyor 100 may employ a chute 101 that is operably coupled to a portion of the cutting deck 16 proximate to one end of the chute 101 and a portion of the yard waste collector 200 at an opposite end of the chute 101. The location of the opening through which grass clippings enter the chute 101 (i.e., the receiving end or pickup point) relative to the housing of the cutting deck 16 may be different in respective different embodiments. For example, the pickup point could be in the front, back, middle, or side of the cutting deck 16. Similarly, a discharge end of the chute 101 into the yard waste collector 200 could be provided at different locations within or relative to the yard waste collector 200.

In an example embodiment, the chute 101 may extend substantially along a straight line from the receiving end to the discharge end to allow a single auger 110 (e.g., an auger that is undivided, continuous, or integral along its entire longitudinal length) to extend along a longitudinal axis of the chute 101. The auger 110 may include a rotatable rod that may be rotated via power provided by the motor 11 and may include a helical blade extending radially outward from the rod to carry material in a general direction that is parallel to the longitudinal axis of the auger 110 as the material is carried up the rotating helical blade. The auger 110 within the conveyor 100 could be actively or passively fed with clippings in various different embodiments.

The conveyor 100 may be operably coupled to the cutting deck 16 by a detachable joint 600 at the receiving end, as discussed below in reference to FIGS. 28-37. The auger 110 may discharge the yard waste at the discharge end through an open end of the chute 101. Alternatively, the discharge end of the chute 101 may be capped by an end cap 114, and an outlet 103 (or discharge port) may be provided, e.g., in a bottom facing portion of the chute 101 at or near the discharge end of the chute 101.

Figure 5:
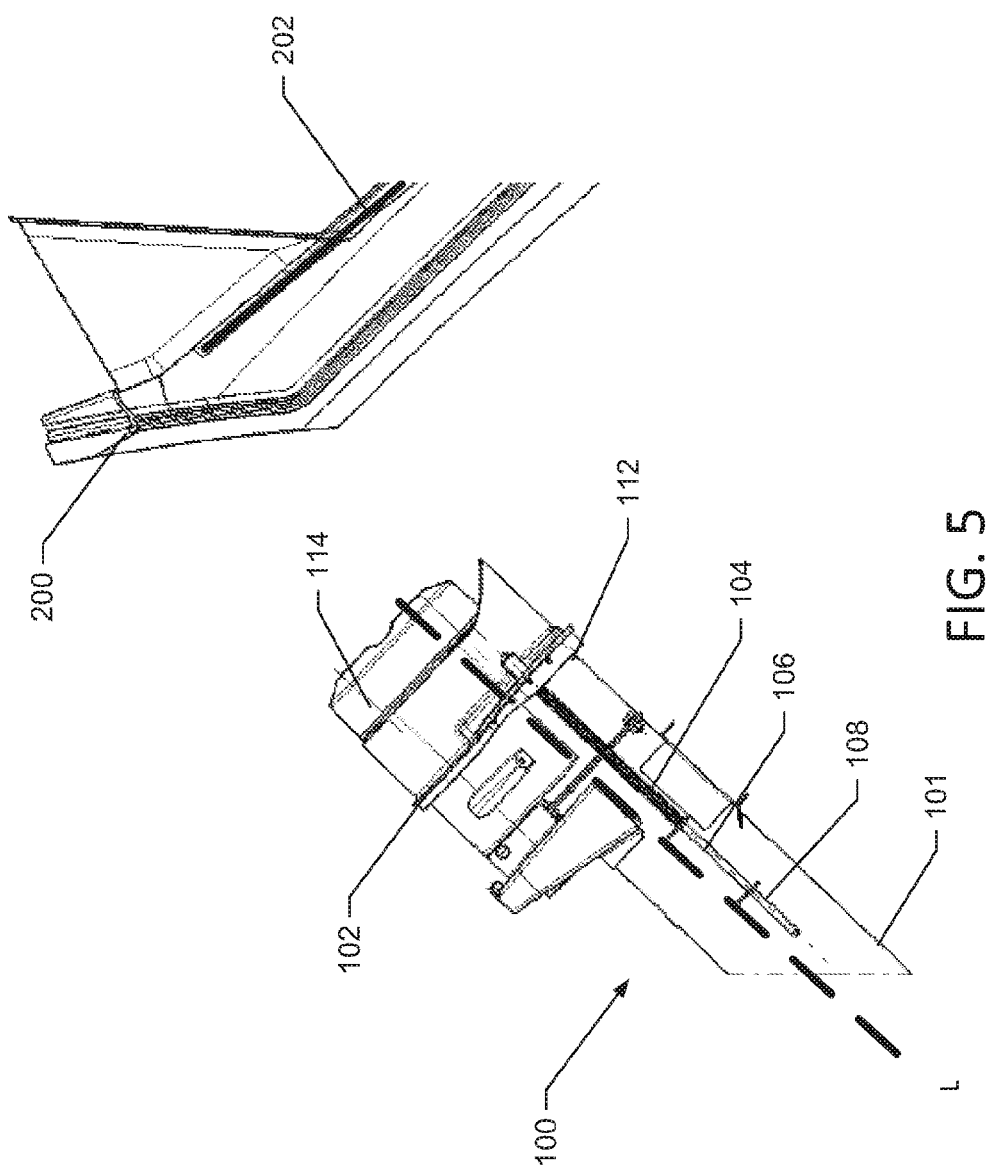

In some example embodiments, as shown in FIG. 3, the conveyor 100 may include a telescopic seal 102 configured to cover the outlet 103 to prevent yard waste from escaping the chute 101 when the conveyor 100 is not engaged with the yard waste collector 200. The telescopic seal 102 may fully or at least partially surround a circumference of the chute 101 of conveyor 100 and may be configured to slide along the longitudinal axis (L) of the conveyor 100, as shown in FIG. 5, to an open position when the conveyor 100 engages the yard waste collector 200. In some example embodiments, the conveyor 100 may include a biasing element 104, such as a spring, configured to bias the telescopic seal 102 toward the shut position.

In an example embodiment, the conveyor 100 may include at least one guide 106, such as a rod and eye, configured to maintain an alignment of the telescopic seal 102 and the outlet 103. In some example embodiments, the guide 108 may be a projection and a slot or groove for the projection to travel. The conveyor 100 may also include a mechanical stop 108, such as a crimp in the rod which is larger than the eye, configured to resist travel of the telescopic seal 102 beyond a predetermined operational range. In other embodiments, the stop 108 may include a molded protrusion, a clamp, or the like. As discussed above, the conveyor 100 may include or be operably coupled to the release lever 12, which is discussed in further detail below in reference to FIGS. 28 and 29.

FIG. 4 illustrates a cross sectional view of an example embodiment of the lawn care vehicle 10. The conveyor 100 is operably coupled to the cutting deck 16 and the yard waste collector 200. In particular, as shown in FIG. 4, the receiving end of the conveyor 100 is connected to (e.g., engaged with) the cutting deck 16, and the discharge end of the conveyor 100 is connected to (e.g., engaged with) the yard waste collector 200. The yard waste collector 200 is disposed vertically above the motor 11. Further, the discharge end of the conveyor 100 may be disposed vertically above the motor 11 and/or the motor 11 and motor air intake, as depicted in FIG. 13.

FIGS. 5-7 illustrate a side view of the conveyor 100 relative to the yard waste collector 200 and together illustrates an example process of the yard waste collector 200 moving to engage the conveyor 100. The telescopic seal 102 may include an engagement protrusion 112. The engagement protrusion 112 may include one or more protrusions which extend radial outward from the telescopic seal 102. The engagement protrusions 112 may be molded, bolted, riveted, or otherwise operably coupled to and/or about the telescopic seal 102. In some example embodiments, the engagement protrusion 112 includes a rigid lip surrounding at least a portion of a circumference of the telescopic seal 102.

The yard waste collector 200 may include a collar 202 disposed at, near, or around the periphery of an inlet to the yard waste collector 200. The collar 202, like the rest of the yard waste collector 200, may be formed from a rigid material such as metal, hard plastic, or the like. The collar 202 may press against the engagement protrusion 112 as the conveyor 100 engages, e.g. penetrates, the yard waste collector 200, such as in an instance in which the yard waste collector 200 transitions from a dump position to a collection position. As the collar 202 is pushed against the engagement protrusion 112, the biasing force of the biasing element 104 may be overcome, allowing for the telescopic seal 102 to slide along or relative to the longitudinal axis L of the conveyor 100 from the shut position to the open position. In the open position the outlet 103 is exposed (e.g., in a rearward and downward direction), which may allow for the yard waste to be discharged into the yard waste collector 200 by operation of the auger 110.

FIG. 5 depicts the telescopic seal 102 in the shut position, the yard waste collector 200 in the dump position, and the conveyor 100 not engaged with the yard waste collector 200. FIG. 6 depicts the conveyor 100 engaging the yard waste collector 200, as the yard waste collector 200 transitions from the dump position to the collection position. The collar 202 is in contact with the engagement protrusion 112, but the collar 202 has not applied sufficient force to the engagement protrusion 112 to overcome the force of the biasing element 104 to slide the telescopic seal 102 to the open position.

FIG. 7 depicts the conveyor 100 engaging the yard waste collector 200, and the force of the biasing element 104 has been overcome by the force of the collar 202 applied to the engagement protrusion 112, sliding the telescopic seal 102 to the open position and exposing the outlet 103. The discharge end of the chute 101 including at least the outlet 103 has penetrated and is inserted into the yard waste collector 200, at least from the point at which the collar 202 engages the engagement protrusion 112. Therefore, the telescopic seal 102 is configured to expose the outlet 103, e.g., only in instances in which the outlet 103 is positioned within the yard waste collector 200, thereby limiting or preventing inadvertent discharges of yard waste outside of the yard waste collector 200.

FIG. 8 illustrates the conveyor 100 engaging the yard waste collector 200 such that the outlet 103 is positioned within the yard waste collector 200 and is exposed, from a perspective seen through a hatch door disposed on a rear portion of the yard waste collector 200. The collar 202 is disposed around an inlet in the front surface of the yard waste collector 200. The telescopic seal 102 is in the open position and the auger 110 is visible through the outlet 103 of the conveyor 100.

FIG. 9 depicts ranges of travel of the telescopic seal 102. The first range of travel of the telescopic seal 102 extends from the shut position, in which the biasing element 104 causes the telescopic seal to fully cover the outlet 103. During the dump cycle, the collar 202 may cause the telescopic seal 102 to travel to the open position, as discussed above in reference to FIGS. 4-7, to expose (or at least partially uncover) the outlet 103. The second range of travel may be associated with operation of the lawn care vehicle 10. In the second range of travel, the collar 202 remains engaged with the engagement protrusion 112. The conveyor 100 may move relative to the collar 202 (e.g., towards or away from the yard waste collector 200) during operation of the lawn care vehicle 10, as the lawn care vehicle 10 traverses hills, bumps, or the like. The biasing element 104 allows for the telescopic seal 102 to maintain a positive engagement over the second range of travel, while maintaining the outlet 103 exposed. In other words, the telescopic seal 102 is maintained positively engaged with the collar 202 with the outlet exposed, as the conveyor 100 is allowed to oscillate with the cutting deck 16.

FIG. 10 illustrates the conveyor 100 engaged with the yard waste collector 200 from a front perspective. The discharge end of chute 101 is within the yard waste collector 200. The collar 202 is engaged with the engagement protrusion 112.

FIG. 11 illustrates an example flexible seal 201. The flexible seal 201 may be operably coupled to the inlet of the yard waste collector 200 (e.g., at or near where the chute 101 engages the yard waste collector 200). The flexible seal 201 may be constructed from a resilient material such as rubber, latex, or the like. In some example embodiments, the flexible seal 201 may be a slit or split seal including a slit 206 and flaps 204. In an instance in which the yard waste collector 200 is transitioned from the dump position to the collection position, the discharge end of the conveyor 100 may penetrate the slit 206, as described above, causing the flaps 204 to deform around the chute 101. The flaps 204 of the flexible seal 201 may be elastically biased toward the chute 101 creating a tight seal around the chute 101. In an instance in which the conveyor 100 is withdrawn from the flexible seal 201, such as when the yard waste collector 200 transitions to the dump position, the flaps 204 of the slit seal 201 may revert to an original form, causing the flaps 204 to substantially close the slit 206.

In an example embodiment, as shown in FIG. 11, the flexible seal 201 may be operably coupled to the collar 202. The flexible seal 201 may be in contact with or include the collar 202 at the outer periphery of the flexible seal 201. The collar 202 may be formed in substantially the same shape as the inlet of the yard waste collector 200, and therefore the flexible seal 201 may completely cover the inlet of the yard waste collector 200.

In some example embodiments, the flexible seal 201 may include a geometry complementary to the external or outer geometry of the conveyor 100. For example, the flaps 204 of the flexible seal 201 may include an external geometry configured to face the exterior of the yard waste collector 200, which is complementary to the outer geometry of the discharge end of the conveyor 100. The external geometry of the flaps 204 of the flexible seal 201 may assist in the alignment of the conveyor 100 with the slit 206, allowing for smooth penetration of the flexible seal 201 during engagement of the yard waste collector 200 and the conveyor 100. The resilient flexible seal 201 may shut the inlet of the yard waste collector 200 to prevent or limit escape of yard waste from the inlet, such as during the disengagement, e.g. removal, of the conveyor 100 from the yard waste collector 200 during a dump cycle.

FIG. 12 depicts the flexible seal 201 disposed on the yard waste collector 200. The flexible seal 201 completely covers the inlet of the yard waste collector 200. The collar 202 of the flexible seal 201 may be operably coupled to the inlet of the yard waste collector 200 by one or more connectors, such as screws, rivets, bolts, spot welds, or the like.

FIG. 13 depicts the lawn care vehicle 10 with the yard waste collector 200 removed. An air inlet plate 208 may be operably coupled to the vehicle 10 at a location above the motor 11 and/or an air inlet 13 for the motor 11. In some example embodiments, the air inlet plate 208 may include a plurality of mounts 214 configured to enable the plate 201 to be operably coupled to the frame 15, motor 11, or other components, such as by bolt, screw, rivet, or the like. The air inlet plate 208, once positioned on the vehicle 10, may be configured to catch falling yard waste or debris on a catch surface 211, such as from the conveyor 100 or the inlet of the yard waste collector 200. The air inlet plate 208 may include one or more walls (e.g., a raised perimeter) 210 configured to direct the yard waste away from the air inlet 13 and/or motor 11. For example, the one or more walls 210 may be structured to or configured to inhibit the yard waste from escaping the surface of the air inlet plate 208 and landing on the air inlet 13 and/or motor 11. In an example embodiment, the air inlet plate 208 may include a discharge plane 212 configured to permit the yard waste to exit the surface of the air inlet plate 208 (e.g., in a particular or predetermined direction). The discharge plane 212 may be embodied as a downward angled ramp at an edge of the air inlet plate 208. In an example embodiment, the catch surface 211 may be disposed at an angle toward the discharge plane 211. In other words, the plate 208 may be configured to use or harness vibrations caused by normal operation of the lawn care vehicle 10 (e.g., originating from the motor 11 or caused by traversing uneven terrain) to move yard waste (e.g., grass clippings) toward the discharge plane 212 due, at least in part, to gravity. As such, the air inlet plate 208 may inhibit or prevent yard waste from falling on the motor 11 and blocking or limiting air flow through the air inlet 13.

Example Yard Waste Collector Dump Assembly

FIG. 14 depicts the lawn care vehicle 10 with its side panels and yard waste collector 200 removed. The lawn care vehicle 10 may include a dump assembly 300 operably coupled to the frame 15. The dump assembly 300 may be configured to cause the yard waste collector 200 to move between a collection position and a dump position, as described below.

FIG. 15 depicts the dump assembly 300 including a linear actuator 302, collector frame 304, lever arm 306, cross bar 308, and link arm 310, and a hatch door latch assembly 350. FIG. 16 depicts the dump assembly 300 with the collector frame 304 separated from the link arm 310 to illustrate a slide track 314 and guide wheels 312.

The linear actuator 302 may be operably coupled, such as by bolts, to the frame 15. When actuated, the linear actuator 302 may extend by applying linear force to a first end of the lever arm 306. The lever arm 306 may be operably coupled at a second end thereof to the cross bar 308, which may be operably (e.g., pivotably) coupled to the frame 15. The lever arm 306 is configured to transfer the linear force of the linear actuator 302 to a rotational force of the crossbar 308.

The link arm 310 may be operably coupled at a proximal end thereof to the crossbar 308, such as at or near the center of the crossbar 308. The link arm 310 may include protrusions at a distal end of the link arm 310. The protrusions may be configured to travel a slide track 314 disposed on (and, e.g., integral with) an underside of the collector frame 304. In some embodiments, the protrusions may include one or more guide wheels 312 to allow for a smooth travel of and/or along the slide track 314.

Rotation of the crossbar 308 may cause the link arm 310 to extend away from the lawn care vehicle 10. The extension of the link arm 310 may cause the protrusions to travel along the slide track 314 and apply force to the bottom of the collector frame 304. The slide track 314 may be disposed on or near the longitudinal axis of the collector frame 304 to provide lift or pivot force balanced across the collector frame 304. The slide track 314 may be open at a first end thereof to receive the protrusions and guide wheels 312 and shut at a second end of the slide track 314 to prevent the protrusions or guide wheels 312 from becoming disengaged. The collector frame 304 may be pivotally coupled to the frame 15 at a first end that is opposite a second end at which the yard waste collector 200 is disposed. The force applied to the bottom of the collector frame 304 may cause the collector frame 304 to pivot backwards to the dump position. The operation may be reversed, e.g. transition from the dump position to the collection position by retraction (e.g., shortening) of the linear actuator 302, causing a reversal of the direction of operations discussed above.

FIGS. 17A and 17B illustrate a pushrod 316 and retention element 350 for the hatch door 216 of the yard waste collector 200. The pushrod 316 may be operably (e.g., pivotably) coupled to the frame 15 at a proximal end of the pushrod 316. The retention element 350 may include a first component 352, e.g., metal or magnetic plate, operably coupled to the hatch door 216, and a second component 354 having, e.g., one or more magnets 353, operably coupled to the yard waste collector 200. The distal end of the pushrod 316 may penetrate the second component 354, such as through a guide hole 355 in the second component 354. In operation, the pushrod 316 may move to extend through the guide hole 355 as the yard waste collector 200 is pivoted from the collection position to the dump position. As the pushrod 316 extends, the pushrod 316 contacts and exerts force on the first component 352 in a direction away from the second component 354, causing the retention element 350 to release, opening the hatch door 216. The retention element 350 is described herein as involving magnet(s) and a metal plate for illustrative purposes, but other retention elements such as a ball catch, e.g. cabinet catch, or the like, may also be used. The magnets 353 associated with the second component 354 are depicted behind the second component 354, however, the magnets 353 may be located in front, behind, or molded into the second component 354 in other embodiments.

FIG. 18 illustrates travel arcs of the pushrod 316 and the hatch door 216. The yard waste collector 200 may have a center of rotation 360 and a first travel arc 361 associated with a latch end of the hatch door 216. The first travel arc 361 may have a radius defined by the distance of the retention element 350 from the center of rotation 360 of the yard waste collector 200. The pushrod 316 may have a center of rotation 362, which may be offset from (e.g., not collocated with) the center of rotation 360 of the collector 200. For example, in some embodiments, the center of rotation 360 of the collector 200 is positioned above and/or behind the center of rotation 362 of the pushrod 316. The pushrod 316 may be associated with a second travel arc 363 having a radius defined by the length of the pushrod 316. The radius of the second travel arc 363 may be larger that the radius of the first travel arc 361. As discussed above, the distal end of the pushrod 316 is aligned with the retention element 350 by guide hole 355, causing the first travel arc 361 to intersect and cross over the second travel arc 363 (e.g., in only two locations or intersection points), e.g., near the area 366 associated with the retention element 350 being in a shut position while the yard waste collector 200 is in the collection position. In an example embodiment, when the yard waste collector 200 is in the collection position there may be a gap between the push rod 316 may and the first component 352 resulting in the hatch door travel arc 361 may crossing the pushrod travel arc 363. Alternatively, the push rod 316 may abut the first component 352 resulting in the hatch door travel arc 361 abutting the pushrod travel arc 363 when the yard waste collector 200 in the collection position. As the yard waste collector 200 is pivoted toward the dump position, the first travel arc 361 and second travel arc 363 diverge, causing the pushrod to extend through the guide hole 355 of the retention element 350 and apply pressure to the first component 352, until the pushrod 316 disengages the retention element 350, e.g., at area 365.

FIG. 19 depicts the movements of each of the components of the dump assembly 300, as described above in reference to FIGS. 15 and 16. The additional components of the lawn care vehicle 10 have been removed to simplify the illustration.

FIG. 20, which includes FIGS. 20A, 20B, and 20C, depicts the transition of the yard waste collector 200 from the collection position to the dump position. In the collection position (as shown in FIG. 20A), the yard waste collector 200 may be fully forward and the hatch door 216 may be shut with the retention element 350 engaged. The pushrod 316 may be in a fully withdrawn position. In some instances, there may be a gap between the hatch door 216 and the distal end of the pushrod 316.

As the yard waste collector 200 pivots from the collection position to the dump position (as shown in FIG. 20B), the front portion of the yard waste collector 200 may be pivoted upward (and, e.g., backward), and the rear portion (e.g., including the hatch door 216) of the yard waste collector 200 may be pivoted downward (and, e.g., forward). The pushrod 316 may extend through the guide hole 355, as discussed above making contact with the first component 352 of the retention element 350. As the yard waste collector 200 continues to the dump position (as shown in FIG. 20C), the pushrod 316 continues to extend exerting force on the first component 352 of the retention element 350 until the retention element 350 disengages (e.g., by overcoming the force of the magnets 353). When the retention element 350 disengages, the hatch door 216 may continue to open further by the force of gravity. The operation may be reversed by pivoting the yard waste collector 200 to the collection position. The retention element 350 may engage when the first component 352 and second component 354 are proximate to each other, such as about 1 cm.

FIG. 21 illustrates a cross sectional view of the dump assembly 300. As discussed above in reference to FIGS. 15 and 16, the crossbar 308 is rotated in response to the force applied from the linear actuator 302 through the lever arm 306. The link arm 310 may extend or swing outward away from the lawn care vehicle 10 as the crossbar 308 rotates clockwise. The extension of the link arm 310 may cause the protrusions and guide wheels 312 to travel down the slide track 314 and push the collector frame 304 and the yard waste collector 200 (or a front portion thereof) upward and backwards.

As discussed above in FIGS. 17-20, the pushrod 316 may rotate about its pivotable connection to the frame 15 and extend as the yard waste collector 200 is pivoted to the dump position. The pushrod 316 may exert pressure on the first component 352 of the retention element 350, until the retention element 350 releases or is disengaged.

FIGS. 22, 23A, and 23B depict a handle mechanism 218 operably coupled to the hatch door 216. The handle mechanism 218 may be operably coupled proximate to the retention element 350 and used to manually disengage the retention element 350 to open the hatch door 216.

FIG. 23A depicts a rear view of the handle mechanism 218. FIG. 23B depicts a cross section of the handle mechanism 218 at the cross section defined by axis A-A of FIG. 23A. The handle mechanism 218 may include a bump lever 222, e.g. a lever with a rounded end, at a distal end. The handle mechanism 218 may include a handle 220 or grip portion at a proximal end. The handle mechanism 218 may include a pivot coupling 224 disposed between the bump lever 222 and the handle 220. Operation of the handle 220, such as pulling the handle 220 away from the yard waste collector 200, may cause the handle mechanism 218 to rotate about the pivot coupling 224, causing the bump lever 222 to extend toward the second element 352. Extension of the bump lever 322 causes the first component 352 to be pushed away from the second component 354. The bump lever 222 may continue to extend until the retention element 350 disengages.

FIGS. 24 and 25 illustrate a hatch door catch assembly 400 configured to hold the hatch door 216 of the yard waste collector 200 in the open position. The hatch door catch assembly 400 may include a magnet 402 operably coupled proximate to a pivot connection 406 of the hatch door 216, such as a hinge. The hatch door catch assembly 400 may include a metal plate 404 or second magnet operably coupled in a complementary position to the hatch door 216. In an instance in which the hatch door 216 is pivoted to the open position, the magnet 402 may engage the metal plate 404 causing the hatch door 216 to be retained in the open position, as depicted in FIG. 26. The operator may push the hatch door 216 in the shut direction to disengage the hatch door assembly 400. Advantageously, the hatch door 216 may be shut without an extra step of unlatching, thereby avoiding damage caused by shutting the hatch door 216 without unlatching the hatch door 216. In some embodiments, the dump position of the hatch door 216 may be a position in which the hatch door 216 is less open than the open position. In other words the hatch door 216 may not be fully open, e.g. in the open position, in the dump position. The hatch door catch assembly 400 may not retain the hatch door 216 open in the dump position, to allow for the yard waste collector 200 to be dumped and the hatch door 216 to shut automatically due to gravity when returned to the collection position.

Example Detachable Conveyor Joint Assembly and Service Positions

FIG. 27 illustrates the lawn care vehicle 10 with the cutting deck 16 in a service position. In the service position, the cutting deck 16 may be slid forward and rotated 90 degrees to a vertical position to allow access to the under side of the cutting deck 16 and blades, for cleaning and maintenance.

FIG. 28 illustrates a side view of the cutting deck 16 and conveyor 100 with a conveyor joint assembly, e.g. detachable joint 600. The detachable joint 600 may include a first sealing surface 602 operably coupled to the cutting deck 16 and a second sealing surface 604 operably coupled to the receiving end of the conveyor 100. The detachable joint 600 may include a support ledge 501 operably coupled to and extending from the first sealing surface 602. A first and second side wall 507 (as depicted in FIG. 30) may be operably coupled to opposite sides of the support ledge 501. The first and second side wall 507 may include a receiver 504, such as a groove or slot to receive a protrusion 503 operably coupled to the second sealing surface 604. The protrusion 503 may be received by the receiver 504 vertically downward, restricting motion of the second sealing surface 604 in the forward, backward, and downward directions.

The conveyor 100 may be operably coupled to the lawn care vehicle 10 by roller 502. The roller 502 may support the weight of the conveyor 100 and allow for longitudinal movement of the conveyor 100 relative the frame 15 during operation. The conveyor 100 may be further operably coupled to the lawn care vehicle 10 by a conveyor lift assembly including a release linkage 505 and a lift linkage 506. In an instance in which the operator shifts the release lever 12 to a release position, the release linkage 505 may cause the lift linkage 506 to lift the receiving end of the conveyor 100 in the vertical direction. Lifting the conveyor 100 in the vertical direction may cause the protrusion 503 to be removed from the receiver 504.

FIG. 29A illustrates a front view of the lawn care vehicle 10 with a front cover 13 of the cutting deck 16 removed. To transition the cutting deck 16 from the cutting position to the service position, a height adjustment lever 19 may be shifted, which may release the tension on a height adjustment rod 22 on the cutting deck 16. Next, the release lever 12 may be shifted to, which may detach the conveyor 100 from the cutting deck 16, as described above in reference to FIG. 28. The front cover 13 of the cutting deck 16 may be removed, in an instance in which the front cover 13 is in place. The front cover 13 may be retained on the cutting deck 16 by a retention clip 13A. The retention clip 13A may be released by a lever tool, such as a screwdriver, ignition key, a plastic clip release tool, or the like. The cutting deck transmission belt 4 and the height adjustment rod 22 may be released from the cutting deck 16. The cutting deck 16 may be pulled forward, without further disassembly or tools, as described below in reference to FIG. 29B. The cutting deck 16 may reach a mechanical stop, such as the end of a groove or track in a support arm. The cutting deck 16 may be tilted up vertically or near vertically, such as 75 degrees, 85, degrees, 90 degrees, or the like, in the service position. In some example embodiments, the cutting deck 16 may be retained in the service position by a service lock, as discussed below in FIG. 29C.

In FIG. 29B the cutting deck 16 has been transitioned to the service position. The cutting deck 16 may be supported by support arms 515, which may be raised or lowered by the operator, such as by using a hydraulic assembly. To transition the cutting deck 16 to the service position, the support arms 515 may be raised to a high cutting height or fully raised. In an example embodiment, a pin 510 may provide additional support for the cutting deck 16 in the operating position by engaging catch 512. In some embodiments, the pin 510 may rest on the catch 512. In some embodiments, a latch holds the pin 510 in catch 512. Operation of the release lever 12 may also release pin 510 from catch 512, in an instance in which a latch hold the pin 510 in the catch 512. The cutting deck 16 may be pulled forward along track 514 of support arms 515, supported by pin 516 (depicted in FIGS. 28 and 29C). The cutting deck 16 may be rotated 90 degrees to a service position by rotating about pin 516. The cutting deck 16 may be retained or locked in the service position by a service lock 518.

FIG. 29C illustrates the service lock 518 according to an example embodiment. The cutting deck 16 may include one or more lock recesses 519 configured to receive the service lock 518. In an example embodiment, the service lock 518 may be a bar biased by a biasing element, such as a spring, toward the cutting deck 16, when the cutting deck 16 is in the service position. In an instance in which the cutting deck 16 is tilted to the service position, the bar of the service lock 518, may engage the recesses 519 of the cutting deck 16 retaining the service deck 16 in the service position. The service lock 518 may be disengaged by lifting the bar of the service lock 518 out of the recesses 519 allowing the cutting deck 16 to be tilted forward toward the cutting position and away form the service lock 518.

The cutting deck 16 may be returned to the cutting position by reversing the operations described in reference to FIGS. 29A-29C. The cutting deck 16 may be easily shifted between the cutting position and service position with only the lever tool, making cleaning and maintenance significantly easier for the operator.

FIGS. 30 and 32 depict perspective views of the first sealing surface 602 of detachable joint 600, which may be operably coupled to the cutting deck 16. The support ledge 501 may extend away from the first sealing surface 602 and be configured to support at least a portion of the weight of the conveyor 100. The first and second side walls 507 may be operably coupled to opposite sides of the support ledge 501. The first and second side walls 507 may extend substantially vertically from the support ledge 501. The first and second side walls 507 may include a receiver 504 or the receiver 504 may be formed between the first sealing surface 602 and the first and second side walls 507, such as a gap.

In some example embodiments, the first and second side walls 507 may also include a guide extension 509. The guide extension 509 may extend horizontally outward away from the detachable joint 600. The guide extensions may additionally or alternatively extend outward away from the detachable joint 600 at an angle from vertical, such as 5 degrees, 10 degrees, or the like. The guide extension 509 may align the protrusion 503 with the receiver 504, when the detachable joint 600 is mated.

FIGS. 31 and 33 illustrate a perspective view of the second sealing surface 604 operably coupled to the receiving end of the conveyor 100. The depicted conveyor 100 includes auger 110 extending from chute 101. The second sealing surface 604 may include an engagement member, such as a hook 606. The hook 606 may extend from a top portion of the second sealing surface 604. The hook 606 may be configured to extend over and behind the first sealing surface 602 and configured to retain the first sealing surface 602 in contact and/or aligned vertically with the second sealing surface 604.

FIG. 34 illustrates a perspective view of the first sealing surface 602 mated with the second sealing surface 604. FIG. 35 illustrates a side view of the first sealing surface 602 mated with the second sealing surface 604. The detachable joint 600 may include a hood 605, which includes at least the second sealing surface 604. The hood 605 may be pivotally connected to the receiving end of the conveyor 100, such as by the protrusions 503. In one example embodiment, the hood 605 may include apertures 503A configured to receive the protrusions 503. The hood 605 may pivot backward and/or forward on protrusions 503, allowing for longitudinal pivoting motion of the detachable joint 600. The hook 606 may maintain contact between the first sealing surface 602 and second sealing surface 604 during pivoting of the detachable joint 600.

The hood 606 may include a biasing element 609, such as a coil spring, configured to bias the second sealing surface 604 toward the first sealing surface 602. The biasing element 609 may be operably coupled at a first end to an anchor point 608, such as on the receiving end of the conveyor 100. The biasing element 609 may be operably coupled at a second end to a front position control anchor 610.

The receiver 504 and protrusions 503 of the detachable joint 600 may be disposed on a lower half of the first sealing surface 602 and second sealing surface 604. The placement of the receiver 504 and protrusions 503 at the lower half, or in some instances the lower end of the first sealing surface 602 and the second sealing surface 604, the lower half of the first sealing surface 602 and second sealing surface may cause the protrusions 503 to act as a fulcrum to axial rotation in a coronal plane of the first sealing surface 602 and second sealing surface 604 of the detachable joint 600. The fulcrum action of the protrusions 503 may limit the relative movement of the lower half of the first sealing surface 602 and second sealing surface 604. The hook 606 may resist some axial motion when contacting the first sealing surface 602. However the majority of the axial torque may be absorbed through various mounts of the cutting deck 16 and/or conveyor 100. The various mounts may allow for some axial rotation of the detachable joint 600. The first sealing surface 602 and second sealing surface 604 may experience axial rotation of 5 degrees 10, degrees 15 degrees, or the like. The upper half of the first sealing surface 602 and second sealing surface 604 may include a width which is significantly wider than the lower half of the first sealing surface 602 and second sealing surface 604, for example 25 percent wider, 35 percent wider, 50 percent wider, or the like, as depicted in FIGS. 30-33. The wider upper half of the first sealing surface 602 and second sealing surface 604 may allow for larger relative motion at the upper halves compared to the lower halves near the fulcrum of the projections 503, while maintaining engagement or contact of the first sealing surface 602 with the second sealing surface 604.

In an example embodiment, a resilient material, such as rubber, latex, or the like may be operably coupled to the first sealing surface 602 and/or the second sealing surface 604. The resilient material may provide a better sealing joint when compressed between the first sealing surface 602 and second sealing surface 604. In some embodiments, the resilient material may have a relatively smooth face allowing a sealing surface 602, 604 to slide over the smooth face during axial rotation of the first sealing surface 602 relative to the second sealing surface 604.

Figure 36A:
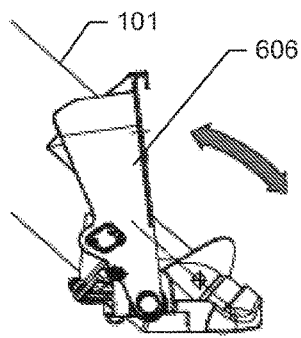
Figure 36B:
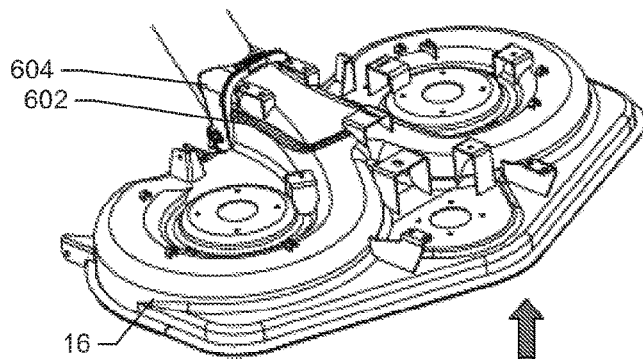
Figure 36C:
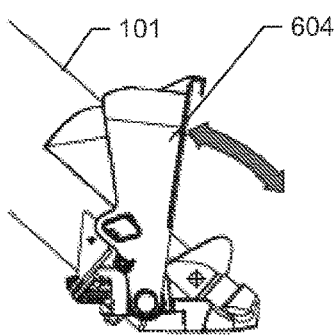
Figure 36D:
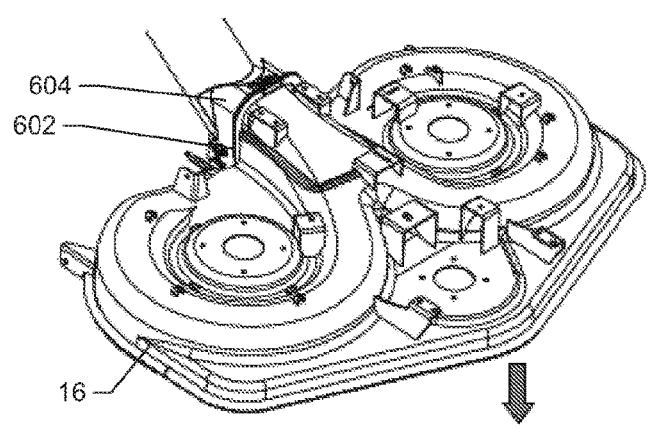
Figure 36E:
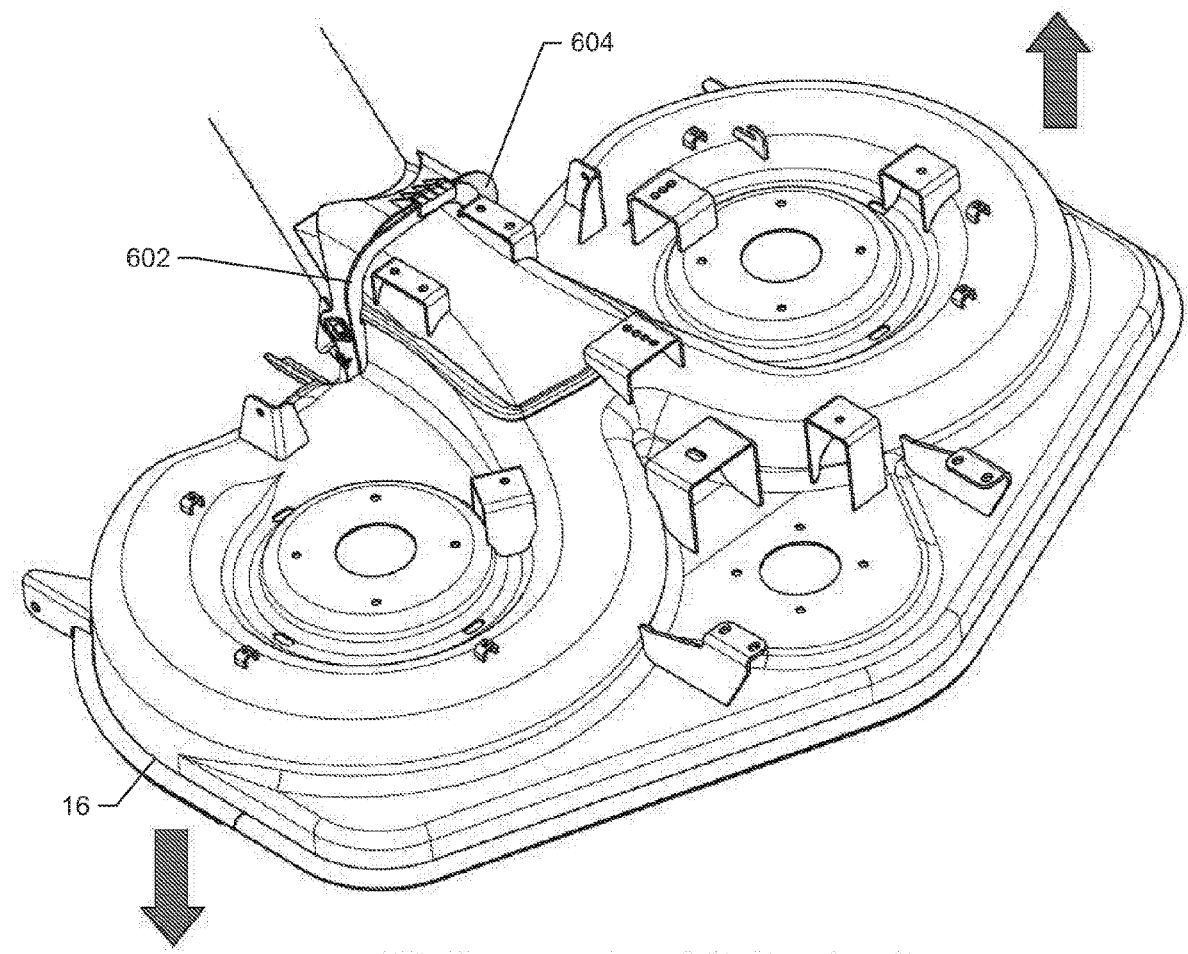
Figure 36F:
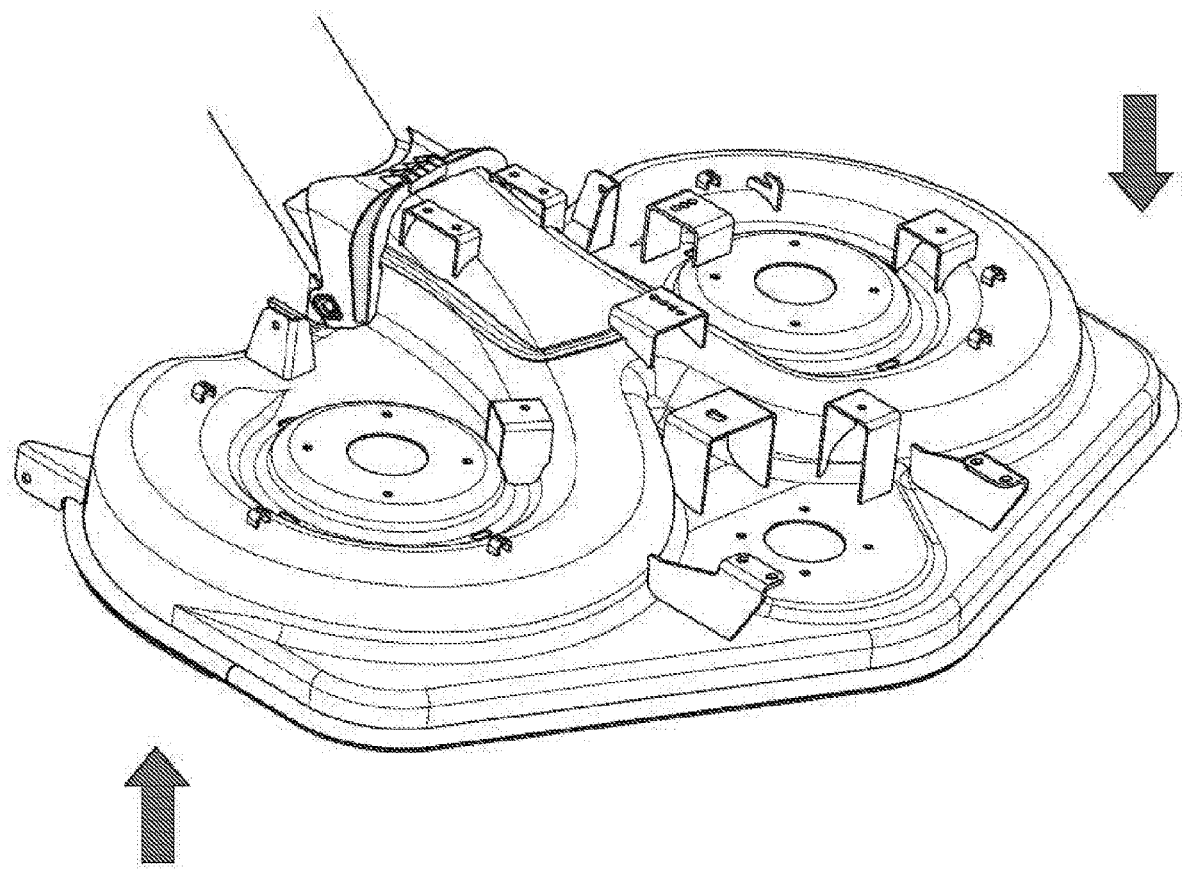

FIGS. 36A-36F depict the detachable joint 600 in various operational positions. FIG. 36A illustrates the hood 605 pivoted up or backward. FIG. 36B illustrates the first sealing surface 602 and second sealing surface 604 mated and the cutting deck 16 pivoted up, causing the pivot of the hood 605 depicted in FIG. 36A. FIG. 36C illustrates the hood 605 pivoted down or forward. FIG. 36B illustrates the first sealing surface 602 and second sealing surface 604 mated and the cutting deck 16 pivoted down, causing the pivot of the hood 605 depicted in FIG. 36C. FIG. 36E illustrates the cutting deck 16 pivoted right causing the upper half of the first sealing surface 602 to be moved to the right, as pivoted on projections 503. The pivot to the right of the cutting deck 16 may cause a portion of the first sealing surface 602 and second sealing surface 604 to be misaligned, but due to the width of the upper halves of the first sealing surface 602 and the second sealing surface 604, at least a portion of the first sealing surface 602 and the second sealing surface 604 remains in contact. FIG. 36F illustrates the cutting deck 16 pivoted to the left, similar to FIG. 36E.

FIG. 37 illustrates the hood 605 removed from the conveyor 100. The hood 605 includes the hook 606 front end position control anchor 610 and anchor point 608. As discussed above, the upper half of the second sealing surface 604 may be wider than in the bottom half of the second sealing surface 604. A pivot axle may be provided by the interaction between the apertures 503A and protrusions 503.

Example Yard Waste Collector Fill Sensor

FIG. 38A illustrates a top down view of the yard waste collector 200 and conveyor 100. In an example embodiment, the conveyor 100 may be an auger configured to have a counter clockwise (CCW) rotation direction 704. The counter clockwise rotation 704 of the auger may cause yard waste to be highest in an area 702 rearward and laterally offset 706 toward the right side of the yard waste collector 200. A sensor, such as a mechanical fill sensor or ultrasonic sensor, may be operably coupled to a top internal surface of the yard waste collector 200 at area 702. In an example embodiment, the auger may have a clockwise (CW) rotation and an area 707 may have the highest yard waste, which may be laterally offset toward the left side of the yard waste collector 200. FIG. 38B illustrates a rear view into the yard waste collector 200, with the hatch door 216 removed. A mechanical fill sensor 800 is operably coupled to the top interior surface of the yard waste collector 200. The mechanical fill sensor 800 may be operably coupled to the yard waste collector 200 in the area 702 laterally offset to the right side of the yard waste collector 200 and rearward of the conveyor 100, e.g. auger with a counter clockwise rotation 704.

FIG. 39A depicts a side view of a mechanical fill sensor 800. FIGS. 39B and 40 depict left and right side perspective views of mechanical fill sensor 800. The mechanical fill sensor 800 may include a mounting 810 including one or more holes for fasteners such as rivets, screws or the like. The mounting 810 may include a vertical riser 808 extending from the mounting 810. A pivot 806 may be disposed in the vertical riser 808 of the mounting 810. The pivot 806 may include a grooved pin and catch, such a C clip. A proximal end of a lever arm 802 may be operably coupled to the pivot 806. An actuating paddle 812 may be operably coupled at a distal end of the lever arm 802. The actuating paddle 812 may have a substantially flat surface which is wider than the lever arm 802 to provide a surface area for the yard waste to interact. In some embodiments, the actuation paddle 812 may include a bend in the downward direction at or near the middle of the length of the actuation paddle 812. At least a portion of the actuation paddle 812 may be substantially in the vertical plane (V), e.g. 2 degrees, 5 degrees, or the like from vertical.

In some example embodiments, the actuation paddle 812 may be adjustable. For example, the length of the actuation paddle 812 may be extended or shortened along the longitudinal axis of the lever arm 802. The actuation paddle 812 may be extended or shortened by sliding a pin 814, such as a bolt, up or down a slide track 816. The pin 814 may be loosened or tighten in a position, such as by adjustment of a knob 817, which may screw onto the pin 814 on an opposite side of the slide track 816. Additionally, in some embodiments, the actuation paddle 812 may include a stabilizer tab 815 configured to penetrate the slide track 816 to provide a second point of support.

In operation, gravitational force (G) is applied to the top of the mechanical arm 802. In some embodiments, a biasing element 805 provides additional bias toward an un-actuated position. A pressure switch 804 may be operably coupled to the vertical riser 808 and provide a switch force (S). The switch force (S) may be significantly smaller than the gravitational force (G). As the yard waste enters the yard waste collector 200, a yard waste pile may form and begin to rise in area 706. In an instance in which the yard waste is nearing a full level of the yard waste collector 200, the yard waste will exert a mechanical force (M) vertically and/or horizontally against the actuation paddle 812. The mechanical force (M) may overcome the gravitational force (G) causing the lever arm 802 to move to an actuated position. The lever arm 802 moving to the actuated position may cause the pressure switch 804 to actuate, indicating the yard waste has reached a full level in the yard waste collector 200.

FIG. 41 illustrates a yard waste collector 200 including an ultrasonic sensor 820. One or more ultrasonic sensors 820 may be operably coupled to the top interior surface of the yard waste collector 200. The ultrasonic sensors 820 may be configured to measure a distance from the top of the yard waste collector 200 to a fill level of the yard waste 822. The ultrasonic sensors 820 may determine a fill level at a predetermined interval (such as 1 second, 5 seconds, 30 seconds, or the like), continuously, or nearly continuously.

Example Lawn Care Vehicle Control Circuitry

An example embodiment of the lawn care vehicle control circuitry will now be described with reference to FIG. 42. FIG. 42 shows certain elements of control circuitry for a lawn care vehicle 10 according to an example embodiment. It should be noted that the devices or elements described below may not be mandatory and thus some may be omitted in certain embodiments.

Referring now to FIG. 42, control circuitry configured a lawn care vehicle 10 is provided. In an example embodiment, the control circuitry may include or otherwise be in communication with processing circuitry 50 that is configured to perform data processing, application execution and other processing and management services. In one embodiment, the processing circuitry 50 may include a storage device 54 and a processor 52 that may be in communication with or otherwise control a user interface 56, the linear actuator 302, electronic clutch 70, and/or a cutting deck clutch 71. As such, the processing circuitry 50 may be embodied as a circuit chip (e.g. an integrated circuit chip) configured (e.g. with hardware, software or a combination of hardware and software) to perform operations described herein.

The user interface 56 may be in communication with the processing circuitry 50 to receive an indication of a user input at the user interface 56 and/or to provide an audible, visual, mechanical or other output to the user. As such, the user interface 56 may include, for example, a keyboard, a mouse, a joystick, a display, a touch screen, a microphone, a speaker, a cell phone, or other input/output mechanisms.

In an example embodiment, the storage device 54 may include one or more non-transitory storage or memory devices such as, for example, volatile and/or non-volatile memory that may be either fixed or removable. The storage device 54 may be configured to store information, data, applications, instructions or the like for enabling the control circuitry to carry out various functions in accordance with example embodiments of the lawn care vehicle 10. For example, the storage device 54 could be configured to buffer input data for processing by the processor 52. Additionally or alternatively, the storage device 54 could be configured to store instructions for execution by the processor 52. As yet another alternative, the storage device 54 may include one of a plurality of databases that may store a variety of files, contents or data sets. Among the contents of the storage device 54, applications may be stored for execution by the processor 52 in order to carry out the functionality associated with each respective application.

The processor 52 may be embodied in a number of different ways. For example, the processor 52 may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an example embodiment, the processor 52 may be configured to execute instructions stored in the storage device 54 or otherwise accessible to the processor 52. As such, whether configured by hardware or software methods, or by a combination thereof, the processor 52 may represent an entity (e.g. physically embodied in circuitry) capable of performing operations according to embodiments of the present invention while configured accordingly. Thus, for example, when the processor 52 is embodied as an ASIC, FPGA or the like, the processor 52 may be specifically configured hardware for conducting the operations described herein. Alternatively, as another example, when the processor 52 is embodied as an executor of software instructions, the instructions may specifically configure the processor 52 to perform the operations described herein.

The processing circuitry 50 may be in communication with one or more sensors 60, 61, 62, 63. The sensors 60, 61, 62, 63 may provide information indicative of various conditions of the lawn care vehicle 10. For example, the sensors 60, 61, 62, 63 may include without limitation, a fill level sensor 63, auger speed sensor 60, transmission speed sensor 61, and a motor sensor 62.

The fill level sensor 63 may be a mechanical arm, such as described in reference to FIGS. 39-40, and/or an ultrasonic sensor, such as described in reference to FIG. 41. The fill level sensor 63 may provide an indication of the fill level of the yard waste collector 200, for example a full level indication, indicative of the yard waste collector 200 being full. The processing circuitry 50 may cause the full level indication to be displayed on the user interface 56 or otherwise indicated to the operator. The full level indication may prompt the operator to perform a dump cycle of the yard waste collector 200.

In some example embodiments, the processing circuitry 50 may take additional actions based on the full level indication, such as causing the electronic clutch 70 to disengage and/or causing the cutting deck clutch 71 to disengage. Disengaging the electronic clutch 70 may prevent rotational force from the motor 11 from reaching the conveyor 100, stopping the conveyor 100, such as an auger. By stopping conveyor 100, further yard waste is prevented from entering the conveyor 100 and/or yard waste collector 200, which may prevent or limit clogging or overfilling of the conveyor 100 or yard waste collector 200. In an example embodiment in which the cutting deck clutch 71 is disengaged, power from the motor 11 may be prevented from reaching the cutting deck 16 stopping the rotation of the cutting blades. Stopping the cutting blades may prevent additional yard waste from being generated or feed to the conveyor 100, which may prevent clogging the receiving end of the conveyor 100 and/or transitioning to mulching operations when collecting operations are desired.

In an instance in which the yard waste collector 200 completes the dump cycle, removing the yard waste from the yard waste collector 200, the fill level sensor 63 may indicate provide an indication of "not full." The processing circuitry 50 may cause the electronic clutch 70 and/or cutting deck clutch 71 to engage and cutting and collecting operations may continue.

In an example embodiment in which the fill level sensor 63 is an ultrasonic sensor, the fill level indication may include a partial fill level indication, such as ⅛ full, ½ full, ⅞ full, or the like. The processing circuitry 50 may receive the fill level indication at a regular interval, 1 second, 5 seconds, 30 seconds, or the like. The fill level indication may be compared to a full threshold. The full level indication may be generated by the processing circuitry 50 in an instance in which the processing circuitry 50 determined that the fill level indication exceeds the full threshold. The processing circuitry 50 may compare the fill level indication to a predetermined fill threshold, such as ¾ full, ⅞ full, 8/8 full, or the like. The processing circuitry 50 may determine of the fill level indication satisfies the predetermined fill threshold and cause the full level indication to be displayed in response to satisfying the fill level threshold.

Additionally or alternatively, the processing circuitry 50 may provide a dynamic indication of fill level based on the fill level indication to be displayed on the user interface 56. The dynamic indication of fill level may be useful for the operator to plan dump cycles, such as performing a dump cycle when the yard waste collector 200 is about half full near the dump site, prior to commencing cutting operations in a next area.

The speed sensors 60, 61 may provide an indication of the speed of the auger of the conveyor 100 directly or indirectly, which may be indicative of the load on the auger. The speed sensors 60, 61 may be variable reluctance based, Hall effect based, Eddy current based, radar Doppler based, LIDAR based, accelerometer based, pitot tube based, pitometer based, or the like. The auger speed sensor 60 may be operably coupled to the conveyor 100 to directly measure the rotational speed of the auger. The transmission sensor 61 may be operably coupled to a transmission, the electronic clutch 70, or the like and may measure the rotational speed of a transmission belt 72 or other transmission components which may be indicative of the auger speed. The motor sensor 62 may be a speed sensor and be operably coupled to the motor 11 and measure the speed of an motor component, such as a rotor, piston, or cam.

The processing circuitry 50 may receive sensor data indicative of the load on the auger, e.g. rotational speed. The rotational speed may be, for example, motor rotation speed, auger rotation speed, transmission belt rotation speed, or the like. The processing circuitry 50 may compare the rotation speed to a predetermined auger load threshold, such as a nominal rotation speed. In an instance in which the rotational speed satisfies, e.g. exceeds, the predetermined auger load threshold, the processing circuitry 50 may cause the electronic clutch to disengage. Disengagement of the electronic clutch 70 may prevent or limit overload conditions in the auger, which may in turn, limit or prevent damage to components of the conveyor 100, transmission, motor 11, or the like.

In some example embodiments, the processing circuitry 50 may also cause an alert on the user interface 56, such as an audio or visual indication, in response to the rotational speed satisfying the predetermined auger load threshold. Additionally, the processing circuitry 50 may disengage the cutting deck clutch 71 in response to the rotational speed satisfying the predetermined auger load threshold.

In some example embodiments, the processing circuitry 50 may cause an auger load to be displayed on the user interface 56, such that the operator may control the lawn care vehicle 10 to maintain the load less than the predetermined auger load threshold. For example, the auger load may be displayed as text or lights on the user interface 56 indicative of a specific rotation speed or band. In some example embodiments, the processing circuitry 50 may compare the rotational speed to a predetermined load warning threshold, which may be a higher speed/lower load that the predetermined auger load threshold. The processing circuitry 50 may cause an audio or visual warning on the user interface 56 in response to satisfying the predetermined load warning threshold.

Additionally or alternatively, the motor sensor 62 may include a current sensor. The current sensor may be operably coupled to the motor 11 and/or output or supply power cables associated with the motor 11. As the load on the auger increases, the motor current may increase. The current sensor may be configured to sense a motor current associated with the motor 11. The motor current may be compared to a predetermined current based auger load threshold, such as 10 A, 15 A, 20 A, or the like. In an instance in which the motor current satisfies the predetermined current based auger load threshold the processing circuitry 50 may operate in a manner similar to that described above for the speed based auger load threshold.

In an example embodiment, the processing circuitry 50 may receive a dump cycle signal or indication from the user interface 56, such as in an instance in which the user has selected a dump cycle to be performed. The processing circuitry 50 may cause the linear actuator 302 to be extended and retracted as discussed above in reference to FIGS. 16-21. Additionally or alternatively, the linear actuator 302 may be controlled directly from the user interface 56 without the processing circuitry 50. For example, the user interface 56 may include a three position switch, e.g. extend, retract, and neutral, configured to directly control the linear actuator 302.

The processing circuitry 50 may receive a collect indication from the user interface 56, indicative of the operator's desire to collect yard waste in the yard waste collector 200. The processing circuitry 50 may cause the electronic clutch 70 to engage in response to the collect indication. Similarly, the processing circuitry 50 may receive a non-collection, e.g. mulch, indication form the user interface 56, indicative of the operator's desire to not collect the yard waste. The processing circuitry 50 may cause the electronic clutch 70 to disengage in response to the non-collection indication. In an alternative embodiment, the electronic clutch control may be disengaged and engaged directly by the user interface 56, without the processing circuitry 50. For example, the user interface 56 may include a two position switch, e.g. engage and disengage. The two position switch may be configured to power a transition between engaged and disengaged based on the position of the two position switch.

Example Lawn Care Vehicle Operation Flow Chart

The control circuitry described in reference to FIG. 42 may be used to facilitate the implementation of several computer program and/or network communication based interactions. As an example, FIGS. 43 and 44 are flowcharts of a methods and program product according to an example embodiment. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device and executed by a processor of the control circuitry. As will be appreciated, any such computer program instructions may be loaded onto a computer or other programmable apparatus (e.g. hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, methods according to example embodiments are shown in FIGS. 43 and 44. The methods may be employed for control of the lawn care vehicle 10. The first method may include, receiving sensor data associated with auger load, at operation 906. The method may also include comparing the sensor data to a predetermined auger load threshold, at operation 908. At operation 910, the method may include determining if the sensor data satisfies the predetermined auger load threshold, and at operation 914 causing the electronic clutch to disengage in response to the sensor data satisfying the predetermined auger load threshold.

In an example embodiment, the first method may optionally include, as denoted by the dashed box, receiving a collection indication, at operation 902, causing the electronic clutch to engage in response to the collection indication at operation 904, receiving a non-collection indication at operation 918, and causing the electronic clutch to disengage in response to the non-collection indication at operation 920. At operation 912, the method may include causing the electronic clutch to remain engaged in response to the sensor data failing to satisfy the predetermined auger load threshold and causing an alert in response to the sensor data satisfying the predetermined auger load threshold at operation 916.

The second method may include receiving sensor data indicative of a fill level of a yard waste collector at operation 1002, comparing the sensor data to a predetermined fill threshold at operation 1004, determining if the sensor data satisfies the predetermined fill threshold at operation 1006, and causing a full level indication to be displayed on the user interface 56 at operation 1008.

In an example embodiment, the second method may include optionally include, as denoted by the dashed box, causing the conveyor to be disengaged in response to the sensor data satisfying the predetermined fill threshold at operation 1010, causing a working deck to be disengaged in response to satisfying the predetermined fill threshold at operation 1012, and causing a dynamic indication of fill level to be displayed on the user interface at operation 1014.

In an example embodiment, an apparatus for performing the method of FIG. 6 above may comprise a processor (e.g. the processor 52) or processing circuitry configured to perform some or each of the operations (902-920 and 1002-1014) described above. The processor may, for example, be configured to perform the operations (902-920 and 1002-1014) by performing hardware implemented logical functions, executing stored instructions, or executing algorithms for performing each of the operations. In some example embodiments, the processor or processing circuitry may be further configured for additional operations or optional modifications to operations 902-920 and 1002-1014. In this regard, in an example embodiment, the clutch control circuit is further configured to receive sensor data indicative of load on the auger, compare the sensor data to a predetermined auger load threshold, determine if the sensor data satisfies the predetermined auger load threshold, and cause the electronic clutch to disengage in response to the sensor data satisfying the predetermined auger load threshold. In some example embodiments, the sensor data includes rotational speed and the predetermined auger load threshold includes a nominal rotational speed. In an example embodiment, the rotational speed comprises an engine rotor speed. In some example embodiments, the rotational speed includes an auger rotation speed. In an example embodiment, the rotational speed includes a transmission belt rotation speed. In some example embodiments, the motor includes an electric motor and the sensor data comprises motor current. In an example embodiment, the clutch control circuit is further configured to cause an alert in response to the sensor data satisfying the predetermined auger load threshold. In some example embodiments, the alert comprises a visual indication on a user interface. In an example embodiment, the clutch control circuit is configured to receive a collection indication from a user interface and cause the electronic clutch to engage in response to the auger collection indication. In some example embodiments, the clutch control circuit is further configured to receive a non-collection indication from a user interface and cause the electronic clutch to disengage based on the auger non-collection indication. In an example embodiment, the sensor comprises a mechanical arm configured to actuate a pressure switch in response to pressure from the yard waste. In some example embodiments, the mechanical arm includes a lever arm pivotally connected to a mounting at a proximal end of the lever arm, an actuation paddle operably coupled to a distal end of the lever arm. The actuation of the pressure switch is in response to the pressure of the yard waste overcoming a gravitational force applied to the lever arm. In an example embodiment, the actuation paddle is configured to be adjusted along a longitudinal axis of the lever arm to adjust the pressure of the yard waste required to overcome the gravitational force applied to the lever arm. In some example embodiments, the actuation of the pressure switch is in response to the pressure of the yard waste and the pressure switch overcoming the gravitational force applied to the lever arm. In an example embodiment, at least a portion of the actuation paddle is disposed a substantially vertical plane and the pressure of the yard waste comprises a substantially horizontal pressure of the yard waste. In some example embodiments, the yard waste collection system also includes an auger configured to convey the yard waste to the yard waste collector and the sensor is disposed and offset by a predetermined lateral distance in a direction of rotation of the auger. In an example embodiment, the yard waste collection system also includes an auger configured to convey the yard waste to the yard waste collector and the sensor is disposed rearward of an auger discharge and offset by a predetermined lateral distance in a direction of rotation of the auger. In some example embodiments, the processing circuitry is further configured to cause a working deck or yard waste conveyor to be disengaged in response to the indication of fill level indicating that the yard waste collector is substantially full. In an example embodiment, the sensor includes at least one ultrasonic sensor. In some example embodiments, the collector fill indication comprises a dynamic indication of a fill level of the yard waste collector. In an example embodiment, a first travel arc of a pushrod contact point on the hatch door is smaller than a second travel arc of a distal end of the pushrod. In some example embodiments, the yard waste collector also includes a pushrod guide plate operably coupled to the yard waste collector and configured to align the pushrod with the retention element. In an example embodiment, the yard waste collector assembly also includes a linear actuator configured to cause the yard waste collector to pivot from the collection position to the dump position. In some example embodiments, the linear actuator extends or retracts in response to a dump signal. In an example embodiment, the yard waste collector assembly also includes a crossbar configured to rotate about a longitudinal axis of the crossbar, a lever arm configured to transfer a linear force of the linear actuator to a rotational force of the crossbar, a collector frame configured to support the yard waste collector, and a link arm operably coupled to the crossbar at a proximal end of the link arm and comprising guide wheels at a distal end of the link arm. Extension of the linear actuator causes the crossbar to rotate in a first direction causing the link arm to extend and extension of the link arm causes the guide wheels to travel a slide track, operably coupled to the collector frame, causing the collector frame to pivot the yard waste collector to the dump position. In some example embodiments, the slide track is disposed in a longitudinal axis of the collector frame. In an example embodiment, the retention element includes a magnet. In some example embodiments, the yard waste collector assembly also includes a magnet operably coupled to the yard waste collector proximate to the pivot connection of the hatch door and configured to retain the hatch door in an open position. In an example embodiment, the yard waste collector assembly also includes a metal plate or a second magnet operably coupled proximate to the pivot connection of the hatch door opposite the magnet and configured to magnetically engage the magnet to retain the hatch door in the open position. In some example embodiments, the retention element comprises a magnet. In an example embodiment, the yard waste collector assembly also includes a handle mechanism configured to disengage the retention element when actuated. In some example embodiments, the handle mechanism includes a bump lever disposed at a distal end of the handle mechanism, a handle disposed at a proximate end of the handle mechanism, and a pivot disposed between the bump lever and the handle. Operation of the handle causes the handle mechanism to rotate about the pivot causing the bump lever to extend and extension of the bump lever causes the retention element to disengage. In an example embodiment, the handle is operably coupled to the hatch door. In some example embodiments, the conveyor is an auger. In an example embodiment, the conveyor also includes a biasing element configured to bias the telescopic seal toward the shut position. In some example embodiments, the conveyor also includes at least one guide configured to maintain an alignment of the telescopic seal and the outlet. In an example embodiment, the conveyor further comprises a mechanical stop to resist travel of the telescopic seal beyond a predetermined operation range. In some example embodiments, the yard waste collector further comprises a collar disposed around the yard waste inlet. The telescopic seal includes an engagement protrusion and the engagement of the conveyor and yard waste collector include the engagement protrusion being pressed against the collar. In an example embodiment, the yard waste collector is configured to be pivoted between a collection position and a dump position and the engagement protrusion presses against the collar in response to the yard waste collector being pivoted to the collection position. In some example embodiments, the telescopic seal has a first range of travel from the collection position to the dump position and a second range of travel in the collection position, in which the outlet remains uncovered. In an example embodiment, the telescopic seal is configured to at least partially surround a circumference of the conveyor. In some example embodiments, the yard waste inlet also includes a flexible seal. In an example embodiment, the flexible seal includes a slit seal. In some example embodiments, the yard waste collector is configured to be pivoted between a collection position and a dump position. The conveyor penetrates the flexible seal in the dump position and the flexible seal closes in response to the conveyor being removed from the yard waste collector in the dump position. In an example embodiment, the flexible seal includes a geometry complementary to an outer geometry of the conveyor. In some example embodiments, the yard waste collection assembly also includes an air inlet plate configured to be operably coupled over an air inlet on an engine and below the yard waste collector. In an example embodiment, the air inlet plate comprises a raised perimeter configured to inhibit yard waste from escaping a surface of the air inlet plate and the raised perimeter comprises a discharge plane configured to permit yard waste to exit the surface of the air inlet plate. In some example embodiments, the air inlet plate comprises a grade toward the discharge plane to bias the yard waste toward the discharge plane. In an example embodiment, the first sealing surface is operably coupled to a working deck of a yard care vehicle, and the second sealing surface is operably coupled to a conveyor. In some example embodiments, the conveyor joint assembly also includes a hood operably coupled to a receiving end of the conveyor and the hood includes the second sealing surface. In an example embodiment, the hood is pivotably coupled to the receiving end of the conveyor by the at least one protrusion. In some example embodiments, the hood further includes a biasing element configured to bias the second sealing surface toward the first sealing surface. In an example embodiment, the conveyor joint assembly also includes a conveyor lift assembly configured to lift the conveyor vertically a predetermined distance causing the conveyor to move to a disengaged position, wherein moving to the disengaged position comprises the at least one protrusion to disengaging the receiver. In some example embodiments, the first sealing surface is operably coupled to a working deck and the working deck is pivotable between a cutting position and a service position when the conveyor is in the disengaged position. In an example embodiment, the cutting deck is configured to be locked in the service position by a service lock. In some example embodiments, transitioning the cutting deck to the service position requires only a lever tool configured to release a front cover of the cutting deck. In an example embodiment, the at least one protrusion is disposed in a first half of the second sealing surface and the receiver is disposed in a first half of the first sealing surface and wherein a width of the first sealing surface and second sealing surface is at least 50 percent wider in a respective second half than the width of the first sealing surface and second sealing surface in the respective first half, enabling axial rotation of the conveyer joint while maintaining engagement of the first sealing surface and the second sealing surface. In some example embodiments, the second sealing surface further comprises an engagement member configured to retain the second half of the second sealing surface in contact with the first sealing surface. The engagement member enables the first sealing surface and second sealing surface to pivot while maintaining contact. In an example embodiment, the engagement member includes a hook configured to extend from the second sealing surface and around at least a portion of the first sealing surface. In some example embodiments, the conveyor joint assembly also includes a resilient material operably coupled to the first sealing surface or second sealing surface to increase engagement of the first sealing surface with the second sealing surface.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A yard waste collection assembly comprising:
a yard waste collector comprising a yard waste inlet;
a conveyor configured to receive yard waste at a receiving end of the conveyor and discharge the yard waste at a discharge end of the conveyor,
wherein the conveyor comprises:
a telescopic seal configured to cover an outlet, at the discharge end, in a shut position when the conveyor is not engaged with the yard waste collector, and
wherein the telescopic seal is further configured to slide along a longitudinal axis of the conveyor to an open position when the conveyor engages the yard waste collector causing the outlet to be uncovered.

2. The yard waste collection assembly of claim 1, wherein the conveyor is an auger.

3. The yard waste collection assembly of claim 1, wherein the conveyor further comprises:
a biasing element configured to bias the telescopic seal toward the shut position.

4. The yard waste collection assembly of claim 1, wherein the conveyor further comprises:
at least one guide configured to maintain an alignment of the telescopic seal and the outlet.

5. The yard waste collection assembly of claim 1, wherein the conveyor further comprises a mechanical stop to resist travel of the telescopic seal beyond a predetermined operation range.

6. The yard waste collection assembly of claim 1, wherein the yard waste collector further comprises a collar disposed around the yard waste inlet,
wherein the telescopic seal comprises an engagement protrusion; and
wherein the engagement of the conveyor and yard waste collector comprises the engagement protrusion being pressed against the collar.

7. The yard waste collection assembly of claim 6, wherein the yard waste collector is configured to be pivoted between a collection position and a dump position,
wherein the engagement protrusion presses against the collar in response to the yard waste collector being pivoted to the collection position.

8. The yard waste collection assembly of claim 7, wherein the telescopic seal has a first range of travel from the collection position to the dump position and a second range of travel in the collection position, in which the outlet remains uncovered.

9. The yard waste collection assembly of claim 1, wherein the telescopic seal is configured to at least partially surround a circumference of the conveyor.

10. The yard waste collection assembly of claim 1, wherein the yard waste inlet further comprises:
a flexible seal.

11. The yard waste collection assembly of claim 10, wherein the flexible seal comprises a slit seal.

12. The yard waste collection assembly of claim 10, wherein the yard waste collector is configured to be pivoted between a collection position and a dump position, and
wherein the conveyor penetrates the flexible seal in the dump position and the flexible seal closes in response to the conveyor being removed from the yard waste collector in the dump position.

13. The yard waste collection assembly of claim 10, wherein the flexible seal comprises a geometry complementary to an outer geometry of the conveyor.

14. The yard waste collection assembly of claim 1 further comprising:
an air inlet plate configured to be operably coupled over an air inlet on an engine and below the yard waste collector.

15. The yard waste collection assembly of claim 14, wherein the air inlet plate comprises a raised perimeter configured to inhibit yard waste from escaping a surface of the air inlet plate, and
wherein the raised perimeter comprises a discharge plane configured to permit yard waste to exit the surface of the air inlet plate.

16. The yard waste collection assembly of claim 15, wherein the air inlet plate comprises a grade toward the discharge plane to bias the yard waste toward the discharge plane.

17. A lawn care vehicle comprising:
a yard waste collector comprising a yard waste inlet; and a conveyor configured to receive yard waste at an inlet and discharge the yard waste at an outlet, wherein the conveyor comprises:

a telescopic seal configured to cover the outlet in a shut position when the conveyor is not engaged with the yard waste collector, and wherein the telescopic seal is further configured to slide along a longitudinal axis of the conveyor to an open position when the conveyor engages the yard waste collector causing the outlet to be uncovered.

18. The lawn care vehicle of claim 17, wherein the conveyor further comprises:

a biasing element configured to bias the telescopic seal toward the shut position, at least one guide configured to maintain an alignment of the telescopic seal and the outlet, or a mechanical stop to resist travel of the telescopic seal beyond a predetermined operation range.

19. The lawn care vehicle of claim 17, wherein the yard waste collector further comprises a collar disposed around the yard waste inlet, wherein the telescopic seal comprises an engagement protrusion; and wherein the engagement of the conveyor and yard waste collector comprises the engagement protrusion being pressed against the collar.

20. The lawn care vehicle of claim 17, wherein the conveyor is an auger, and wherein the telescopic seal is configured to at least partially surround a circumference of the conveyor.

* * * * *